(12) United States Patent
Nance

(10) Patent No.: US 10,624,252 B2
(45) Date of Patent: Apr. 21, 2020

(54) ROTARY HARROW DISKS AND DEVICES

(71) Applicant: John D. Nance, Ringoes, NJ (US)

(72) Inventor: John D. Nance, Ringoes, NJ (US)

(*) Notice: Subject to any disclaimer, the term of this patent is extended or adjusted under 35 U.S.C. 154(b) by 63 days.

(21) Appl. No.: 15/910,333

(22) Filed: Mar. 2, 2018

(65) Prior Publication Data

US 2019/0269060 A1   Sep. 5, 2019

Related U.S. Application Data

(60) Provisional application No. 62/459,907, filed on Feb. 16, 2017.

(51) Int. Cl.
| | | |
|---|---|---|
| *A01B 23/02* | (2006.01) | |
| *A01B 23/06* | (2006.01) | |
| *A01B 15/16* | (2006.01) | |
| *A01B 21/08* | (2006.01) | |

(52) U.S. Cl.
CPC .............. *A01B 23/06* (2013.01); *A01B 15/16* (2013.01); *A01B 21/08* (2013.01); *A01B 21/086* (2013.01); *A01B 23/02* (2013.01)

(58) Field of Classification Search
CPC .......... A01B 15/16; A01B 23/02; A01B 23/06
USPC .............................. 83/837, 855; 172/540, 548
See application file for complete search history.

(56) References Cited

U.S. PATENT DOCUMENTS

| | | | | |
|---|---|---|---|---|
| 197,688 A | * | 11/1877 | Tilton .................... | B23D 61/04 83/855 |
| 268,924 A | * | 12/1882 | Morand ................. | A01B 21/04 172/548 |
| 297,816 A | * | 4/1884 | Ledward .............. | B23D 61/025 83/837 |
| 442,538 A | * | 12/1890 | Parker ................... | A01B 21/04 172/548 |
| 830,126 A | * | 9/1906 | Wilder ................. | A01B 33/103 172/540 |
| 1,005,389 A | * | 10/1911 | Wilberg ................ | A01B 21/04 172/548 |
| 1,190,183 A | * | 7/1916 | McLaughlin .......... | B60B 15/26 301/41.1 |
| 2,416,742 A | | 3/1947 | Farr .............................. | 172/604 |
| 2,917,826 A | * | 12/1959 | Pohr ..................... | A01G 3/062 30/347 |
| 4,174,756 A | | 11/1979 | De Haai ........................ | 172/55 |
| 4,305,272 A | | 12/1981 | Johnson ....................... | 148/640 |
| 4,739,745 A | | 4/1988 | Browning ..................... | 125/15 |
| 5,018,276 A | | 5/1991 | Asada ........................... | 30/347 |
| 5,297,637 A | | 3/1994 | Rowlett ....................... | 172/604 |
| 5,429,016 A | | 7/1995 | Rowlett ........................ | 76/115 |
| 5,875,700 A | * | 3/1999 | Powell .................. | A01D 34/73 30/276 |
| 6,206,116 B1 | | 3/2001 | Saxman ....................... | 175/378 |

(Continued)

*Primary Examiner* — Tara Mayo-Pinnock

(74) *Attorney, Agent, or Firm* — Ernest D. Buff & Associates, LLC; Ernest D. Buff; Margaret A. LaCroix

(57) ABSTRACT

A disk blade has an outer perimeter, a first side wall, a second side wall, and a central hub. A plurality of fingers extend laterally at an angle Θ from said first side wall. The fingers preferably comprise metal round bars curved to form part of an elliptical geometry inserted at a perpendicular angle to a vertical angle of said disk blade. The bars are arranged at locations equidistant around said disk blade and are disposed at a depth x from said outer perimeter of said disk blade. Preferably, the depth x is at least ≥one (1) inch.

23 Claims, 67 Drawing Sheets

(56) References Cited

U.S. PATENT DOCUMENTS

| | | | |
|---|---|---|---|
| 7,194,933 B2 | 3/2007 | Zhu et al. ........................ 76/115 |
| 7,631,702 B2 | 12/2009 | Hanson .......................... 172/604 |
| D844,675 S * | 4/2019 | Schaffert ................ A01B 15/18 |
| | | | D15/28 |
| 2016/0050837 A1* | 2/2016 | Schaffert et al. ...... A01C 7/208 |
| | | | 172/540 |
| 2016/0227696 A1* | 8/2016 | Christie et al. ........ A01B 15/18 |
| 2017/0208736 A1* | 7/2017 | Schaffert et al. ...... A01C 5/068 |
| 2018/0160611 A1* | 6/2018 | Dietrich, Sr. et al. ........................ |
| | | | A01B 23/02 |

\* cited by examiner

FIGURE 1A
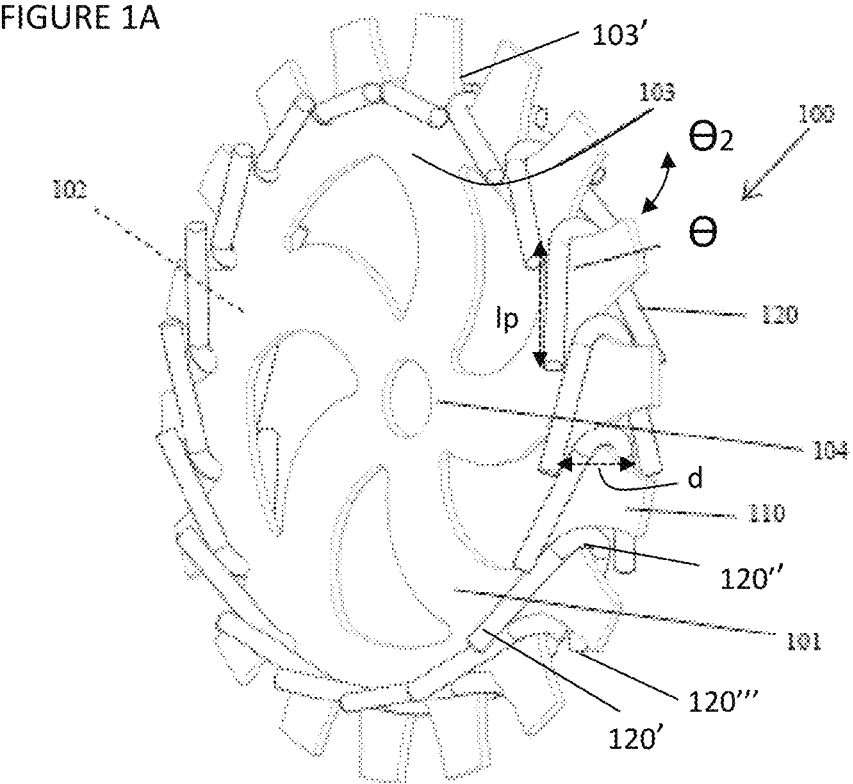
FIGURE 1B
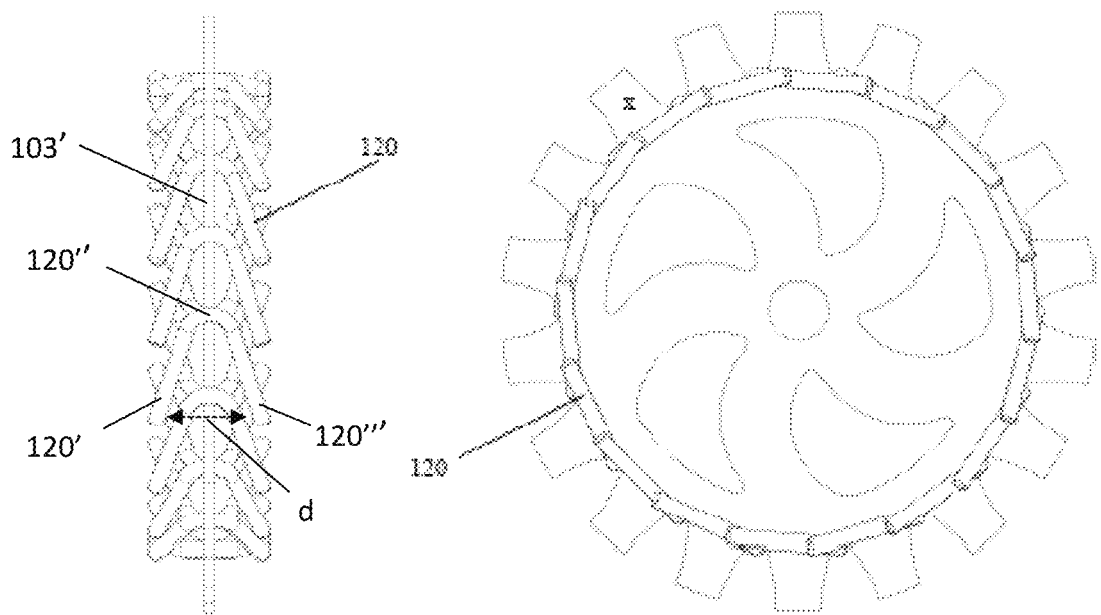
FIGURE 1C

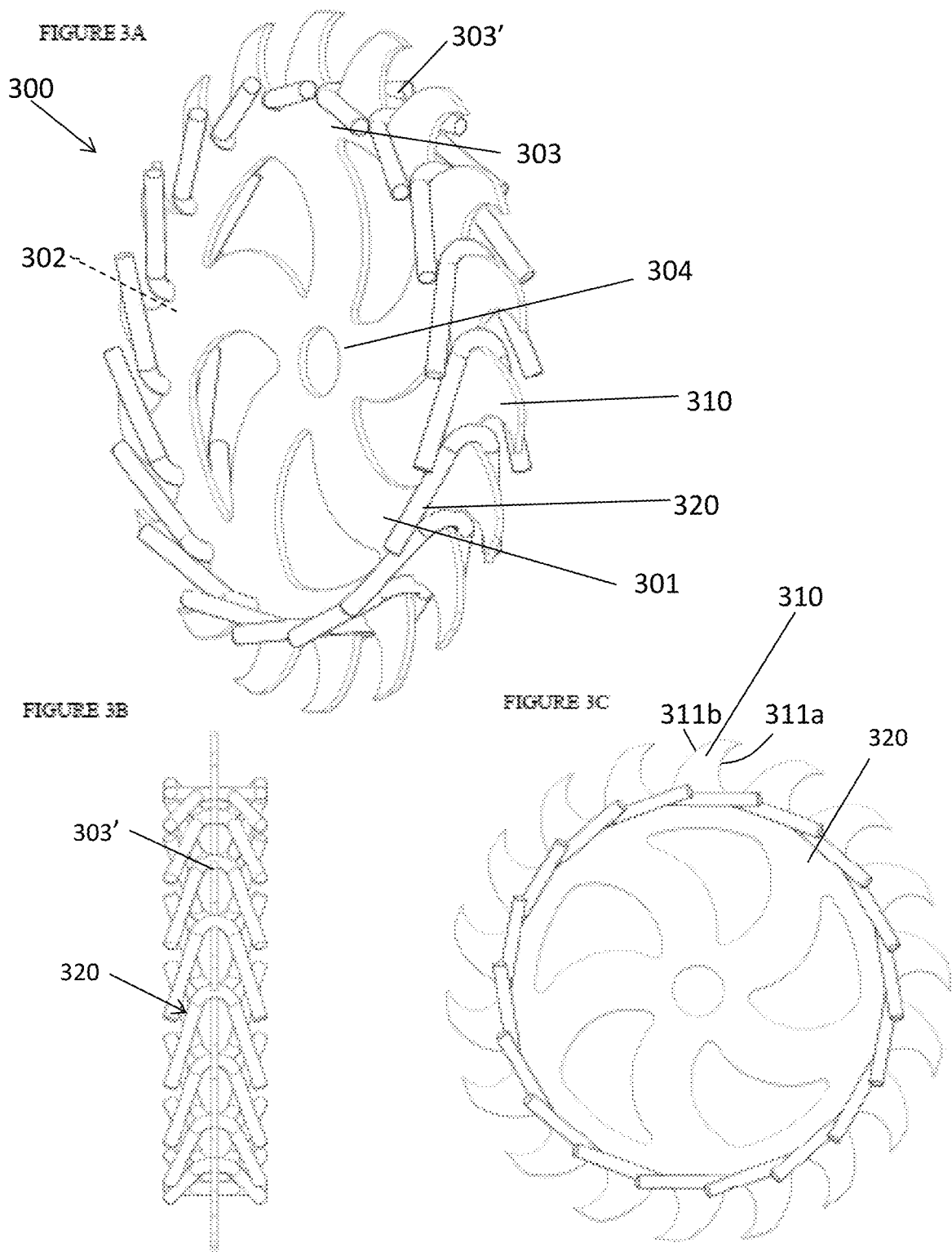

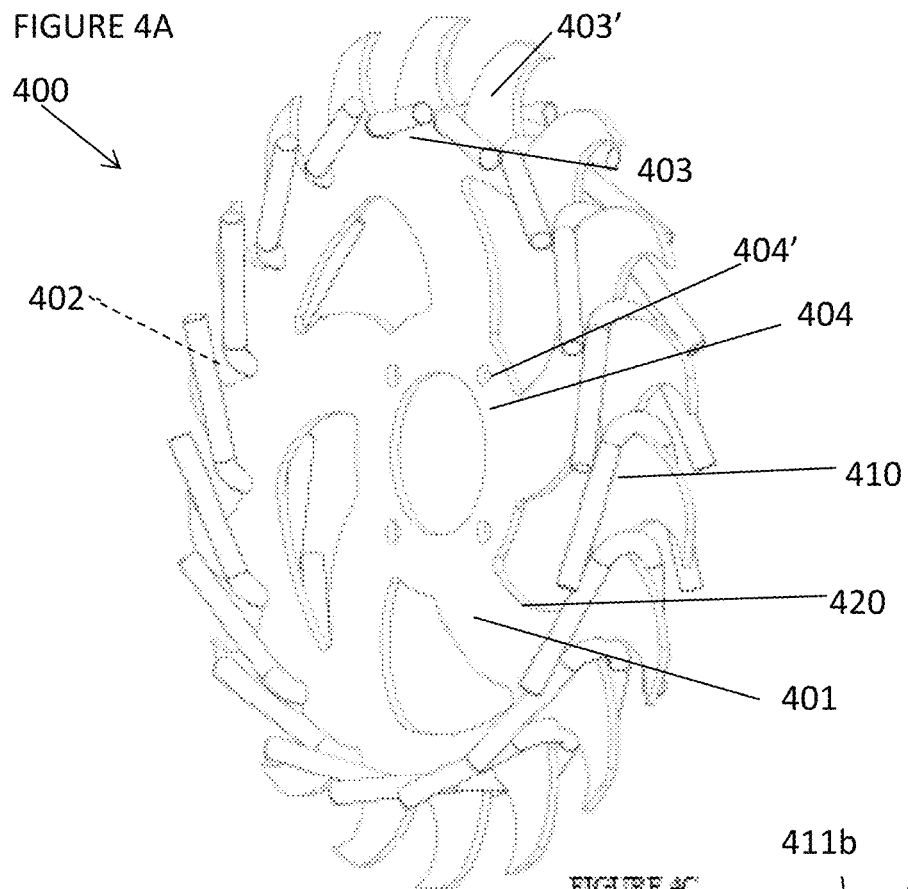
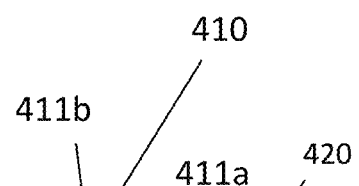
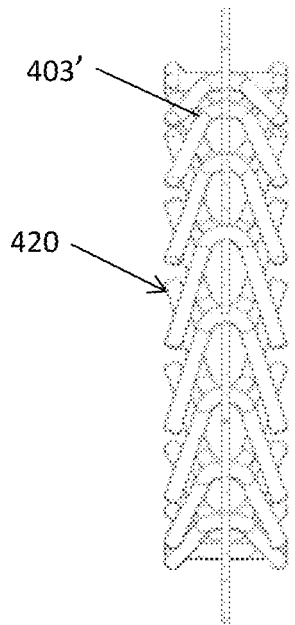

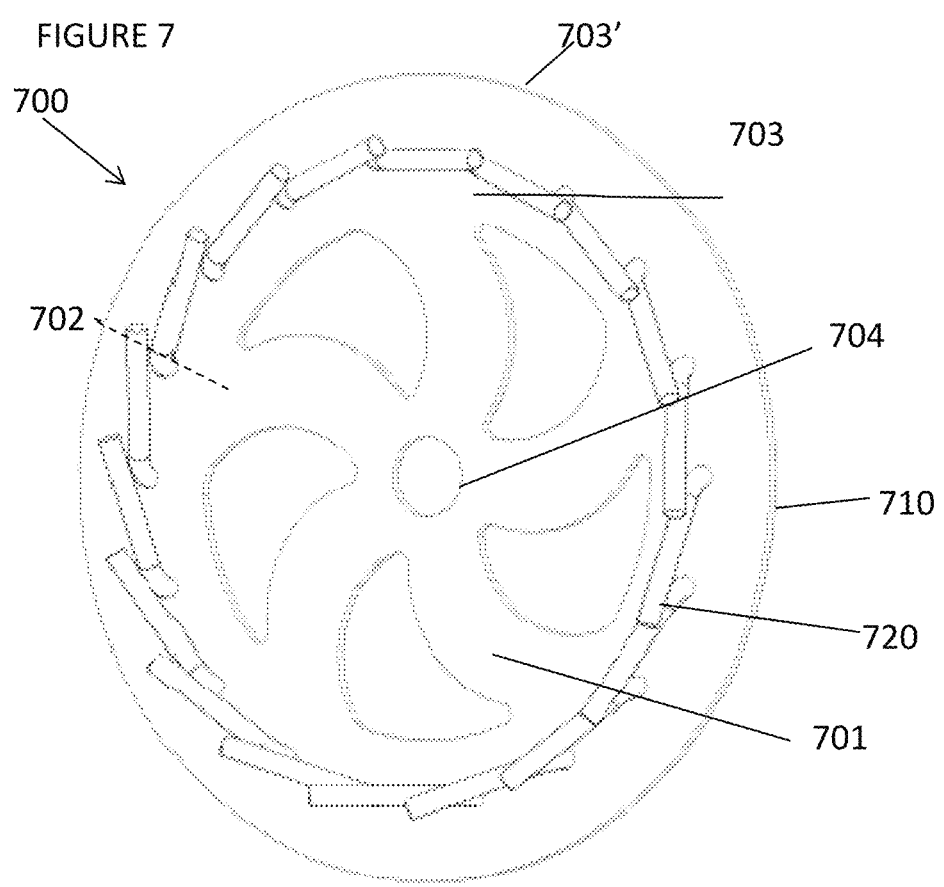

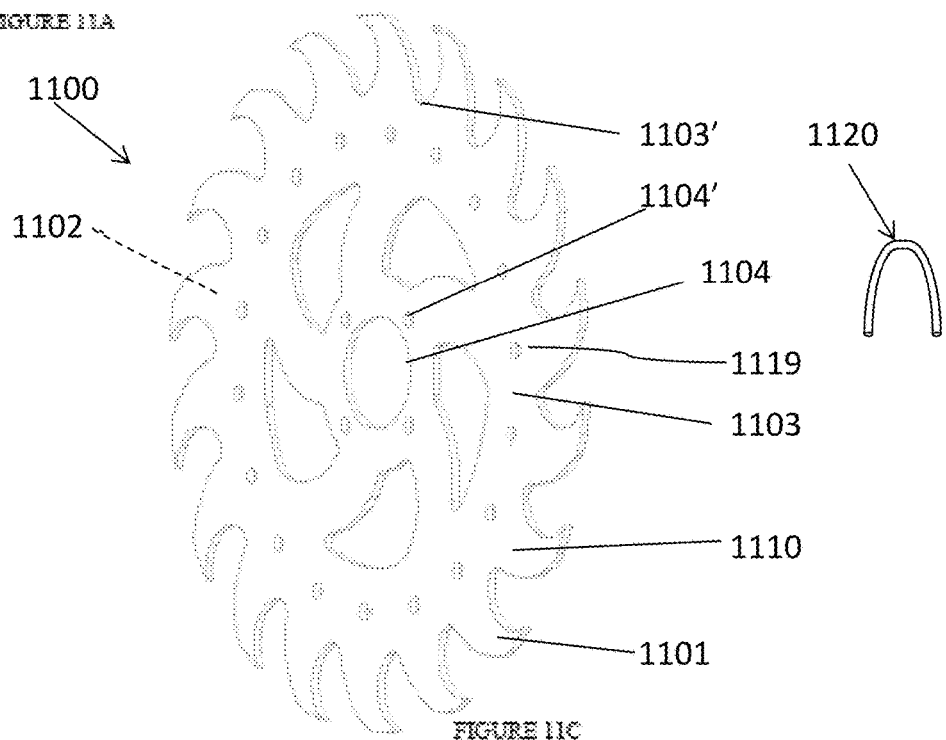
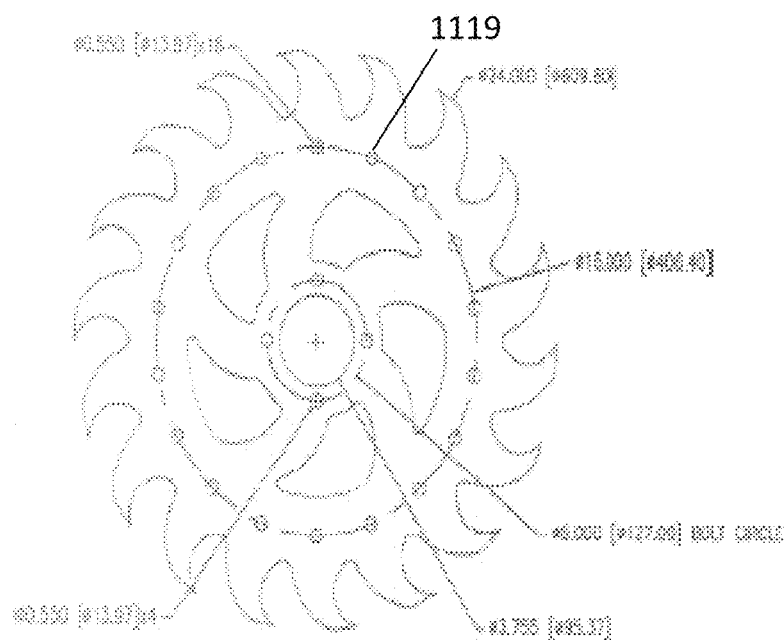

FIGURE 12A
1200
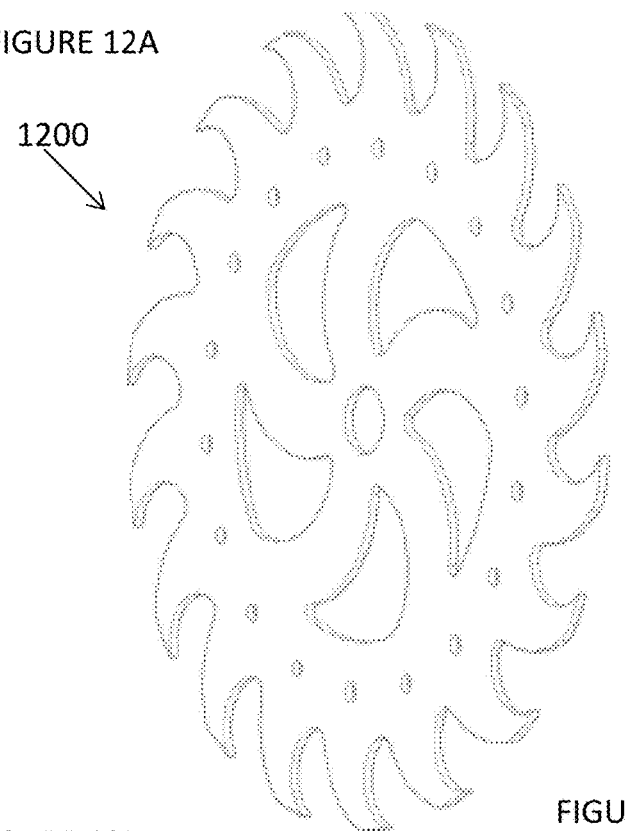
FIGURE 12B
FIGURE 12C
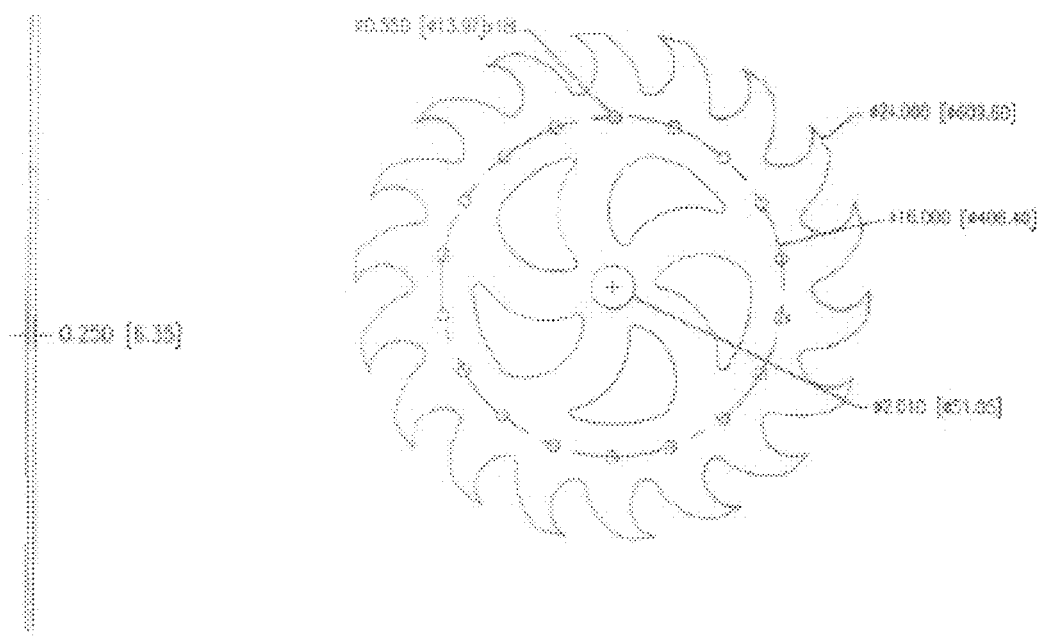

1300

1400

FIGURE 15A
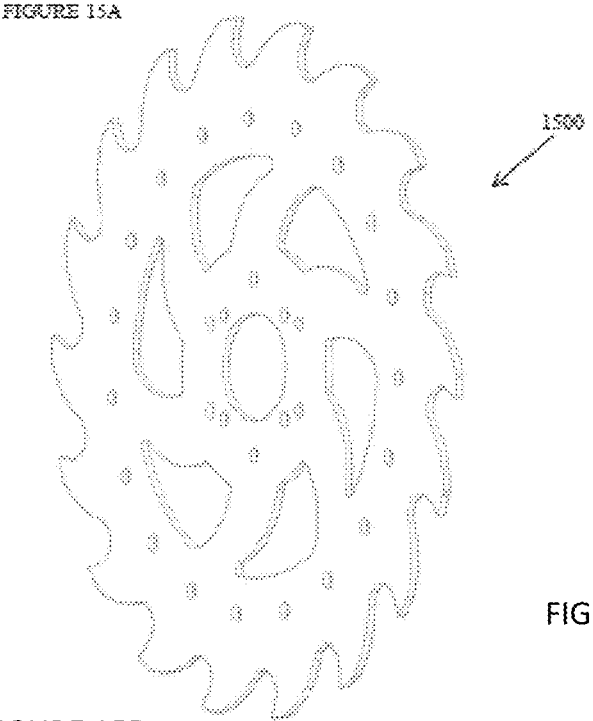
FIGURE 15B
FIGURE 15C
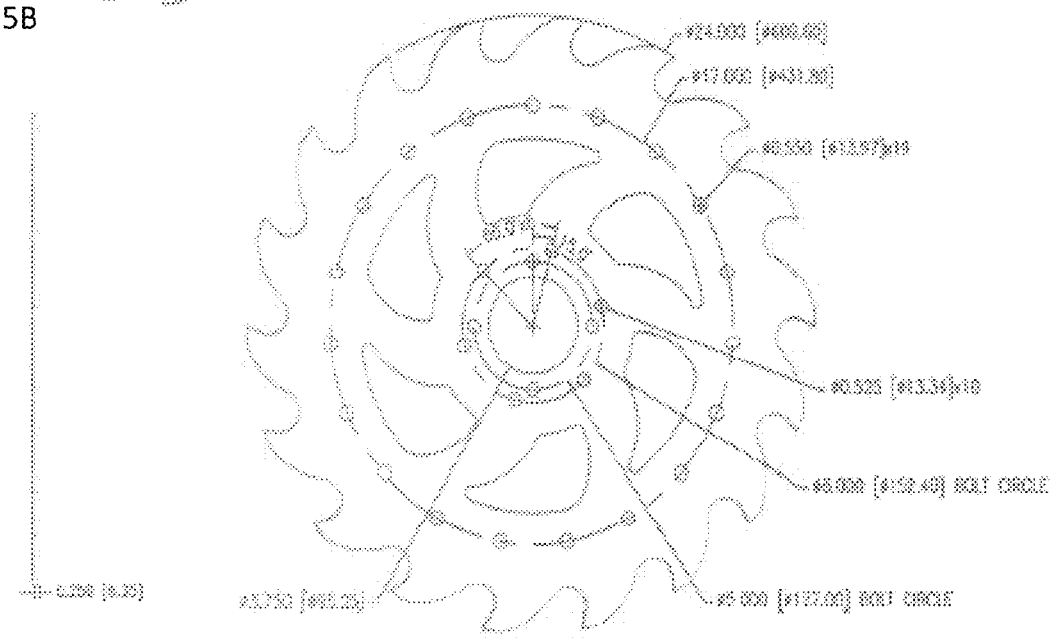

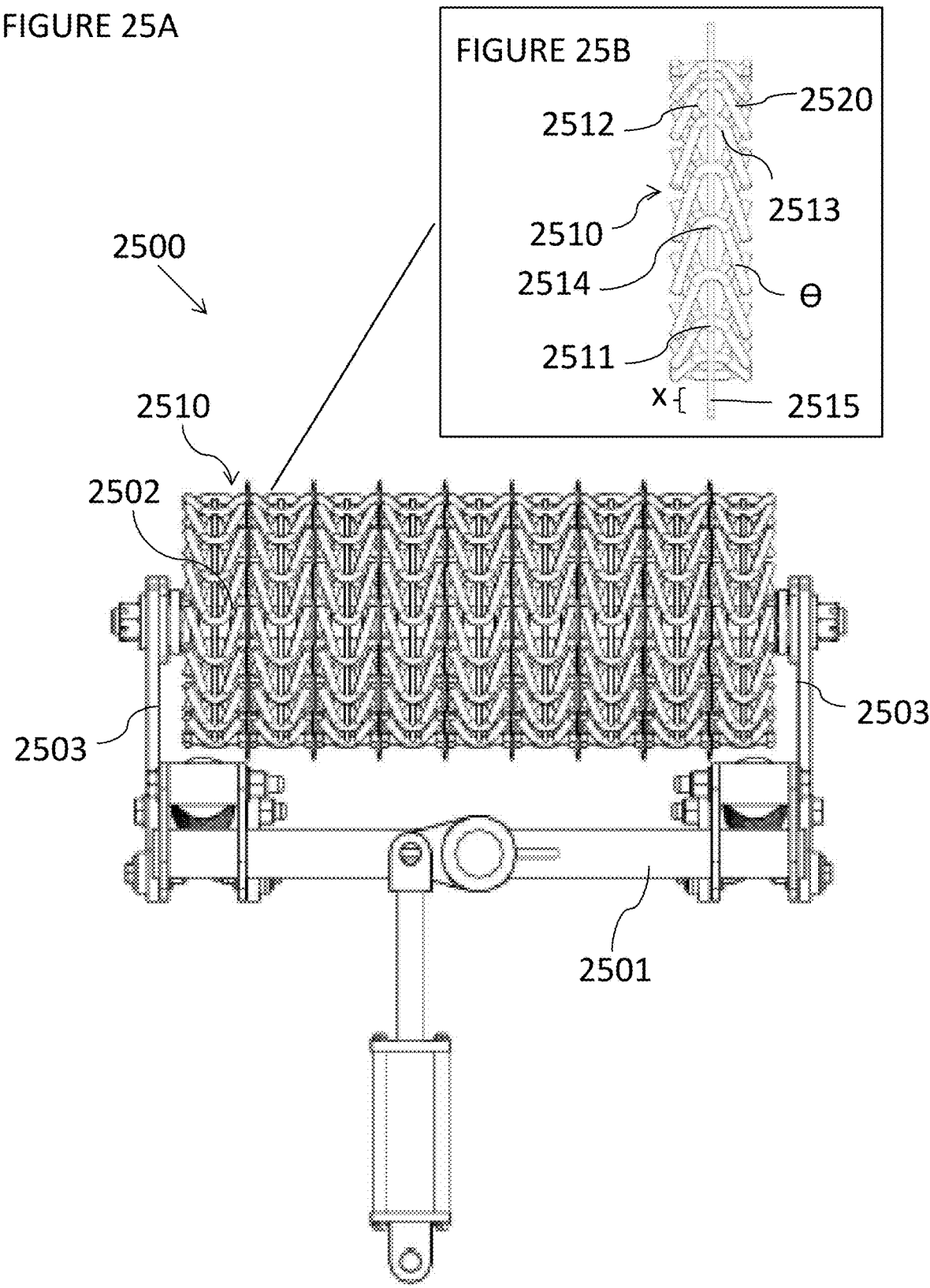

FIGURE 30B
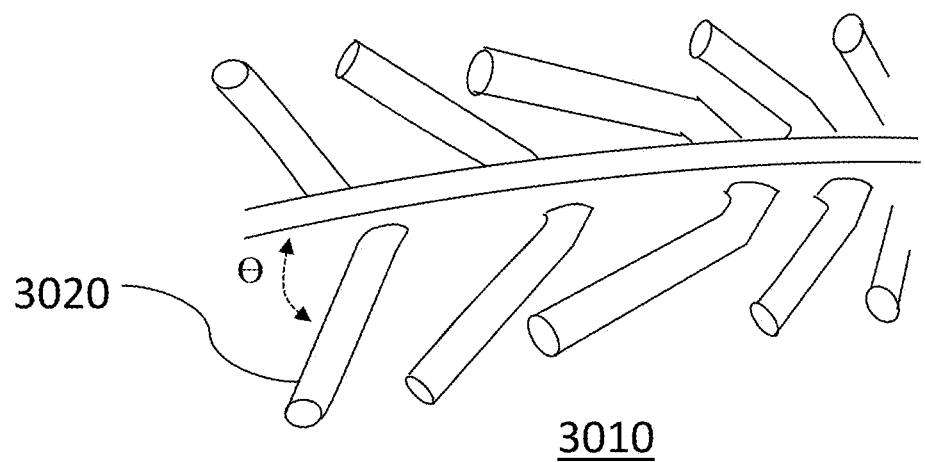
3020
3010
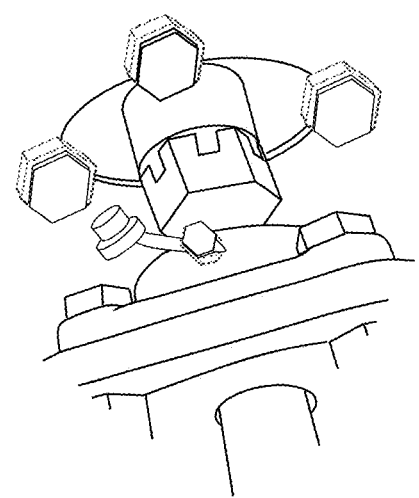

3310

3310

3410

3410

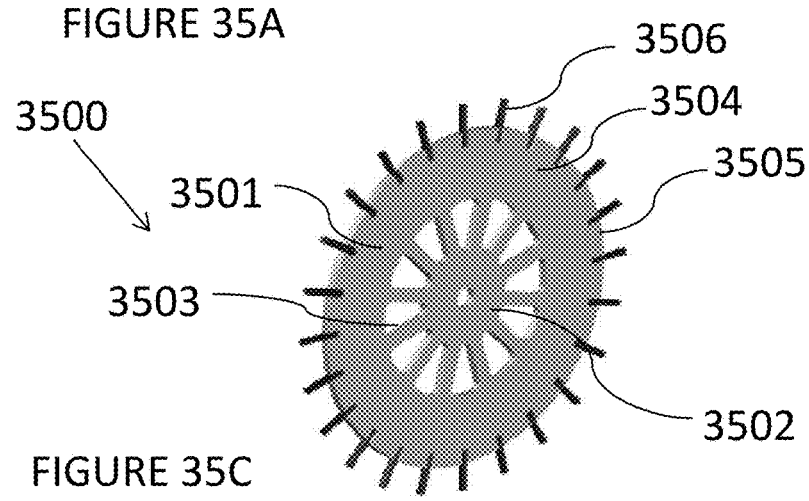
FIGURE 35A
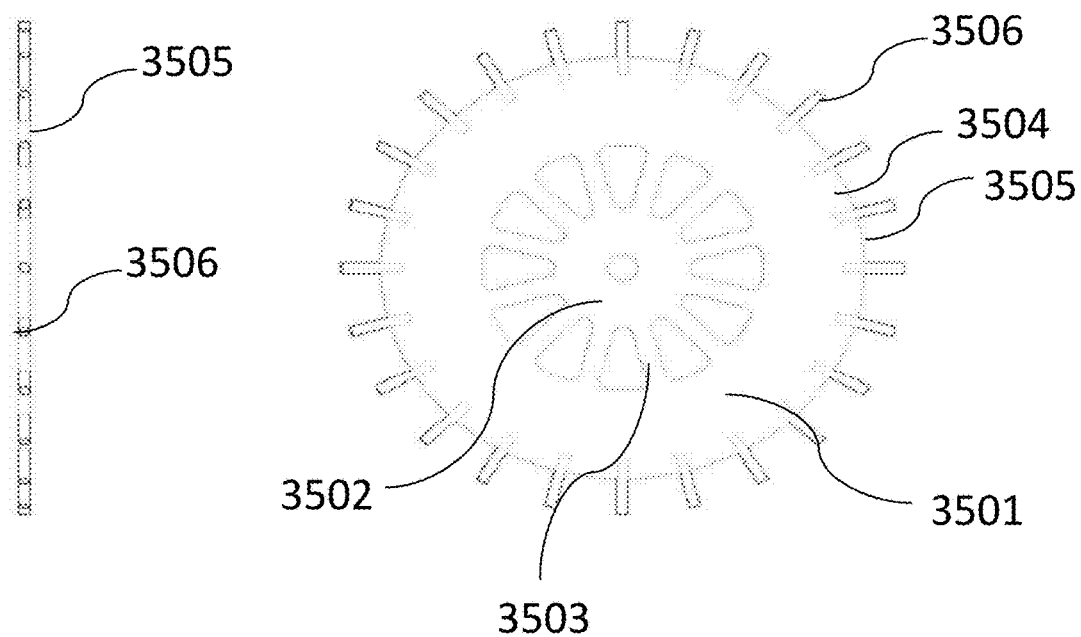
FIGURE 35B
FIGURE 35C

ROTARY HARROW DISKS AND DEVICES

RELATED U.S. APPLICATION DATA

This nonprovisional patent application claims the benefit of provisional application Ser. No. 62/459,907 filed Feb. 16, 2017 entitled "Rotary Harrow Disks and Devices", the disclosure of which is hereby incorporated in its entirety by reference thereto.

FIELD OF THE INVENTION

This invention relates to disks and devices for agricultural implements; and, more particularly, to disk blades having applications with rotary leveling and tilling harrow devices.

DESCRIPTION OF THE PRIOR ART

Current methods of soil leveling, berm building, soil firming and residue distribution behind agricultural tillage tools consist of rotating tine harrows, rotary rings of steel in multiple types of circumference sizes and shapes, rotary beater bars consisting of metal blades which are curved or straight and rotary baskets which suspend chains between the rotating end caps. All of these methods seek to smooth out, level and/or build raised berms, evenly distribute soil and residue and to crush/break clods thereby decreasing soil aggregate size.

At this time, these current methods are unable to either handle large amounts of GMO crop residue and/or require excessive down pressure force which creates compaction of the underlying soil zone. In damp or muddy conditions, the present rotary technology can slide, which can lead to build up of soil and or residue. This eventually leads to plugging of the device and necessitates the suspension of tillage operations until conditions improve to allow operation of presently designed harrows.

Various examples of tillage tools, harrow disks and/or harrow devices heretofore disclosed and utilized are provided below:

U.S. Pat. No. 2,416,742 to Farr discloses harrow disks and particularly to a method and apparatus for heat treating steel disks for harrows and similar uses.

U.S. Pat. No. 4,174,756 to De Haai discloses a self-propelled disk harrow having four gangs of disc members attached thereto which are rotated to propel the disk harrow and to thereby till the soil. Wheels are provided for allowing the disk harrow to travel on public roads and to aid in propelling the disk harrow. When the disc members extend too far into the soil or otherwise become ineffective in propelling the disk harrow owing, for example to the presence of wet or sandy soil, the weight of the disk harrow transfers to the wheels and the wheels tend to primarily propel the disk harrow U.S. Pat. No. 4,305,272 to Johnson discloses agricultural discs that are given a hardened annular ring by providing a differential heat treatment. During the heat treatment step an annular ring of heat conductive material is placed on the outer periphery of the disc. This ensures that the outer edge is of greater hardness than the central portion of the disc U.S. Pat. No. 4,739,745 to Browning discloses an improved diamond abrasive saw blade comprising a steel disc having a plurality of slots and resultant projections at its periphery and a plurality of 'L' or 'T' shaped cutting segments affixed alternatingly in line inversed to each other at the disc periphery. Also described is a method of retrofitting prior art worn out used blades with novel cutting segments.

U.S. Pat. No. 5,018,276 to Asada discloses a tooth structure of a rotary saw blade that includes a plurality of teeth arranged circumferentially on the peripheral portion of a disc-like base plate. Each of the teeth is trapezoidal in side view. The top surface of each of the teeth is generally rectangular or exposed to the outside, while the remaining surfaces are coated with ultra-hard abrasive grains.

U.S. Pat. No. 5,297,637 to Rowlett discloses an agricultural tool including a disc blade incorporating hard wear resistant inserts for attachment to an axial member of an agricultural tool for rotation through the soil. The disc blade includes parallel spaced flat round front and rear surfaces having a central cylindrical opening. The front surface tapers radially outwardly to the rear surface thereby defining a common outer rim having a knife edge. A plurality of notches are spaced circumferentially along the front surface of the disc blade and inwardly from the outer edge of the front surface of the disc blade. The notches are configured to receive a plurality of hard wear resistant inserts to provide improved wear resistance.

U.S. Pat. No. 5,429,016 to Rowlett discloses an agricultural tool including a disc blade that incorporates hard wear resistant inserts. Each of the inserts is attached to an axial member of an agricultural tool for rotation through the soil. The disc blade includes parallel spaced flat round front and rear surfaces having a central cylindrical opening. The front surface tapers radially outwardly to the rear surface thereby defining a common outer rim having a knife edge. A plurality of notches are spaced circumferentially along the front surface of the disc blade and inwardly from the outer edge of the front surface of the disc blade. The notches are configured to receive a plurality of hard wear resistant inserts to provide improved wear resistance.

U.S. Pat. No. 6,206,116 to Saxman discloses a rotary cone drill bit provided with at least one cutter cone assembly. The cutter zone assembly has a machined cutting structure which will maintain an effective cutting profile despite abrasion, erosion and/or wear of the associated cutting elements. The machined cutting structure may be formed on a generally cone-shaped blank by a series of lathe turns and/or plunge cuts. The cutting elements may be formed with an aggressive cutting profile. For one application, the crest of each cutting element has the general configuration of an ogee curve. A layer of hardfacing material may be applied over all or selected portions of the machined cutting structure.

U.S. Pat. No. 7,194,933 to Zhu, et al. discloses a substantially circular slicer knife having an interior base portion made of a first material and an outer edge portion made of a second material. The outer edge portion is metallurgically bonded to the interior base portion.

U.S. Pat. No. 7,631,702 to Hansen discloses to a double-coated sintered composition on a hard-faced disk blade for agricultural use as a rotary knife blade of a farm implement termed a harrow. The sintered hard-faced composition is applied to both the concave and convex sides of the rotary harrow disk blade to provide protection against soil abrasion and wear.

There remains a need in the art for rotary technology that can till large amounts of GMO crop residue without requiring excessive down pressure force that creates compaction of the underlying soil zone. There additionally remains a need in the art for rotary technology that avoids build-up of soil and/or residue that eventually leads to plugging of the device and necessitates the suspension of tillage operations until conditions improve to allow operation of presently designed harrows.

SUMMARY OF THE INVENTION

The present invention provides a disk blade having a plurality of side mounted fingers or appendages extending therefrom that provide rotary technology especially well suited to till large amounts of GMO crop residue without requiring excessive down pressure force which creates compaction of the underlying soil zone. The subject blade or disk rotary technology avoids build-up of soil and/or residue, the presence of which eventually leads to plugging of the tillage device and necessitates the suspension of tillage operations until conditions improve to allow operation of conventional harrows.

In a first embodiment, a disk blade comprises an outer perimeter, a first side wall, a second side wall, and a central hub, wherein a plurality of fingers extend laterally at an angle Θ from said first side wall. The fingers preferably comprise metal round bars curved to form part of an elliptical geometry inserted at a perpendicular angle to a vertical angle of said disk blade, arranged at locations equidistant around said disk blade, and at a depth x from said outer perimeter of said disk blade. Preferably, the depth x is at least ≥one (1) inch.

In another embodiment there is provided a disk blade comprising a metal wheel. The metal wheel is comprised of a type of sharpened notched disk blade with a hub pattern and with fingers comprising metal round bars curved to form part of an elliptical geometry. These fingers are inserted at a perpendicular angle to the vertical angle of the blade. They are placed at locations equidistant around the blade and located within the bottom of the notches at a depth from the outer perimeter of the blade which is a minimum of 2 inches, so that there exist an equal number of notches and round bars.

Yet another embodiment provides a disk blade comprising a metal wheel comprised of a type of swept tooth disk blade such as a row cleaner swept in the direction of travel with a hub pattern and with fingers comprising metal round bars curved to form part of an elliptical geometry. The fingers are inserted at a perpendicular angle to the vertical angle of the blade, placed at points equidistant around the blade and located within the bottom of the tooth profile at a depth from the outer perimeter of the blade which is a minimum of 2 inches so that there exist an equal number of teeth and round bars.

Another embodiment provides a disk blade comprising a metal wheel comprised of type of swept tooth disk blade such as a row cleaner. The metal wheel is swept in the opposite direction of travel with a hub pattern and with fingers comprising metal round bars curved to form part of an elliptical geometry inserted at a perpendicular angle to the vertical angle of the blade. The fingers are inserted at points equidistant around the blade and located within the bottom of the tooth profile at a depth from the outer perimeter of the blade which is a minimum of 2 inches so that there exist an equal number of teeth and round bars.

Another embodiment provides a disk blade having a metal wheel comprised of a type of swept tooth disk blade such as a row cleaner. The metal wheel is swept in the opposite direction of travel with a hub pattern and with metal round bars curved to form part of an elliptical geometry inserted at a perpendicular angle to the vertical angle of the blade. Insertion points are placed equidistantly around the blade and located within the bottom of the tooth profile at a depth from the outer perimeter of the blade which is a minimum of 2 inches so that there exist an unequal number of teeth and round bars.

Another embodiment provides a disk blade having a multiplicity of metal wheels comprised of disk blades either round or notched or toothed with a hub pattern and with metal round or square bars curved to form part of an elliptical geometry. The metal round or square bars are inserted at a perpendicular angle to the vertical angle of the blade. Insertion locations are spaced equidistantly around the blade and located within the body of the blade at variable depths from the outer perimeter of the blade. With this arrangement, the round or square bars are welded or joined together in varying distances of proximity one to another in order to rotate in unison and to act as a wheel to compress the furrows between raised beds.

Another embodiment provides for a disk blade harrow system comprising a carrier having mounted thereon (i) a multiplicity of metal wheels having disk blades either round or notched or toothed with a hub pattern and with metal round or square bars curved to form part of an elliptical geometry inserted at a perpendicular angle to the vertical angle of the disk blade and inserted at locations equidistant around the disk blade and located within the body of the disk blade at variable depths from the outer perimeter of the disk blade having the round or square bars welded or joined together in varying distances of proximity one to another appointed to rotate in unison and to act as a wheel to compress the furrows between raised beds. Two or more of the disk blades are interconnected together by way of two or more flanges welded or joined near the outer perimeter of the disk blade, thereby forming a central frame or basket between interconnected disk blades. The outer perimeter of the blade having the round or square bars welded or joined together at varying distances of proximity to one another and the flanges forming interconnected disk blades adapted to rotate in unison and being appointed to act as a wheel or smasher to compress furrows between raised beds.

In another embodiment, a harrow system is provided comprising: a. one or more elliptical bars having a first set of multiplicity of metal wheels having a first set disk blades being round or notched or toothed with a hub pattern mounted thereon; b. one or more protruding mount bars extending laterally beyond the elliptical bars and having a second set of disk blades comprising multiplicity of metal wheels having disk blades being round or notched or toothed with a hub pattern mounted thereon; c. at least one of the first set or second set of disk blades comprising a combination of sharpened disk blades and dull disk blades, wherein the sharpened disk blades are appointed to cut crop residue on a soil surface upon contact as the round bars hold crop residue in place thereby sizing residue, wherein the dull blades are appointed to pinch and score crop residue thereby allowing for soil microorganisms to enter into crop residue and begin decomposition. A forward rotation geometry results from a combination of the one or more second set of disk blades beyond the elliptical bars to transfer kinetic energy of rotation into clods facilitating crumbling of soil clods into smaller aggregates, wherein as the disk blades rotate forward, they contact crop residue on a surface of the soil pushing the residue into the soil as the round bars stir and compress soil around the residue, wherein soil is scored upon rotation of the harrow blade when it comes into contact with untilled soil, wherein when operated at an angle to the direction of forward movement, the harrow wheel lifts and tills the soil.

The at least one of said first or second disk blade preferably comprises metal round or square bars curved to form part of an elliptical geometry inserted at a perpendicular angle to the vertical angle of the disk blade and inserted at locations equidistant around the disk blade and located within the body of the disk blade at variable depths from the outer perimeter of the disk blade having the round or square bars welded or joined together in varying distances of proximity one to another appointed to rotate in unison or at different speeds, and wherein the disk blades can run straight or at an angle at different speeds of tillage, and wherein soil is mixed as the round bars interact at a different angles to a plane of the soil lifting and mixing the soil. The two or more of the disk blades may be interconnected together by way of two or more flanges welded or joined near the outer perimeter of the disk blade thereby forming a central frame or basket between interconnected disk blades.

BRIEF DESCRIPTION OF THE DRAWING

The invention will be more fully understood and further advantages will become apparent when reference is had to the following detailed description of the preferred embodiments of the invention and the accompanying drawing, in which:

FIG. 1A shows a top plan view of an embodiment of the subject disk blade, wherein the blade has fingers on a tooth blade;

FIG. 1B shows a side view of the disk blade of FIG. 1A;

FIG. 1C shows a front top view of the disk blade of FIG. 1A;

FIG. 3A shows a top plan view of an embodiment of the subject disk blade, wherein the blade is formed having fingers on a saw tooth blade;

FIG. 3B shows a side view of the disk blade of FIG. 3A;

FIG. 3C shows a front top view of the disk blade of FIG. 3A;

FIG. 4A shows a top plan view of an embodiment of the subject disk blade, wherein the blade is formed having fingers on a saw tooth blade having a 4-hole mount;

FIG. 4B shows a side view of the disk blade of FIG. 4A;

FIG. 4C shows a front top view of the disk blade of FIG. 4A;

FIG. 7 shows a top plan view of an embodiment of the subject disk blade, wherein the blade is formed having fingers on a solid saw blade;

FIG. 11A shows a top plan view of an embodiment of the subject disk blade, wherein the blade is appointed to receive fingers through apertures on a saw tooth blade with center cut-outs having a 4-hole mount, representing a 24" Saw tooth trax blade 4-hole mount thru-holes at 16";

FIG. 11B shows a side view of the disk blade of FIG. 11A;

FIG. 11C shows a front top view of the disk blade of FIG. 11A;

FIG. 12A shows a top plan view of an embodiment of the subject disk blade, wherein the blade is appointed to receive fingers through apertures on a saw tooth blade with center cut-outs, representing a 24" Saw tooth trax blade 4-hole mount thru-holes at 16";

FIG. 12B shows a side view of the disk blade of FIG. 12A;

FIG. 12C shows a front top view of the disk blade of FIG. 12A;

FIG. 15A shows a top plan view of an embodiment of the subject disk blade, wherein fingers are appointed to be received through apertures on a saw tooth blade with center cut-outs having a 6-hole dual mount;

FIG. 15B shows a side view of the disk blade of FIG. 15A;

FIG. 15C shows a front top view of the disk blade of FIG. 15A;

FIG. 25A shows a top plan view of an embodiment of an adjustable stubble smasher agricultural implement assembled with an embodiment of the subject disk blades, wherein the blades have fingers on a tooth blade as in FIG. 1A;

FIG. 25B shows a side view of a disk blade in the assembly of FIG. 25A;

FIG. 26D shows a cross-section top side view of the assembly taken along m-m of

FIG. 26C, showing connection of the agricultural implement to the disk;

FIG. 29D shows a cross-section top side view of the assembly taken along w-w of

FIG. 29C, showing connection of the agricultural implement to the disk;

FIG. 30B shows a backside cross-sectional view taken along v-v of the disk assembly, showing a blade attached to the central basket two;

FIG. 35A shows a top aerial view of an embodiment of a bed recycler square tooth;

FIG. 35B shows a side plan view of the bed recycler square tooth;

FIG. 35C shows a top plan view of the bed recycler square tooth;

DETAILED DESCRIPTION OF THE INVENTION

Figure 2A:
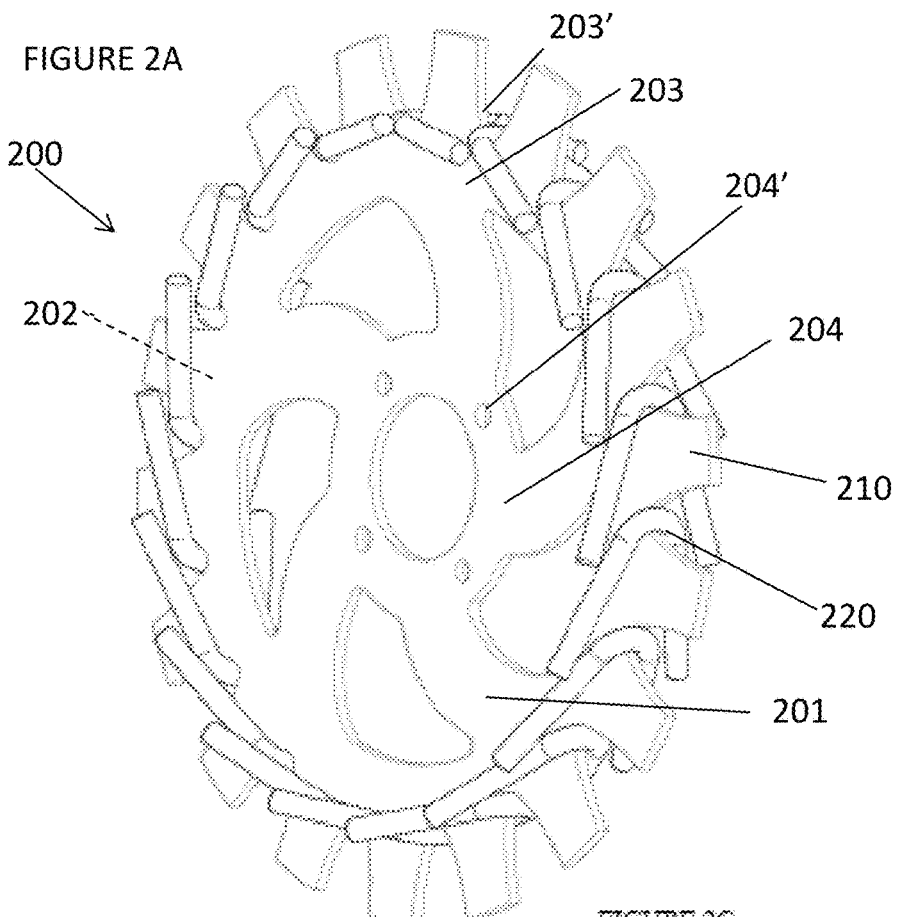
FIG. 2A shows a top plan view of an embodiment of the subject disk blade, wherein the blade is formed having fingers on a tooth blade having a 4-hole mount.

The subject invention provides a disk blade having a plurality of side mounted fingers or appendages extending therefrom providing rotary technology that can till large amounts of GMO crop residue without requiring excessive down pressure force which creates compaction of the underlying soil zone. The subject blade or disk rotary technology avoids build up of soil and/or residue which eventually leads to plugging of the device and necessitates the suspension of tillage operations until conditions improve to allow operation of presently designed harrows.

In a first embodiment, a disk blade is provided comprising an outer perimeter, a first side wall, a second side wall, and a central hub, wherein a plurality of fingers extend laterally at an angle Θ from said first side wall. The fingers preferably comprise metal round bars curved to form part of an elliptical geometry inserted at a perpendicular angle to a vertical angle of said disk blade, arranged at locations equidistant around said disk blade, and at a depth x from said outer perimeter of said disk blade. Preferably, the depth x is at least ≥one (1) inch.

In one embodiment of the present invention there is provided a metal wheel consisting of a type of flat round disk blade with a hub pattern and with metal round bars curved to form part of an elliptical geometry inserted at a perpendicular angle to the vertical angle of the blade and inserted at locations equidistant around the blade and at a depth from the outer perimeter of the blade which is a minimum of 1 inch.

A second embodiment of the present invention provides a metal wheel consisting of a type of sharpened notched disk blade with a hub pattern and with metal round bars curved to form part of an elliptical geometry. The bars are inserted at a perpendicular angle to the vertical angle of the blade at points equidistant around the blade and located within the bottom of the notches at a depth from the outer perimeter of the blade, which is a minimum of 2 inches, there then being an equal number of notches and round bars.

A third embodiment of the present invention provides a metal wheel consisting of a type of swept tooth disk blade such as a row cleaner. The wheel is swept in the direction of travel with a hub pattern and with metal round bars curved to form part of an elliptical geometry. The bars are inserted at a perpendicular angle to the vertical angle of the blade and placed at locations equidistant around the blade. The bars are located within the bottom of the tooth profile at a depth from the outer perimeter of the blade which is a minimum of 2 inches, there then being an equal number of teeth and round bars.

A fourth embodiment of the present invention provides a metal wheel consisting of a type of swept tooth disk blade such as a row cleaner. The wheel is swept in the opposite direction of travel with a hub pattern and with metal round bars curved to form part of an elliptical geometry. Each of the bars is inserted at a perpendicular angle to the vertical angle of the blade. The insertion locations are spaced equidistantly around the blade and located within the bottom of the tooth profile at a depth from the outer perimeter of the blade, which is a minimum of 2 inches, there then being an equal number of teeth and round bars.

A fifth embodiment of the present invention provides a metal wheel consisting of a type of swept tooth disk blade such as a row cleaner. The metal wheel is swept in the opposite direction of travel with a hub pattern and with metal round bars curved to form part of an elliptical geometry. The metal round bars are inserted at a perpendicular angle to the vertical angle of the blade. Insertion locations are placed equidistantly around the blade and disposed within the bottom of the tooth profile at a depth from the outer perimeter of the blade, which is a minimum of 2 inches, there then being an unequal number of teeth and round bars.

A sixth embodiment of the present invention provides a multiplicity of metal wheels consisting of disk blades that are either round or notched or toothed with a hub pattern and with metal round or square bars curved to form part of an elliptical geometry. The round or square bars are inserted at a perpendicular angle to the vertical angle of the blade. Insertion locations are at points equidistant around the blade and located within the body of the blade at variable depths from the outer perimeter of the blade so that the round or square bars are welded or joined together in varying distances of proximity one to another in order to rotate in unison and to act as a wheel to compress the furrows between raised beds.

In yet another embodiment, the disk blades are interconnected to one another with a central basket or surface extending therebetween for particular applications as stubble smashers. These interconnected disks have particular applications in raised bed agriculture. In any raised beds, such as with beds that have cane stools preset or may not, the interconnected disks with central basket gently but effectively sweep the various widths of the top of the bed in a rolling over motion, like a wave in the ocean sweeping into the water, and furrows (if desired). As much of the reside is cleaned off the top of the beds and is usually deposited into the water furrows to then pin the residue into the bottom and sides of that water furrow, which greatly speeds up the decomposition and turning what was unwanted carbon (residue) into useable humus that will continue to feed this newly created biological life, increase water retention and decrease runoff of harmful fertilizers and pesticides so the cane fields can be no longer burned prior to harvest. This technique is used in a variety of crops, for example, onion beds, green beans, etc., and to every bed size and shape and crop currently being grown with the same results and benefits.

POINT 1—As the subject interconnected disk blades sweep this residue, some growers do want the ability to take a little soil in this process to blend this soil with residue to get the present organic life mixed in the residue and to somewhat block the sunlight when pinned or not into the water furrows to speed up the decomposition rate. Therefore, the subject interconnected disk blades can readily be adjusted on the agricultural implement.

POINT 2—Others may want to sweep and take little to no soil across the top of the bed and deposit into the water furrows. Again, the subject interconnected disk blades can readily be adjusted on the agricultural implement to accommodate the desired soil profile. With various bed shapes, the subject agricultural assembly also allows the diameter of a sweeping blade gang design to match the shape, some may be all of equal diameter gangs or units but others could vary greatly in blade diameter.

Pinning residue into the water furrow generally takes place during sweeping utilizing the subject interconnected disks as follows: a very large diameter blade is run in the center of the water furrow to cut or pin the residue into the bed floor; then the cleaner or sweeper interconnected disk blades are used to blend residue to the left and right. In on embodiment, a leading left blade and a trailing right is tucked in behind that leading blade. Then a second set of the same as above are arranged leading right and trailing left. Then, if needed a 50/50 sweeping is arranged with the interconnected blades to clean the remaining residue, if needed, with one last time of pinning and blending. A second process that can be done is to just run three very large diameter blades of the subject invention staggered in the water furrows to cut or pin the residue that was just swept off the bed-top. Cutting the residue is not always desired. For example, a clean nice cut is not always desired; instead a dull pinning can be much more helpful for agricultural needs.

The description above may comprise two separate embodiments split with round or square bars and many different configurations of the bend in the bars.

There are multiple variations in which the shape of the bar bend as well as the bar attitude within the blade can be adjusted, paying attention to the placement of bars at different relationship to each other as in a staggered pattern in order to do more tillage/clod breakage, etc. The bars may be entered in an alternating pattern within the blade where one ellipse goes forward and the next goes backwards. A mix of round and square bars and a mix of bent and straight bars may be provided as the fingers of the subject disk blade. The fingers/bars may be formed having elevations of multiple sizes and shapes on the circumference of the bar such as the form of rebar for concrete.

A preferred embodiment of the present invention comprises any combination of the above embodiments that are constructed using a casting process wherein the center spoke wheel (a spoke being one of some number of rods radiating from the center of a wheel [the hub where the axle connects], connecting the hub with the round traction surface) and rotational attachment point would be a cast piece allowing for and having within its structure attachment grooves and fastening points which allow for separate cast elements to be attached to the center spooked hub. Within the embodiment, separate castings of aforementioned blade/tooth configurations would be attached to the center spoked hub. Likewise, separate castings of aforementioned finger/bars of various configurations would be attached to the same center spoked hub. In this embodiment, multiple configurations would be possible by use of a common spoked center casting. This embodiment would require a minimum number of unique center hub casting configurations within the spoked wheel. The center spoked wheel could be cast to allow for bearing insertion for mounting on a spindle or within a series of wheels where independent rotation vs. the other wheels is desired. The center spoked wheel could also be cast to allow for the insertion of a gang bolt, whether square or round, such that the spoked wheels could be mounted in series and rotate in unison.

In forward rotation the combination of the protruding blade beyond the elliptical bars transfers the kinetic energy of rotation into clods facilitating the crumbling of soil clods into smaller aggregates. The rotary harrow mixes the soil as the round bars interact at a different angle to the plane of the soil lifting and mixing the soil. As the blade portion of the harrow rotates forward, it contacts crop residue on the surface of the soil pushing the residue into the soil as the round bars stir and compress soil around the residue. Sharpened blades cut residue on the surface upon contact as the round bars hold the residue in place, thereby sizing residue. Dull blades pinch and score crop residue thereby allowing for soil microorganisms to enter into residue and begin the process of decomposition. Soil is scored upon rotation of the harrow blade when it comes into contact with untilled soil. When operated at an angle to the direction of forward movement, the harrow wheel lifts and tills the soil. When swept toothed blades are used and the swept tooth travels in the direction of forward motion, the swept tooth will displace soil as it rotates out of the ground. In all of the aforementioned, the components of the Rotary Harrow that come in contact with the soil could be hard surface coated with a product such as tungsten carbide to increase longevity and durability.

Fertilizers and/or Chemicals can be placed in the soil by use of a leading rotary harrow wheel in which bars are placed perpendicular to the vertical angle of the blade at a placement of a distance from the outside perimeter of the blade of 1 to 8 inches and used as an opening device to create the trench and control the depth of placement to inject or place fertilizers and/or chemicals directly behind the harrow wheel.

Placement of round, square or other geometric circumference bars can be used to control the depth of tillage blades when placed in such types of blades. The placement of bars allows use of the harrow wheel as an implement gauge to control the working depth of the entire machine as it engages the soil. The bars can be placed at variable widths and depths around the blade as well as variable angles to the plane of the blade and to themselves.

In the actions of tilling, mixing and residue pinning the harrow wheel levels the soil, settles the soil and alleviates air pockets in the soil.

When set at opposing angles to the direction of forward motion, the harrow wheel consolidates soil into a ridge. The harrow wheel, when operated in close proximity to tillage apparatus, acts as a rolling containment device which directs soil and residue in a path chosen by the angle and setting of the harrow in relationship to the tillage apparatus.

The harrow wheel can be placed to follow behind furrows made by planters, seeders and drills in which various seeds have been placed by planters, seeders and drills to close and firm soil around seeds with the use of one or two rotary harrow units set at opposing angles to each other and at an angular relationship to the seed furrow. Harrow wheels can be used to close and seal furrows/trenches left by the process of fertilizer, manure or chemical application by the placement of wheel(s) directly behind or slightly offset and run at angles of 0 to 5 degrees from center line of a furrow/trench.

Broadcast applications of Fertilizers and/or Chemicals can be incorporated by the use of multiple Rotary Harrow wheels in which the wheels are set closely together in multiplicity and operated at angles of 0 to 10 degrees from the direction of forward travel, allowing the protruding blade to interact with and mix the soil and fertilizer and/or chemicals. Depth control can again be achieved by the placement depth of the bars within the body of the blade. Different angles of placement of the bars to the body of the plane of the blade as well as the angle of placement with respect to the preceding or proceeding bar can be used to create different effects on the soil for mixing and/or firming.

When combined in a multiplicity of harrow wheels whether on a single fixed gang or by individual bearings on a single common axle and operated in the same forward direction as the tillage device, the harrow wheels can be used to crumble and level soil and distribute and pin residue behind primary tillage devices such as chisel plows, subsoilers, rippers and disks. When combined in a multiplicity of harrow wheels, whether on a single fixed gang or by individual bearings on a single common axle with two or more gangs or axles of harrow wheels and operated in the same forward direction as the tillage device, the harrow wheels can be used to crumble and level soil and distribute and pin residue behind primary tillage devices such as chisel plows, subsoilers, rippers and disks When combined in a multiplicity of harrow wheels, whether on a single fixed gang or by individual bearings on a single common axle and operated at an angle from 1 to 20 degrees off center line forward direction of the tillage device, the harrow wheels can be used to crumble, mix and level soil and distribute and pin residue behind primary tillage devices such as chisel plows, subsoilers, rippers and disks When combined in a multiplicity of harrow wheels, whether on a single fixed gang or by individual bearings on a single common axle with two or more row gangs or axles of harrow wheels and operated at an angle from 1 to 20 degrees off center line forward direction of the tillage device, the harrow wheels can be used to crumble, mix and level soil and distribute and pin residue behind primary tillage devices such as chisel plows, subsoilers, rippers and disks When combined in a multiplicity of harrow wheels, whether on a single fixed gang or by individual bearings on a single common axle and operated in the same forward direction as the tillage device, the harrow wheels can be used to crumble and level soil and distribute and pin residue behind minimum tillage devices such as vertical tillage machines, field cultivators, soil conditioners and strip-till units.

When combined in a multiplicity of harrow wheels, whether on a single fixed gang or by individual bearings on a single common axle with two or more gangs or axles of harrow wheels and operated in the same forward direction as the tillage device, the harrow wheels can be used to crumble and level soil and distribute and pin residue behind minimum tillage devices such as vertical tillage machines, field cultivators, soil conditioners and strip-till units.

When combined in a multiplicity of harrow wheels, whether on a single fixed gang or by individual bearings on a single common axle and operated at an angle from 1 to 20 degrees off center line forward direction of the tillage device, the harrow wheels can be used to crumble, mix and level soil and distribute and pin residue behind minimum tillage devices such as vertical tillage machines, field cultivators, soil conditioners and strip-till units.

When combined in a multiplicity of harrow wheels, whether on a single fixed gang or by individual bearings on a single common axle with two or more row gangs or axles of harrow wheels and operated at an angle from 1 to 20 degrees off center line forward direction of the tillage device, the harrow wheels can be used to crumble, mix and level soil and distribute and pin residue behind minimum tillage devices such as vertical tillage machines, field cultivators, soil conditioners and strip-till units.

When combined in a multiplicity of harrow wheels on a single fixed gang in which the harrow wheels are joined together by welding or some other recognized jointing operation of the bars and sized to fit within the furrows between raised beds, the harrow wheels act as a firming wheel in order to compress soils and remaining residue in the furrows after the furrows have been swept and/or tilled.

When combined in a multiplicity of harrow wheels, whether on a single fixed gang or by individual bearings on a single common axle or with two or more row gangs or axles of harrow wheels and operated at an angle from 0 to 10 degrees off center line of forward direction of the tillage device, the harrow wheels can be used to crumble and level soil for the construction of road ways and underlying substrate which could be found under hard surfaced roads.

When combined in a multiplicity of harrow wheels whether on a single fixed gang or by individual bearings on a single common axle, the multiplicity of harrow wheels can be used as an independent tillage tool to pull behind a tractor on its own consisting of a frame and tongue. This tillage tool may have a folding frame for facilitating wide equipment widths in transport down roads and or into field entry ways. The frame consists of a tongue apparatus to connect to a tractor draw bar or the rear of another implement which allows for the pulling of the tool in the same direction as the pulling unit be it a tractor or other implement. The mounting frame is perpendicular to the tongue or 90 degrees from the tongue. The tillage wheels can be mounted under, in front of or behind the frame(s) and can consist of 1 or more rows of tillage wheels on 1 or more rows of framing. The frame is raised and lowered by a set of wheels via hydraulic cylinder(s). These wheels can also be used to set the depth and amount of weight transferred to tillage wheels by use of stops placed on the hydraulic cylinder. The tongue length is changed longer or shorter depending on the width of the unit via a sliding extension hitch to which is attached a hydraulic cylinder(s) that causes the movement or by the use of the tractor attached to the tongue in a manual fashion to extend or retract the tongue's length. Lift wheels can be attached and located in front of, in the center of, or behind the frame depending upon the required configuration. The frame can be folded by use of hinges and hydraulic cylinders for road transport. Folding can be forward or rearward in order to accommodate very wide configurations. In very wide configurations, there may be more than one set of hinges to get the desired final folded width. Additionally, the hinges can allow the unit to flex and follow the ground contour.

The Rotary Harrow wheel(s) are preferably attached to frames via brackets: (i) having a way to relieve pressure from the interaction of the wheels to rocks or stones such as through the use of C-Springs, S-Springs, Angular and L-Shaped Springs, Coil Springs, Leaf Springs, Torsion Springs, Rubber Torsion Springs, Compression Springs or Pull Springs as well as Air Bags, Air Shocks, Hydraulic Cylinders and Accumulators, etc.; (ii) having an angle of adjustment of up to 10 degrees right and up to 10 degrees left of the direction of pull or being used at 0 degrees to the direction of pull; (iii) having Brackets to adjust up and down mechanically to adapt to changing field conditions or to adapt to different tool types and or required operational heights. Adjustment mechanism may consist of a gear and tooth design. Adjustment mechanism may consist of mounting holes in which a bolt is inserted; having Bearing Support and Axle to put wheels on for Gang type units with a minimum of 2 supports and 2 bearings per gang; having the ability to travel 6 inches minimum from the bottom of the stroke of travel to the top of the stroke of travel in order to clear buried or surface obstructions such as rocks; having a quick release receiver hitch to remove gang if not needed in some applications or to be moved to and attached to other tools; or mounted to its own independent frame to carry and transport separate from other tillage tools.

Tine type protrusions or spade teeth of various lengths, widths, diameters, tapers and configurations allow soil interaction for stirring, crumbling and pinning and or mixing of residue as well as soil distribution and lateral movement.

Angle of Attack: Preferred embodiment of the protrusions within the assembly is within a range of 45 degrees to 90 degrees with respect to the angle of attack towards the medium being worked (soil in most cases). The specific angle is dependent upon soil type and the type of tool in front of the rotary harrow wheel(s) and dependent upon the type of tillage being done whether primary or secondary.

Swept Angle: 45 degrees swept back from the vertical plane of the wheel is the preferred embodiment while also encompassing the Angle of Attack variations listed above. Note: show blades with both directions of travel. Reversed for more aggression as well. Wheel can be embodied with protrusions on only one side or only on the other as well as protrusions which are mirror imaged and congruent on both sides as well as offset from side to side in a range of + or −20 degrees. Protrusions can be of equal length or unequal length and can vary within a single side or both sides in a requiring pattern of longer and shorter lengths.

Diameters of Wheels: Wheels are preferably ranging in size from 8 inches in diameter to 24 inches in diameter.

Construction Variations: the subject disk/wheel or blade can be constructed in several variations. The disk/wheel can be cast as: 1) a single one-piece unit with a hub; 2) cast rings and separate hubs and blades; 3) cast rings, tines/lugs, separate hub and blades; 4) blade with attached fingers but no hub; 5) blade with attached ring of cast or metal fabricated lugs and no hub; 6) number 4 and number 5 with a hub assembly attached.

The disk/wheel may be formed as a stamped construction, including double stamped blades with or without waffles and or teeth with a separate hub of multiple diameters which is welded or fixed to the stamps to act as one complete unit which can then be attached in such a way as to allow for independent rotation or rotation in unison from a fixed point of rotation of the attached rum/hub.

A laminate construction may be utilized in forming the disk or blade. A central blade which consists of a minimum of three individual circular pieces of the same or differing diameters is provided, composed of metal which is of a hardness between 40 and 60 Rockwell. The material used for the laminates could be something other than metal such as a ceramic or plastic. The preferred embodiment would consist of 2 circular pieces of the same diameter and a third piece of a diameter smaller than the other 2. This smaller diameter piece would be sandwiched between the two larger pieces wherein the center of each piece aligns so as to have a channel between the 2 outer pieces that has a floor which is the outside edge of the $3^{rd}$ smaller piece. The two outer pieces would also have holes punched or cut within the outside perimeter at a position ½ the distance of which is the distance between their respective outside diameters and the outside diameter of the smaller $3^{rd}$ center piece. The holes would be equidistant around the parameter of the two outside pieces and aligned so as to create a fixing/binding mechanism for the insertion of various tooth designs. These 3 pieces of material would be joined together by use of Huck Rivets or welded together using spot welds or seam welds. This circular Laminate would then have either a round hole or square hole punched or cut in its center to accommodate a shaft or square rod on which to be mounted to allow for rotation of the shaft or rod. The center of the Laminate can also be stamped out or cut to allow for the insertion of a hub which consists of one or more bearings to facilitate rotation of the entire construction.

Within the blade/wheel, holes can be stamped or cut to allow the insertion of protrusions of various design and construction. There can also be attached threaded receiver nuts which allow for the attachment of the protrusions to the wheel thus allowing for the changing of protrusions should they break or a desire exists to change the type of protrusion being used.

Various tooth designs and configurations would be made from a single layer or multiple layer laminate in similar fashion as described above. The teeth could be sharp or dull. The teeth would be formed as to have a width on the lower portion which would fit snuggly into the channel formed within the outer diameter of the central blade and have holes punched or cut within the lower section to match the diameter and spacing as well as the curvature of the center wheel's construction to fit and to be attached using Huck Rivets or Nuts and Bolts. The preferred embodiment of these teeth would consist of multiple pieces each containing between 1 and 4 teeth as a single unit with curvature which could be accepted by and affixed to the center blade thus allowing for the changing of broken teeth, combining of different styles of teeth on a single wheel or changing the type of teeth on the entire wheel.

Various finger and blade configurations are contemplated, including (for non-limited example): waffles, fluted, rippled, turbo-till, Vortex, notched coulter, toothed coulter, smooth coulter; Different teeth styles; Different finger arrangements; Finger material shapes; Fabricated steel plates. Preferred embodiments of the blade include configurations wherein there is a break in the outside radius of the blade. It has been found that the longer the better as to the distance between breaks as well as angles. Independent and fixed gangs are contemplated. For example, fixed to a tool bar and fixed to an example of some type of tillage tool: Plows; Rippers; Primary tillage tools; Secondary tillage tools; Vertical tillage; Lateral tools/Disks; Strip-till units; and Bedding equipment/raised beds. Further iterations adapted for use of the subject disk blade contemplated include: Self-contained stand-alone units of nothing but harrow blades in a tool; Row cleaner and closing wheels; Sealer for anhydrous; and Gauge wheels.

Mounting location of the fingers varies from a distance x from the outermost perimeter of the blade, wherein x is at least 0.25 inches from the outermost perimeter of the blade. The depth or length of the fingers varies; preferably the fingers have a length or depth ranging from 0.5 inches to 4 inches. Preferably there are at least eight fingers per blade. Blade thickness preferably ranges from 2 mm to 10 mm. The finish of the edge of the fingers may be blunt or may include rounded or bladed edges. Preferably each finger is approximately 1 inch wide to not only pinch seed trench shut but to crumble resultant ribbon thereby eliminating crusting, smashing air out of the trench, sealing, disrupting things in strip-till, mulching, and sizing of clods and material. The blade may be constructed as two stamped pieces glued together with machined waves etc. put into the blade portion of the stampings or with bubbles stamped out.

Another embodiment of the present invention provides a multiplicity of metal wheels consisting of disk blades, either round or notched or toothed with a hub pattern and with metal round or square bars curved to form part of an elliptical geometry. The bars are inserted at a perpendicular angle to the vertical angle of the blade. Insertion locations are equidistant around the blade and disposed within the body of the blade at equal depth from the outer perimeter of the blade with the round or square bars welded or joined together to the blade. This embodiment would be for use in raised beds where the multiplicity of rotary harrow wheels would operate from the outer edges of the raised bed all the way across the top of the raised bed. This embodiment would consist of larger diameter rotary harrow wheels on the outside edges of the raised bed and with smaller diameter rotary harrow wheels across the top of the raised bed, thus allowing the full assembly to adhere to the raised bed to aid in the forward progress of the machine in staying exactly on the raised bed and not drifting off of this raised surface. Additionally, the relationship of the rotary harrow wheels alignment to the direction of travel could be set from 0 degrees to 20 degrees to either do minimal soil movement or to aggressively move soil in an angle opposed to the direction of travel. Additionally, it is sometimes desired that soil be moved either to the center of the raised bed or to the edges of the raised bed to accomplish a reshaping of the raised bed to facilitate drainage, irrigation and planting. In a preferred embodiment of this functionality, e the outside two rotary harrow wheels would be set at 0 degrees to the direction of travel. Then one half of the remaining rotary harrow wheels would be set at a range of 1 to 20 degrees which would move soil from left to right and the other one half of the remaining rotary harrow wheels would be set at a range of 1 to 20 degrees, which would move the soil from right to left.

Further, the rotary harrow wheels between the larger diameter outside wheels could be of differing diameters to create a mixing effect caused by different rotational speeds of the various diameter wheels within a single gang.

Design changes per tillage tool, soil type and residue levels. These configurations would apply to rotary harrow wheels upon fixed gangs or on shafts that allow for independent rotation of the individual harrow wheels:

Primary Tillage Tools: Uses larger diameter blades. Within the blade designs, for this application, more aggressive teeth patterns are desirable as well as a longer tooth length which protrudes beyond the insertion circle of the bars. This applies to all construction configurations of the rotary harrow wheels. Tools Applicable to this Application: Rippers; Disk chisels; Disk Rippers; Chisel Plow; Strip Till; Heavy Disk/Offset; Short Coupled Disk.

Spring Tillage Tools contemplated include use of smaller diameter blades. Within the blade designs, for this application, standard, less aggressive, teeth patterns are desirable as well as shorter tooth lengths which protrude beyond the insertion circle of the bars. This applies to all construction configurations of the rotary harrow wheels. Tools applicable to this application: Disk; Vertical tillage; Field Cultivator; Soil Conditioner; Narrow-Angle Disk; Bed Conditioners; Short Coupled Disk; Rotary Tiller.

Configurations when sizing of residue is required: Light Residue such as bean stubble, wheat stubble, small vegetable crop residue, etc.: Smaller blade, less aggressive tooth as well as bar configuration: Bar configurations would be shorter with less aggressive angles of attack; Teeth would protrude 1 to 2 inches above the bar circle; A sharpened blade would be the preferred choice; Blade diameter would be from 8 to 16 inches would be preferred.

Medium to Heavy Residue which requires sizing with a cutting blade such as cotton, corn stalks, milo, sorghum, vine crops. Larger blades, more aggressive tooth as well as bar configurations. Blade diameter would be from 12 to 22 inches would be preferred. Teeth would protrude 1 to 4 inches above the bar circle depending on crop type. A sharpened blade would be the preferred choice. Bar Configurations would be longer with more aggressive angles of attack.

Heavy Residue such as sugar cane, corn following corn, rye and other heavy grasses: Larger blades, more aggressive tooth as well as bar configurations: Blade diameter would be from 12 to 26 inches would be preferred; Teeth would protrude 1 to 4 inches above the bar circle depending on crop type; A sharpened blade would be the preferred choice; Example of which would be the Prescription Tillage Technology STI blade series; Bar Configurations would be longer with more aggressive angles of attack.

Configurations where erosion control is desired/required: In the above-described residue conditions, Light, Medium to Heavy and Heavy, the blade design would be that of an unsharpened nature in order to pin residue into the ground thereby securing it into the soil to prevent water and wind erosion. The preferred operating depth of the rotary harrow wheels is deeper for erosion control in order to cause the residue to be not only pinned by partially buried within the soil layers.

Configurations when it is desired to move soil and/or residue laterally: Blade teeth would protrude from 2 to 4 inches to provide more surface area for lateral movement. Rotary Harrow Wheels would be set at an angle of 0 to 30 degrees from the center line of forward movement. Bars would be at angles which would facilitate the Rotary harrow wheels to penetrate/settle further into the soil profile such as a vertical design rather than a swept back design.

Configurations when soil mixing is desired without lateral movement of soil: Blade teeth would protrude from 2 to 4 inches to provide more surface area for lateral movement. Rotary Harrow Wheels would be set in line with the forward movement of tillage tool. Bars would be at angles which would facilitate the Rotary harrow wheels to penetrate/settle further into the soil profile such as a vertical design rather than a swept back design Soil Types: Sand types (larger aggregates): More teeth are desirable; more horizontal pattern of the tooth rather than a back swept angle of the tooth; more of a perpendicular angle of the bar with respect to the face of the blade; more bars are desirable.

Medium Types (silty clay loam): Average amount of teeth are desirable; bar insert angle with respect to the blade face can be more sweeping to vertical; average amount of bars are desirable; many different tooth designs are acceptable here; tooth and insert angles must be designed to allow the soil to freely flow away from the rotary harrow wheels and not adhere to any part of them.

Heavy Soil Types (heavy clay and gumbo soil types): less teeth and bars; cleaning angles of teeth and bars; bigger, more open spacing to eliminate clogging of the wheels from the adhesive type soils.

FIG. 1A shows a top plan view of an embodiment of the subject disk blade, wherein the blade has fingers on a tooth blade, shown generally at 100. FIG. 1B shows a side view of the disk blade of FIG. 1A. FIG. 1C shows a front top view of the disk blade of FIG. 1A. Referring to FIGS. 1A-1C, disk blade 100 is provided comprising an outer perimeter 103 having an abutting substantially perpendicular shallow edge wall 103', a first side wall 101, a second side wall 102, and a central hub 104. Disk blade 100 is herein shown as a substantially flat round blade having a blade edge with teeth 110. Teeth 110 are shown herein as portions having a flat edge which edge may include an angle. A plurality of fingers 120 extend laterally at an angle $\Theta$ from the x-axis from the first side wall 101. The fingers 120 preferably comprise metal round bars curved to form part of an elliptical geometry inserted at a perpendicular angle to a vertical angle of the disk blade 100. Fingers 120 are arranged at locations equidistant around the disk blade, and at a depth x from the outer perimeter of the disk blade. Preferably, the depth x is at least ≥one (1) inch.

Disk blade 100 fingers 120 also extends rotationally from the x, y-axis or at a depth or rotation along the z-axis at an orientation angle $\Theta_2$ from edge wall 103' in relation to the side wall 101 and edge 103'. (See FIGS. 5 and 6). Fingers 120 may be formed as continuous inverted u or v-shaped members with a proximal end 120' with a length lp, central portion 120" and distal end 120''' with a length ld. Lengths lp and ld are preferably equal. With proximal end 120' extending from first side wall 101, central portion 120" resting or leveraging on edge 103' and distal end 120''' extending from second side wall 102 as shown in FIG. 1A-1C. In this manner, as the distance between proximal end 120' and distal end 120''' increases, the v or u becomes wider and consequently angle $\Theta$ from the x axis from the first side wall 101 increases. As the distance between proximal end 120' and distal end 120''' become less, angle $\Theta$ from the x axis from the first side wall 101 decreases so that the proximal end 120' and distal end 120''' of the fingers are closer to the side wall 101. The distance (d) between the finger 120 and side walls 101 (102), the lengths lp and ld, thickness of the fingers, and orientation angle $\Theta_2$ are variables that are determined based on agricultural factors such as soil type, soil moisture, soil profile (raised bed; flat bed; irrigation channels), geographical location, crop being planted, and agricultural application.

Figure 2B:
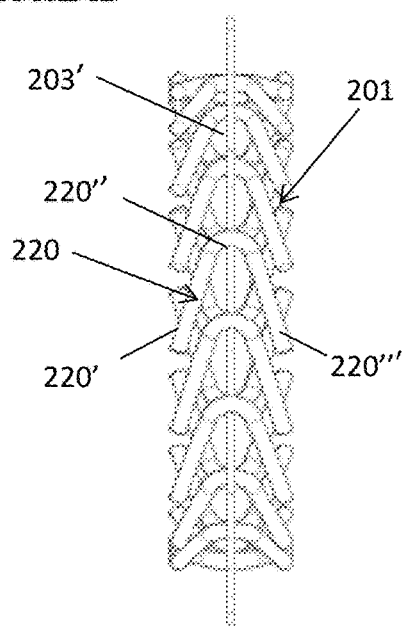
FIG. 2B shows a side view of the disk blade of FIG. 2A.
Figure 2C:
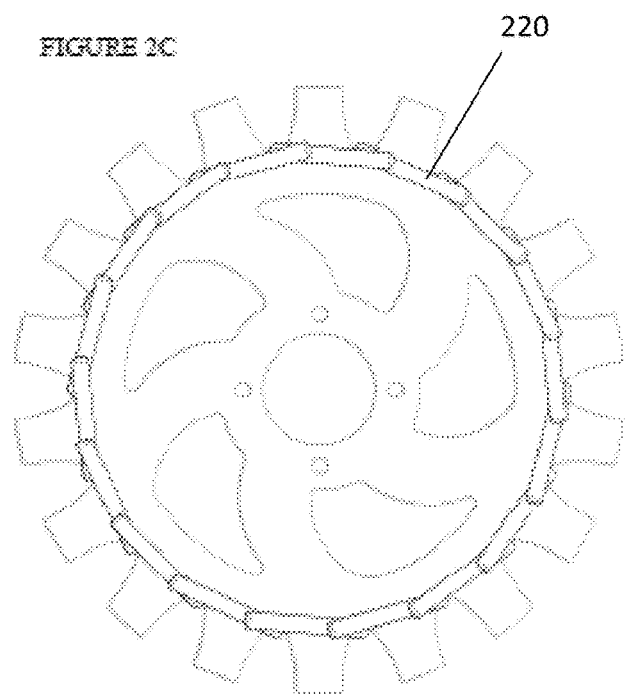
FIG. 2C shows a front top view of the disk blade of FIG. 2A.

FIG. 2A shows a top plan view of an embodiment of the subject disk blade, wherein the blade is formed having fingers on a tooth blade having a 4-hole mount. FIG. 2B shows a side view of the disk blade of FIG. 2A. FIG. 2C shows a front top view of the disk blade of FIG. 2A. Disk blade 200 is provided comprising an outer perimeter 203, a first side wall 201, a second side wall 202, a central hub 204, and a blade edge 203' with teeth 210. A plurality of fingers 220 extend laterally at an angle $\Theta$ from the x-axis from the first side wall 201. Disk blade 200 is generally constructed as discussed in FIGS. 1A-1C above. Fingers 220 may be formed as continuous inverted u or v-shaped members with a proximal end 220' with a length lp, central portion 220" and distal end 220''' with a length ld. Herein, central hub 204 includes apertures 204' for bolt attachment and adjustment on an agricultural implement or carrier.

FIG. 3A shows a top plan view of an embodiment of the subject disk blade, wherein the blade is formed having fingers on a saw tooth blade. FIG. 3B shows a side view of the disk blade of FIG. 3A. FIG. 3C shows a front top view of the disk blade of FIG. 3A. Disk blade 300 is provided comprising an outer perimeter 303, a first side wall 301, a second side wall 302, a central hub 304, and a blade edge 303' with teeth 310. A plurality of fingers 320 extend laterally at an angle $\Theta$ from the x-axis from the first side wall 301. Disk blade 300 is generally constructed as discussed in FIGS. 1A-1C above. Herein, teeth 310 are formed having curved edge walls 311a, 311b forming saw teeth.

FIG. 4A shows a top plan view of an embodiment of the subject disk blade, wherein the blade is formed having fingers on a saw tooth blade having a 4-hole mount. FIG. 4B shows a side view of the disk blade of FIG. 4A. FIG. 4C shows a front top view of the disk blade of FIG. 4A. Disk blade 400 is provided comprising an outer perimeter 403, a first side wall 401, a second side wall 402, a central hub 404, and a blade edge 403' with teeth 410. A plurality of fingers 420 extend laterally from the first side wall 401. Disk blade 400 is generally constructed as discussed herein. Teeth 410 are formed having curved edge walls 411a, 411b forming saw teeth, and central hub 404 includes apertures 404' for bolt attachment and adjustment on an agricultural implement or carrier.

Figure 5:
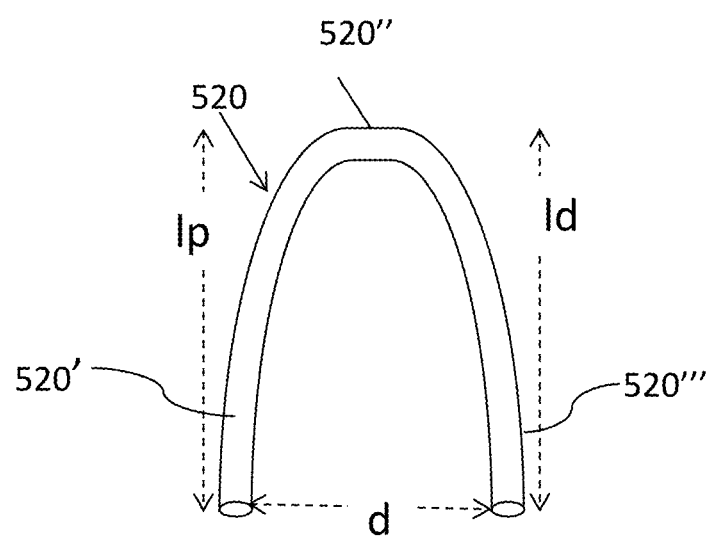
FIG. 5 shows a top plan view of an embodiment of a finger of the subject disk blade.
Figure 6:
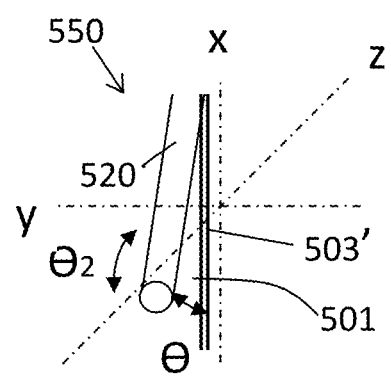
FIG. 6 shows an exploded view of the fingers of FIG. 5A in relation to the disk blade.

FIG. 5 shows a top plan view of an embodiment of a finger of the subject disk blade. FIG. 6 shows an exploded view of the fingers of FIG. 5A in relation to the disk blade. Referring to FIGS. 5 and 6, disk blade fingers 520 extends rotationally from the x, y-axis or at a depth or rotation along the z axis at an orientation angle $\Theta_2$ 2 from edge wall 503'. Fingers 520 may be formed as continuous inverted u or v-shaped members as shown with a proximal end 520' with a length lp, central portion 520" and distal end 520''' with a length ld. Lengths lp and ld are preferably equal. With proximal end 520' extending from first side wall 501, central portion 520" resting or leveraging on edge 503' and distal end 520''' extending from second side wall 502 (see FIGS. 1A-1C). In this manner, as the distance between proximal end 520' and distal end 520''' increases, the v or u becomes wider and consequently angle $\Theta$ from the x axis from the first side wall 501 increases. As the distance between proximal end 520' and distal end 520''' become less, angle $\Theta$ from the x-axis from the first side wall 501 decreases so that the proximal end 520' and distal end 520''' of the fingers are closer to the side wall 501. The distance (d) between the fingers 520 and side walls, the lengths lp and ld, thickness of the fingers, and orientation angle $\Theta_2$ are variables that are determined based on agricultural factors such as soil type, soil moisture, soil profile (raised bed; flat bed; irrigation channels), geographical location, crop being planted, and agricultural application.

Figure 8A:
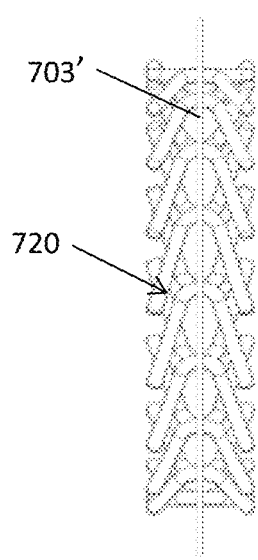
FIG. 8A shows a side view of the disk blade of FIG. 7.
Figure 8B:
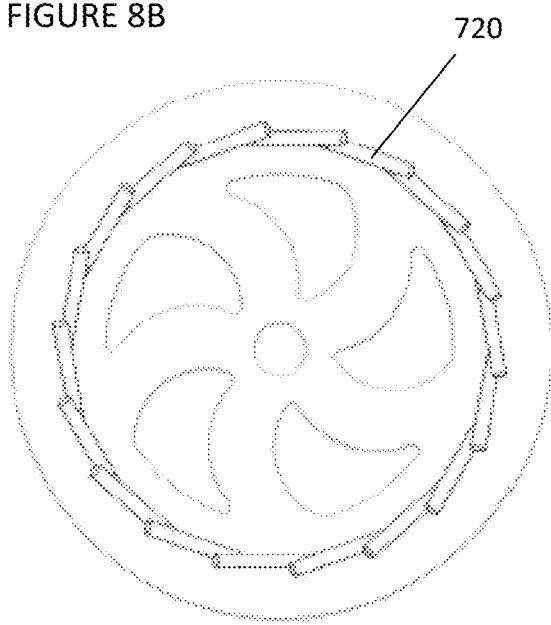
FIG. 8B shows a front top view of the disk blade of FIG. 7.

FIG. 7 shows a top plan view of an embodiment of the subject disk blade, wherein the blade is formed having fingers on a solid saw blade. FIG. 8A shows a side view of the disk blade of FIG. 7. FIG. 8B shows a front top view of the disk blade of FIG. 7. Referring to FIGS. 7-8B, disk blade 700 is provided comprising an outer perimeter 703, a first side wall 701, a second side wall 702, a central hub 704, and a blade edge 703' without teeth. A plurality of fingers 720 extend laterally from the first side wall 701 as discussed herein.

Figure 9:
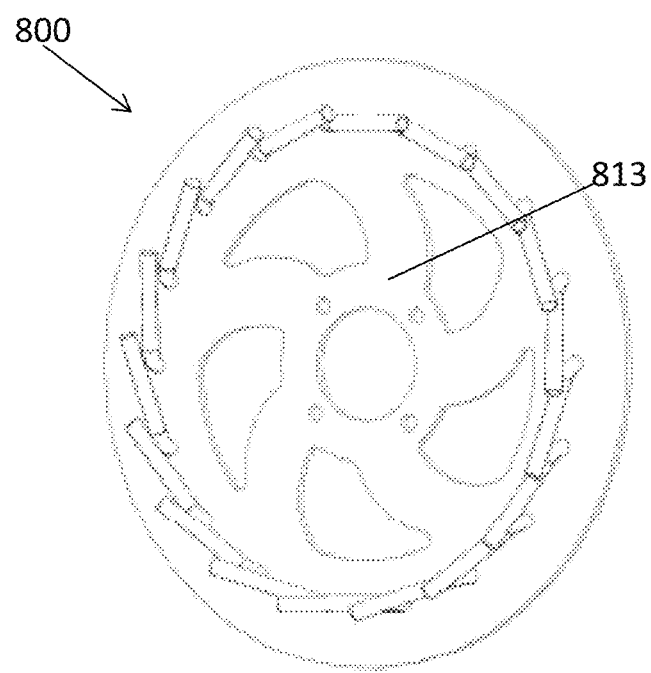
FIG. 9 shows a top plan view of an embodiment of the subject disk blade, wherein the blade is formed having fingers on a solid saw blade having a 4-hole mount.
Figure 10A:
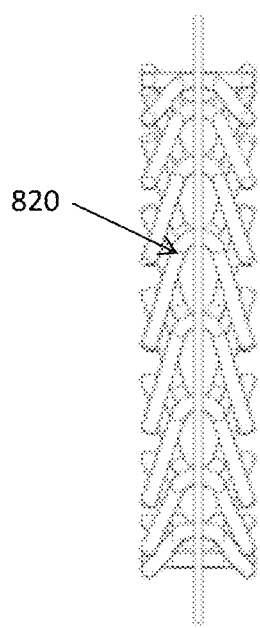
FIG. 10A shows a side view of the disk blade of FIG. 9.
Figure 10B:
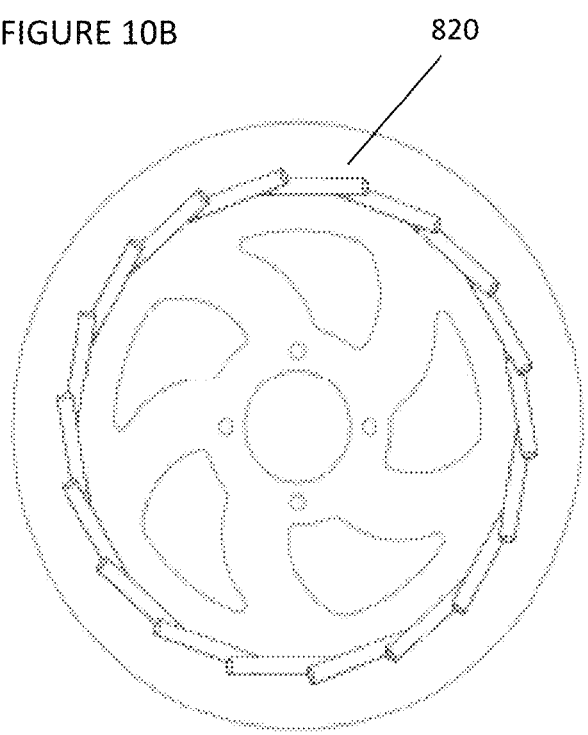
FIG. 10B shows a front top view of the disk blade of FIG. 9.

FIG. 9 shows a top plan view of an embodiment of the subject disk blade, wherein the blade is formed having fingers 820 on a solid saw blade having a 4-hole mount, shown generally at 813. FIG. 10A shows a side view of the disk blade of FIG. 9. FIG. 10B shows a front top view of the disk blade of FIG. 9. The blade is constructed as set forth generally above.

FIG. 11A shows a top plan view of an embodiment of the subject disk blade, wherein the blade is appointed to receive fingers through apertures on a saw tooth blade with center cut-outs having a 4-hole mount, representing a 24" Saw tooth trax blade 4-hole mount thru-holes at 16". FIG. 11B shows a side view of the disk blade of FIG. 11A. FIG. 11C shows a front top view of the disk blade of FIG. 11A. Disk blade 1100 is provided comprising an outer perimeter 1103, a first side wall 1101, a second side wall 1102, a central hub 1104, and a blade edge 1103' with teeth 1110. A plurality of finger apertures 1119 are provided which are adapted to receive fingers 1120 secured therein to extend therefrom laterally from the first side wall 1101. Herein, teeth 1110 are formed as saw teeth and central hub 1104 includes apertures 1104' for bolt attachment and adjustment on an agricultural implement or carrier.

FIG. 12A shows a top plan view of an embodiment of the subject disk blade, wherein the blade is appointed to receive fingers through apertures on a saw tooth blade with center cut-outs, representing a 24" Saw tooth trax blade 4-hole mount thru-holes at 16", shown generally at 1200. FIG. 12B shows a side view of the disk blade of FIG. 12A. FIG. 12C shows a front top view of the disk blade of FIG. 12A. The blade is configured generally as the blade shown and discussed in FIGS. 11A-11C.

Figure 13A:
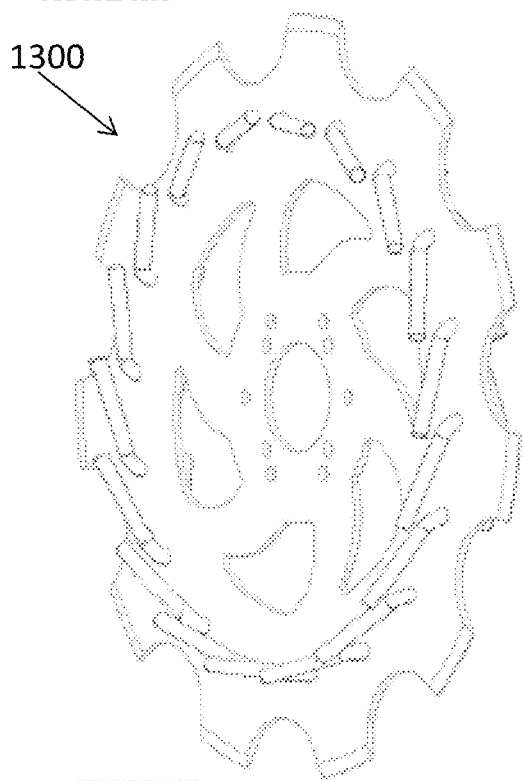
FIG. 13A shows a top plan view of an embodiment of the subject disk blade, wherein the blade includes fingers received through apertures on a tooth blade with center cut-outs having a 6-hole dual mount, representing a 26" center trax blade trax inserted 6-hole dual mount.
Figure 13B:
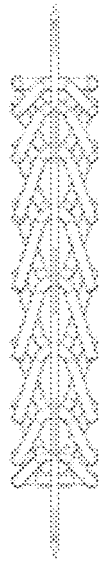
FIG. 13B shows a side view of the disk blade of FIG. 13A.
Figure 13C:
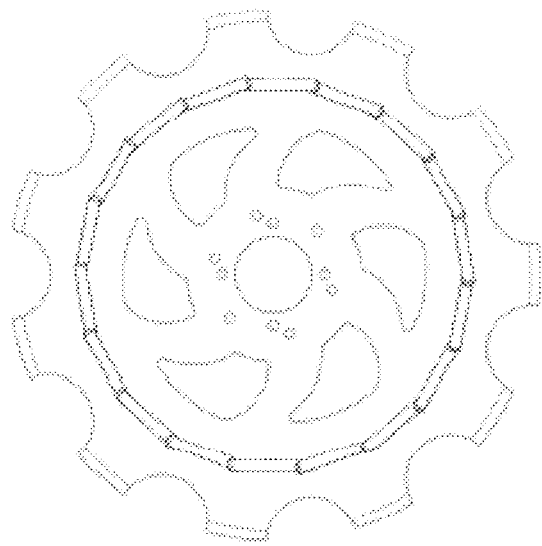
FIG. 13C shows a front top view of the disk blade of FIG. 13A.

FIG. 13A shows a top plan view of an embodiment of the subject disk blade, wherein the blade includes fingers received through apertures on a tooth blade with center cut-outs having a 6-hole dual mount, representing a 26" center trax blade trax inserted 6-hole dual mount, shown generally at 1300. FIG. 13B shows a side view of the disk blade of FIG. 13A. FIG. 13C shows a front top view of the disk blade of FIG. 13A. The blade is configured generally as the blade shown and discussed in FIGS. 2A-2C.

Figure 14A:
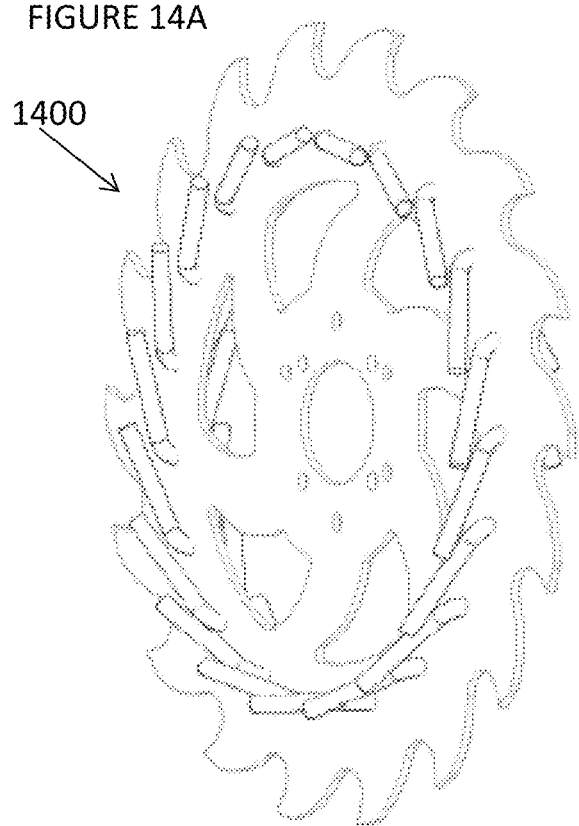
FIG. 14A shows a top plan view of an embodiment of the subject disk blade, wherein the blade includes fingers received through apertures on a saw tooth blade with center cut-outs having a 6-hole dual mount.
Figure 14B:
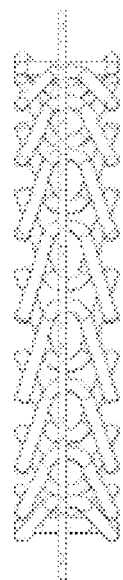
FIG. 14B shows a side view of the disk blade of FIG. 14A.
Figure 14C:
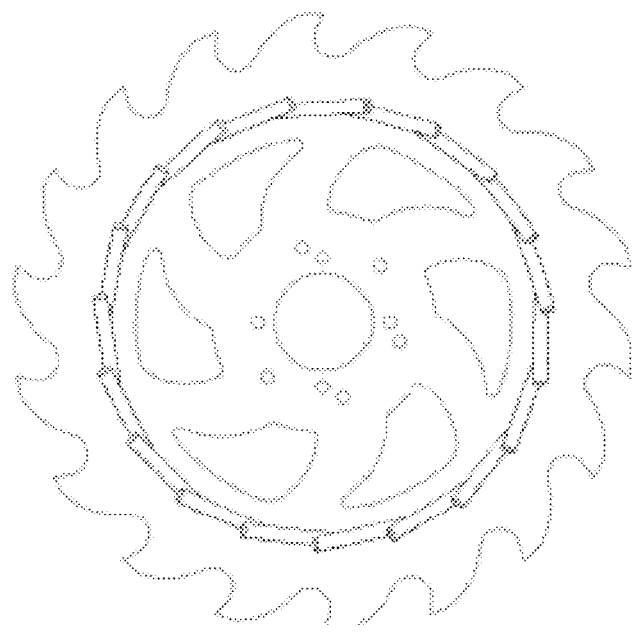
FIG. 14C shows a front top view of the disk blade of FIG. 14A.

FIG. 14A shows a top plan view of an embodiment of the subject disk blade, wherein the blade includes fingers received through apertures on a saw tooth blade with center cut-outs having a 6-hole dual mount, shown generally at 1400 FIG. 14B shows a side view of the disk blade of FIG. 14A. FIG. 14C shows a front top view of the disk blade of FIG. 14A. The blade is configured generally as the blade shown and discussed in FIGS. 4A-4C.

FIG. 15A shows a top plan view of an embodiment of the subject disk blade, wherein fingers are appointed to be received through apertures on a saw tooth blade with center cut-outs having a 6-hole dual mount, shown at 1500. FIG. 15B shows a side view of the disk blade of FIG. 15A. FIG. 15C shows a front top view of the disk blade of FIG. 15A. The blade is configured generally as the blade shown and discussed in FIGS. 12A-12C.

Figure 16:
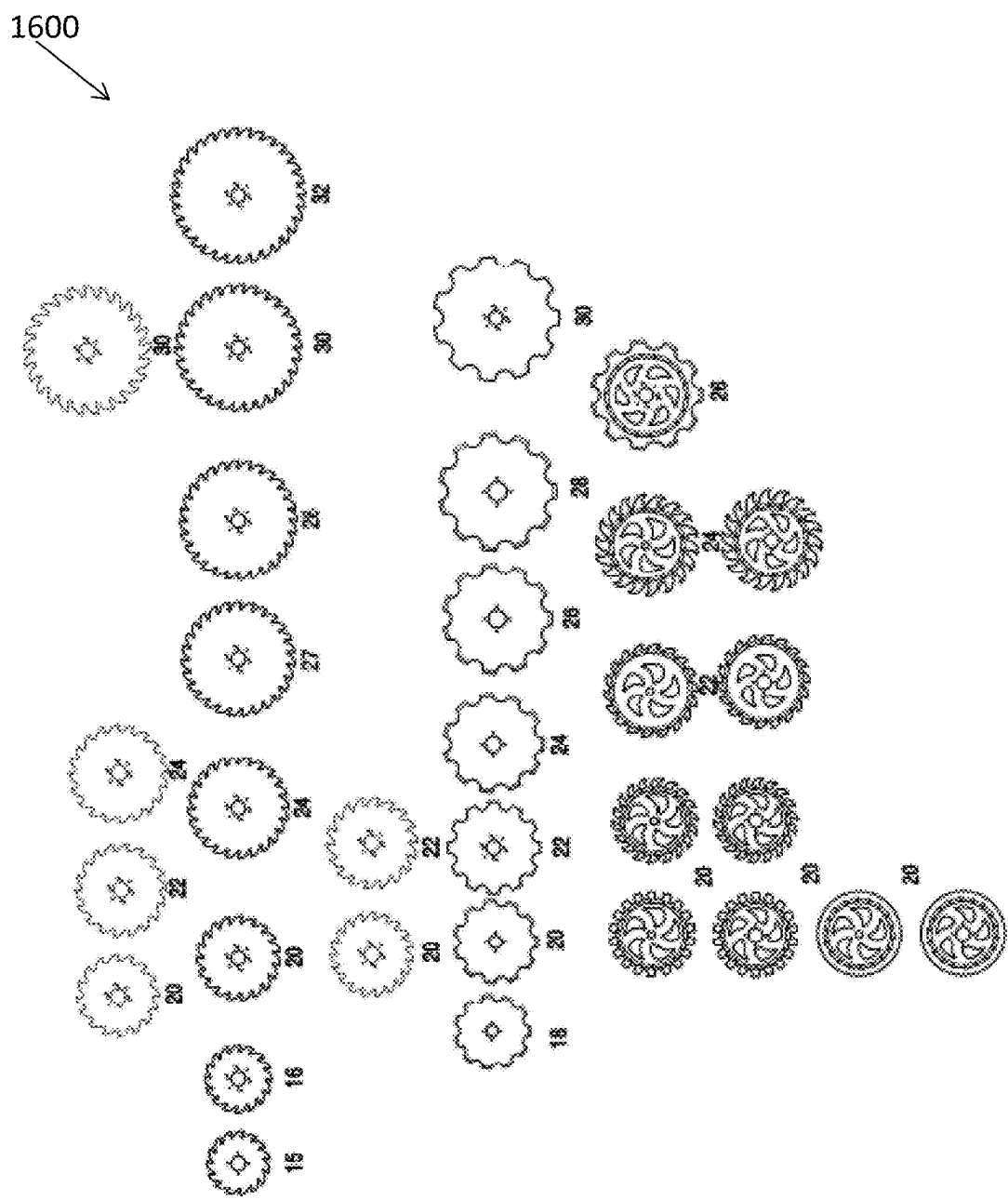
FIG. 16 shows top plan views of various blade designs of the subject invention.

FIG. 16 shows top plan views of various blade designs of the subject invention, shown generally at 1600. The blades of the subject invention may be provided as blades with fingers or appendages case within blade configurations as a single blade, as dual blades mounted together to form a blade unit, or as separate add-on blade mounts having fingers adapted to be mounted on stand-alone blades, such as for an after-market product, for example.

Figure 17:
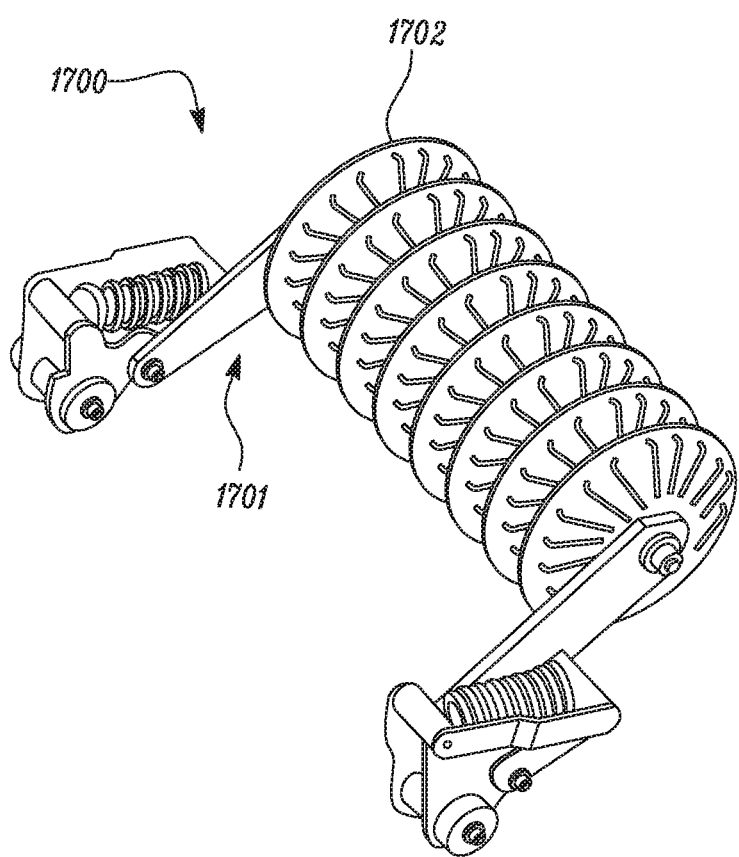
FIG. 17 shows a harrow design of the subject invention utilizing disk blades with fingers.

FIG. 17 shows a harrow design of the subject invention utilizing disk blades with fingers, shown generally at 1700. A harrow is shown at 1701 with blades 1702 having fingers mounted thereon. Harrow 1701 can be mounted on other agricultural tillage and plowing devices. The blade is configured generally as the blade shown and discussed in FIGS. 9-10B.

Figure 18A:
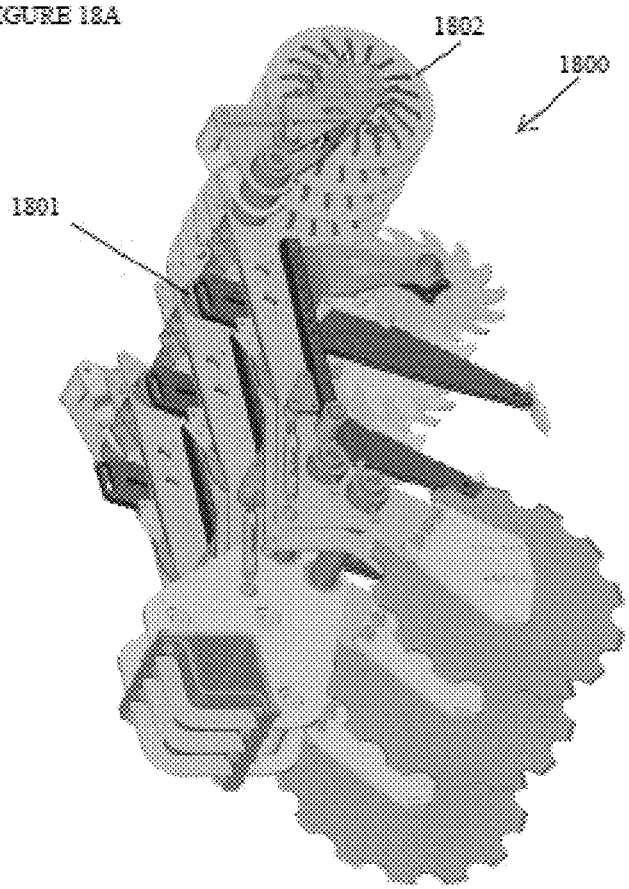
FIG. 18A shows a top side view of a harrow design of the subject invention utilizing disk blades with fingers.
Figure 18B:
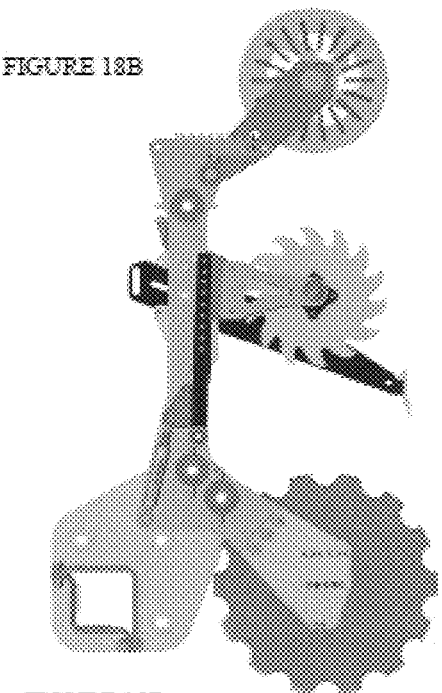
FIG. 18B shows a side view of the harrow design of FIG. 18A.
Figure 18C:
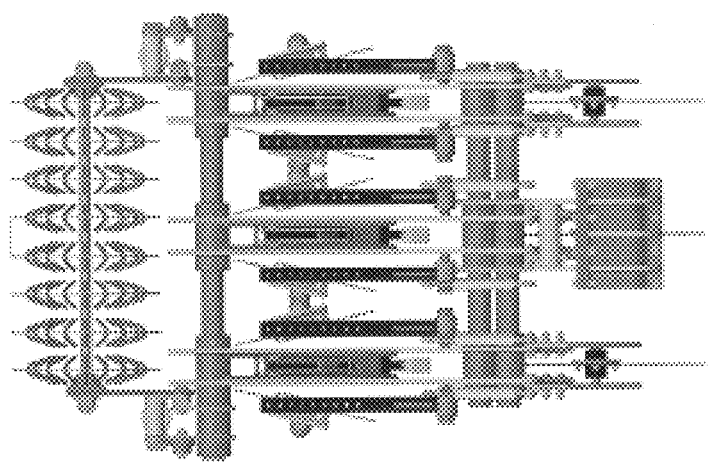
FIG. 18C shows a top aerial view of the harrow design of FIG. 18A.
Figure 18D:
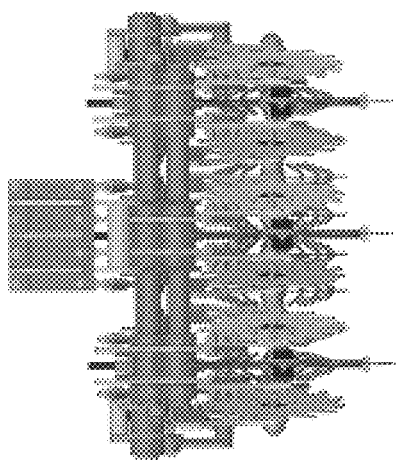
FIG. 18D shows a front view of the harrow design of FIG. 18A.

FIG. 18A shows a top side view of a harrow design of the subject invention utilizing disk blades with fingers, shown generally at 1800. A harrow is shown at 1801 with blades 1802 having fingers mounted thereon. FIG. 18B shows a side view of the harrow design of FIG. 18A. FIG. 18C shows a top aerial view of the harrow design of FIG. 18A. FIG. 18D shows a front view of the harrow design of FIG. 18A.

Figure 19A:
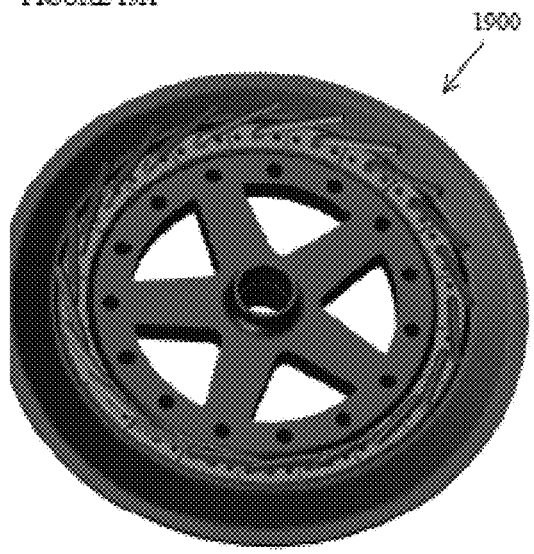
FIG. 19A shows a top front side view of an embodiment of the subject disk blade, wherein fingers are received through apertures.
Figure 19B:
FIG. 19B shows a top back side view of the disk blade of FIG. 19A.
Figure 19C:
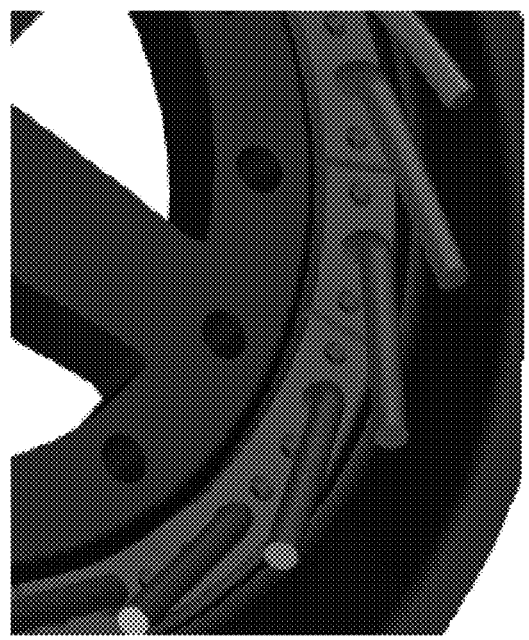
FIG. 19C shows an exploded view of a cross-section of FIG. 19A.
Figure 19D:
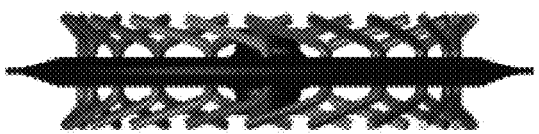
FIG. 19D shows a side view of the fingers and disk blade of FIG. 19A.
Figure 19E:
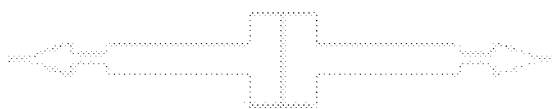
FIG. 19E shows a side view of the disk blade of FIG. 19A (without the fingers to show the shape of the blade itself)

FIG. 19A shows a top front side view of an embodiment of the subject disk blade, wherein fingers are received through apertures, shown generally at 1900. FIG. 19B shows a top back side view of the disk blade of FIG. 19A. FIG. 19C shows an exploded view of a cross-section of FIG. 19A. FIG. 19D shows a side view of the fingers and disk blade of FIG. 19A. FIG. 19E shows a side view of the disk blade of FIG. 19A (without the fingers to show the shape of the blade itself).

Figure 20:
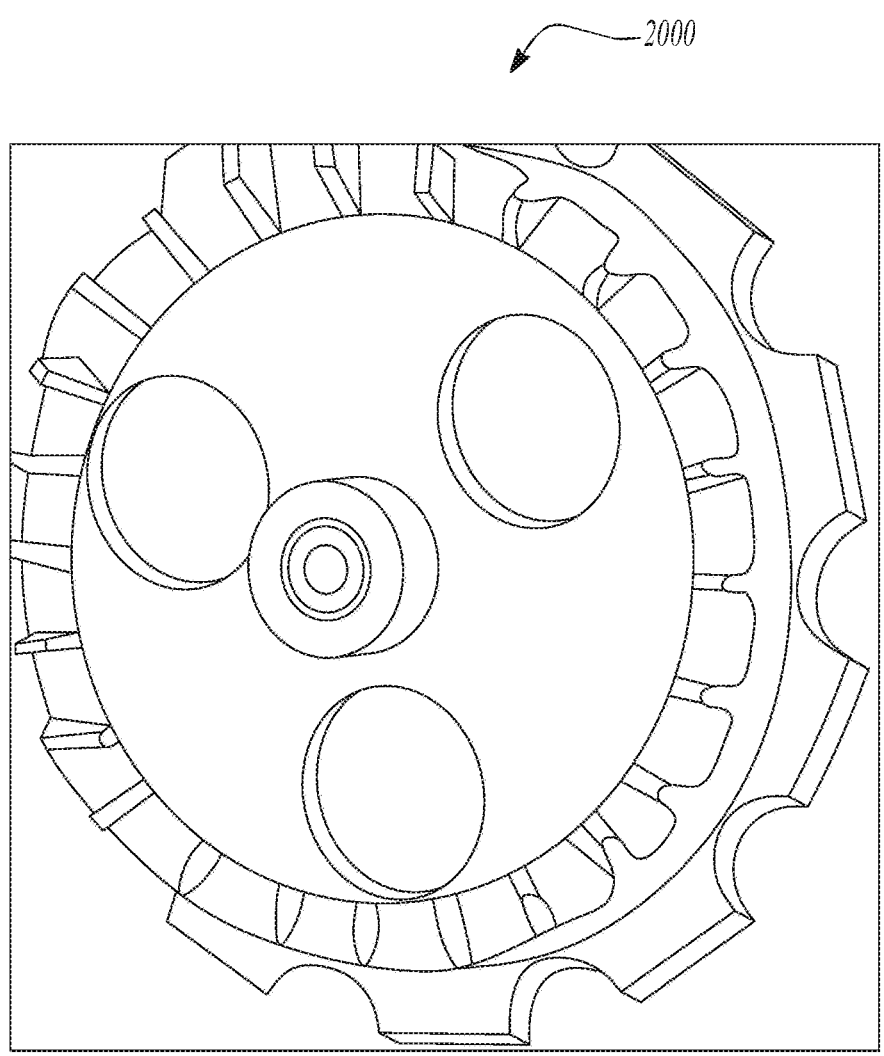
FIG. 20 shows a top side view of an embodiment of the subject disk blade, wherein a blade insert with fingers is received by way of a central hub on a disk blade.
Figure 21:
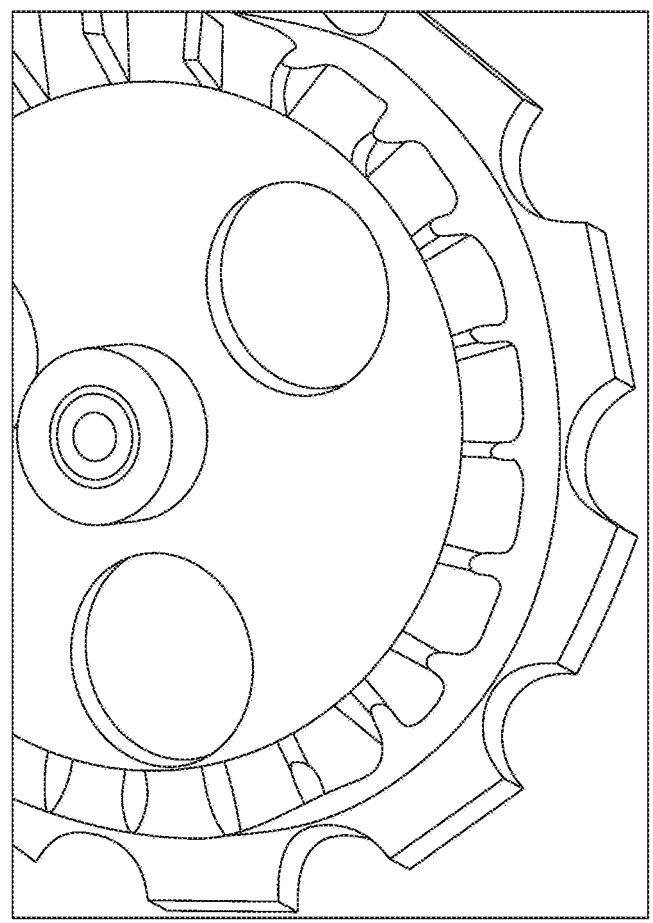
FIG. 21 shows a side view of the embodiment of FIG. 20.
Figure 22:
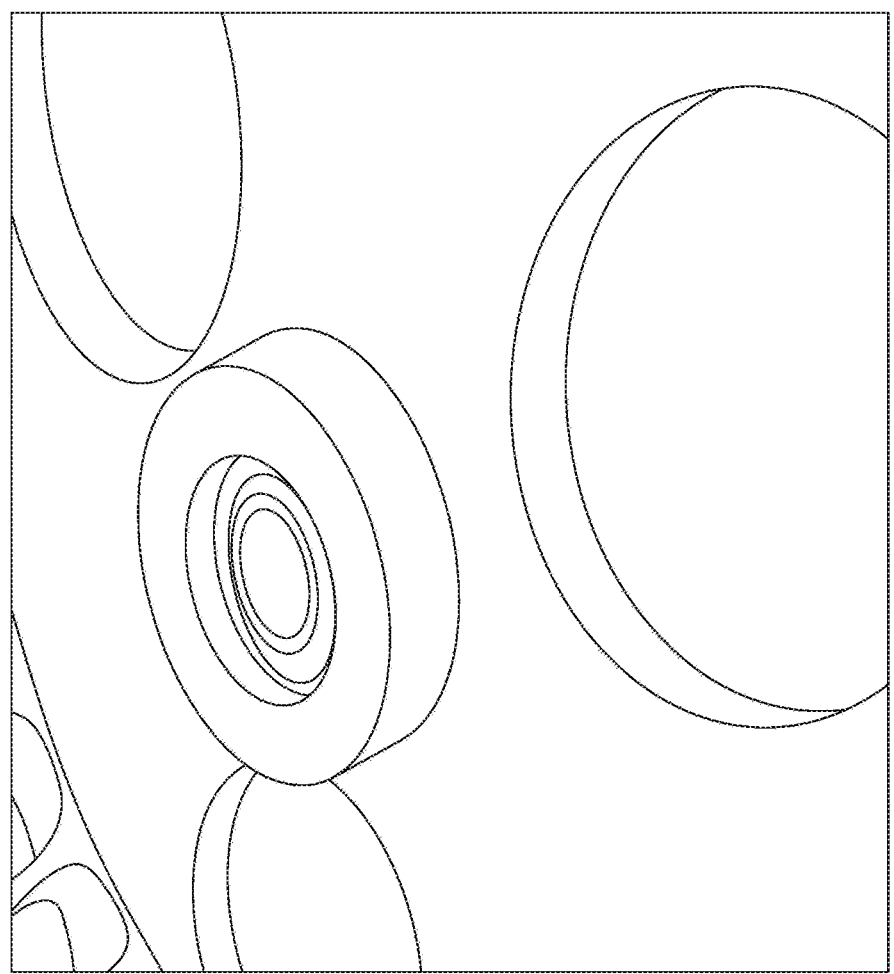
FIG. 22 shows an exploded sectional view showing the central hub of FIG. 20.
Figure 23:
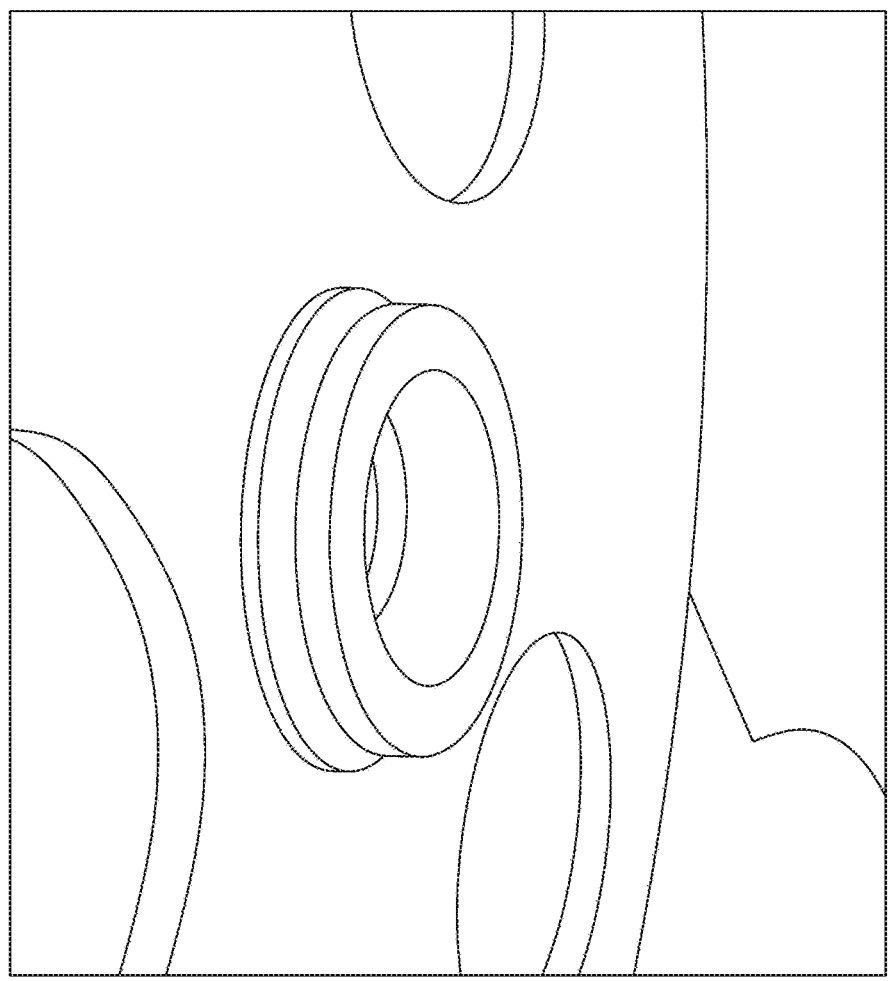
FIG. 23 shows an exploded sectional view showing the central hub of FIG. 20.
Figure 24:
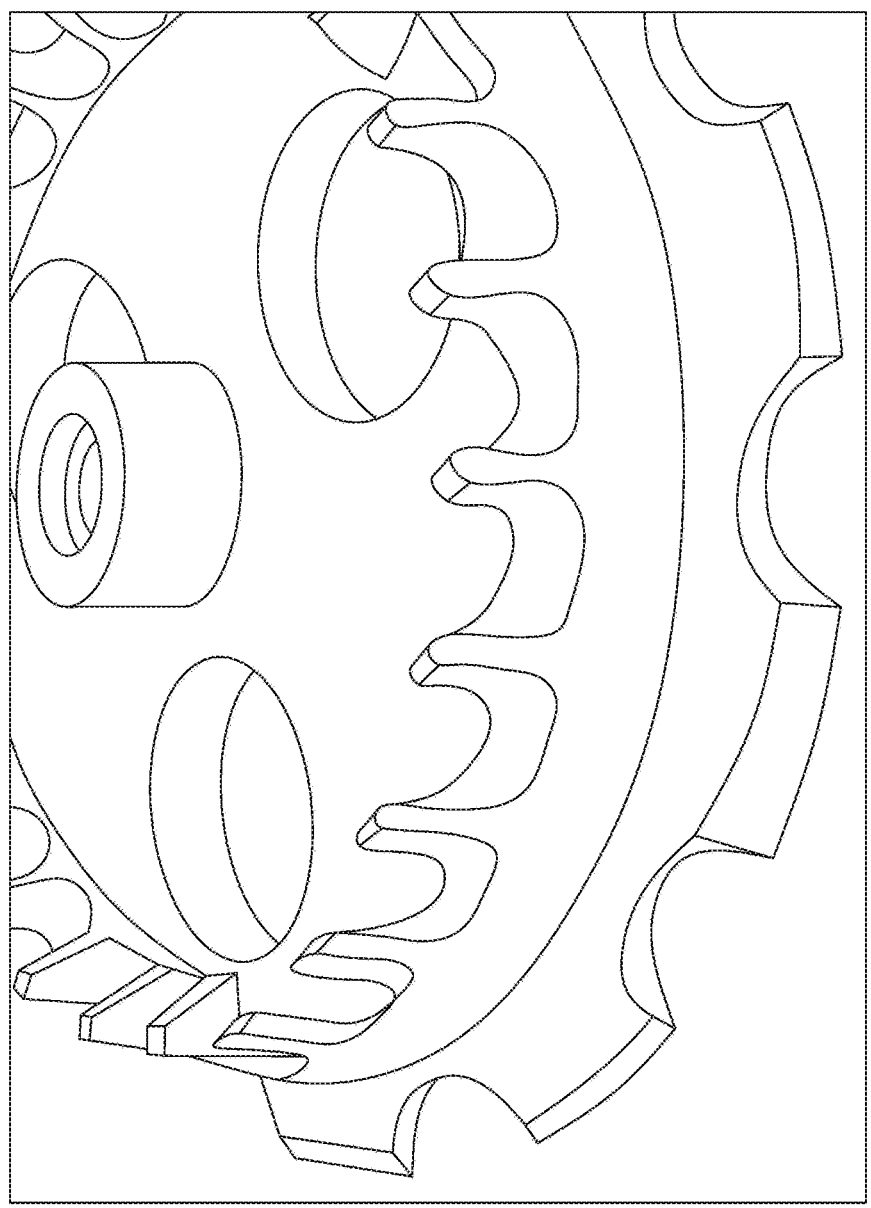
FIG. 24 shows another top plan view of FIG. 20.

FIGS. 20-24 show an embodiment of the subject disk blade, wherein a blade insert with fingers is received by way of a central hub on a disk blade. FIG. 20 shows a top side view of an embodiment of the subject disk blade, wherein a blade insert with fingers is received by way of a central hub on a disk blade, shown generally at 2000. FIG. 21 shows a side view of the embodiment of FIG. 20. FIG. 22 shows an exploded sectional view showing the central hub of FIG. 20. FIG. 23 shows an exploded sectional view showing the central hub of FIG. 20. FIG. 24 shows another top plan view of FIG. 20.

Figure 25C:
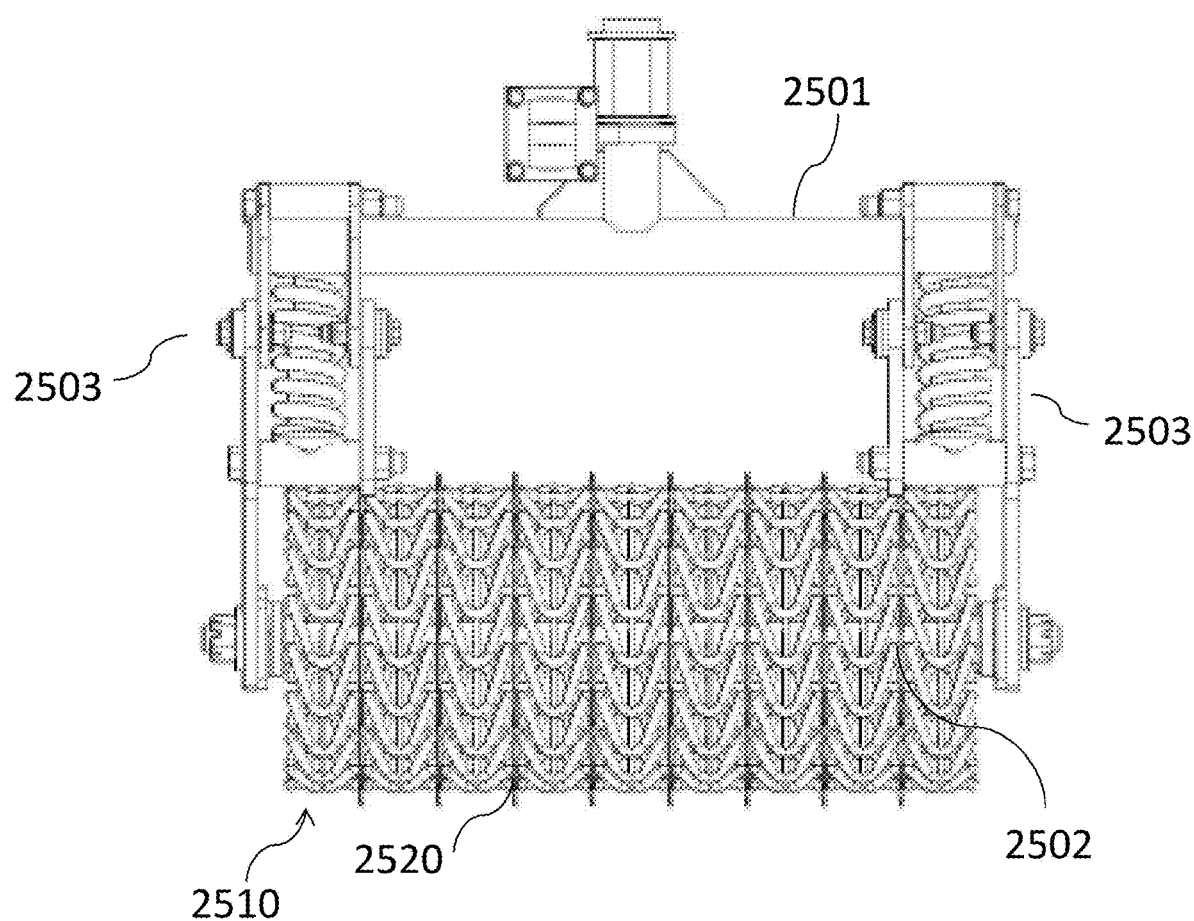
FIG. 25C shows a bottom plan view of the adjustable stubble smasher assembly of FIG. 25A.
Figure 25D:
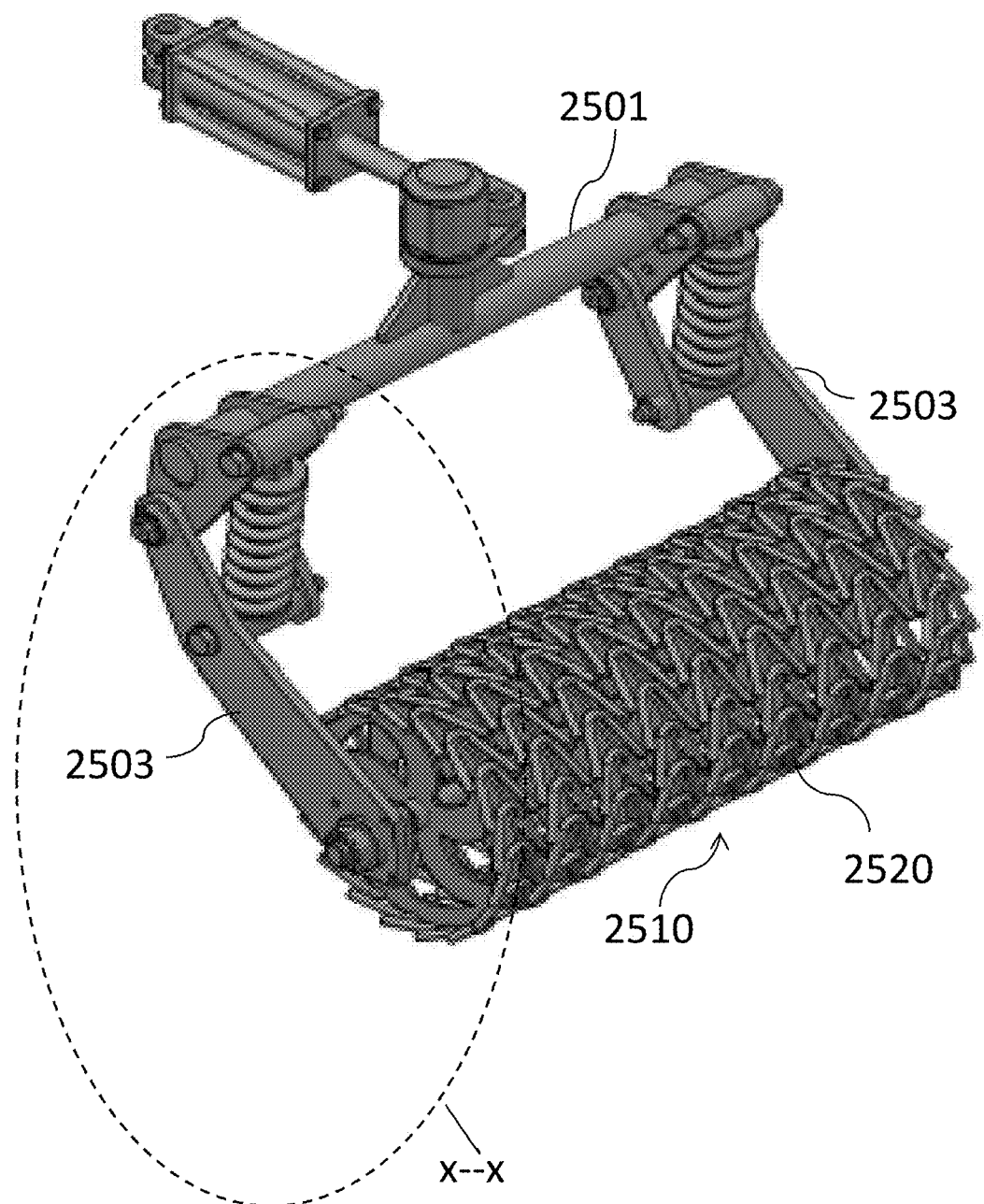
FIG. 25D shows a top side plan view of the adjustable stubble smasher assembly of FIG. 25A.
Figure 25E:
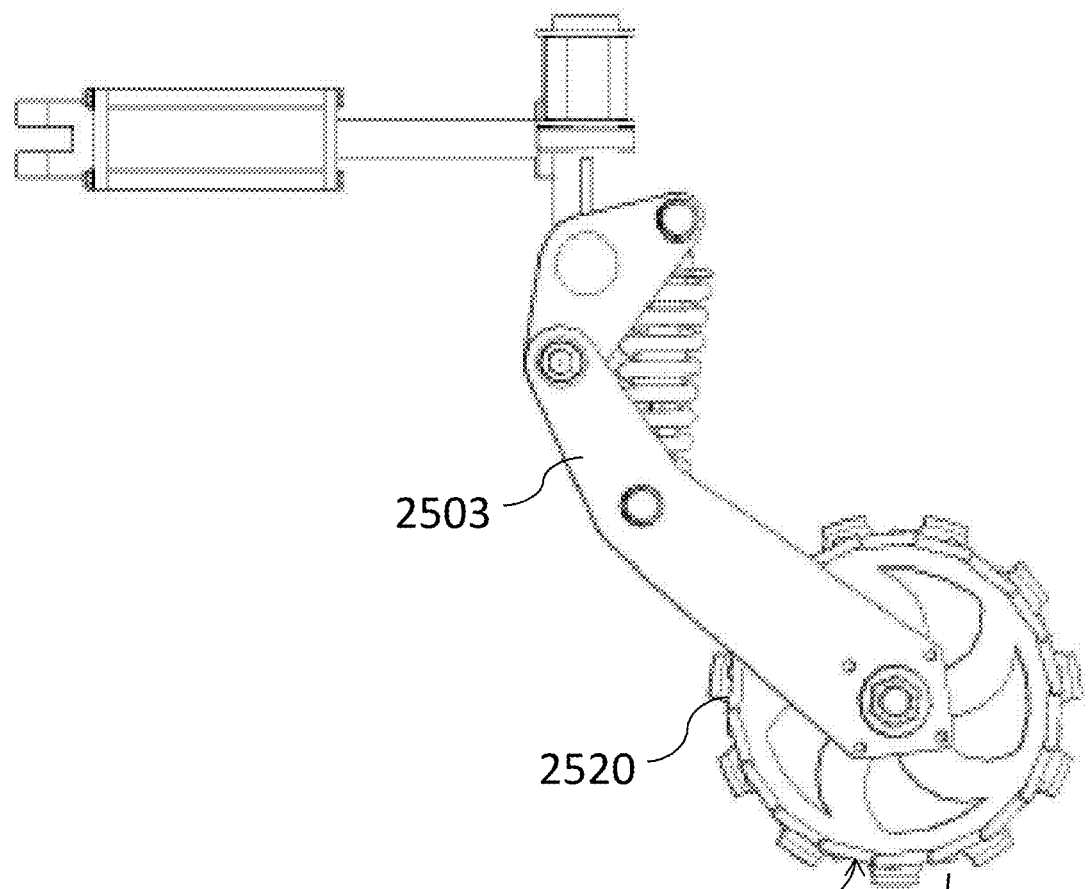
FIG. 25E shows a cross-section top side view of the assembly taken along x-x of FIG. 25D, showing connection of the agricultural implement to the disk.
Figure 25F:
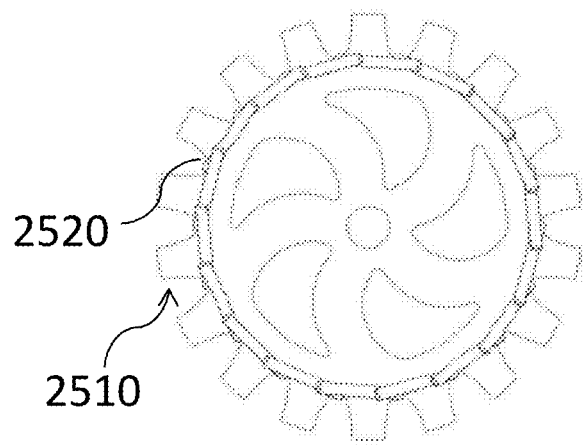
FIG. 25F shows a side view of the disk.

FIGS. 25A-25F shows views of an embodiment of an agricultural assembly with a carrier carrying the subject disk blades. FIG. 25A shows a top plan view of an embodiment of an adjustable stubble smasher agricultural implement assembled with an embodiment of the subject disk blades, wherein the blades have fingers on a tooth blade as in FIG. 1A. FIG. 25B shows a side view of a disk blade in the assembly of FIG. 25A. FIG. 25C shows a bottom plan view of the adjustable stubble smasher assembly of FIG. 25A. FIG. 25D shows a top side plan view of the adjustable stubble smasher assembly of FIG. 25A. FIG. 25E shows a cross-section top side view of the assembly taken along x-x of FIG. 25D, showing connection of the agricultural implement to the disk. FIG. 25F shows a side view of the disk.

Referring to FIGS. 25A-25F, an adjustable stubble smasher agricultural implement is shown generally at 2500. Stubble smasher 2500 includes a carrier frame 2501 with mounting bar 2502 and end brackets 2503. End brackets 2503 and mounting bar 2502 are adjustable. Disc blades 2501 can also be adjusted along the mounting bar 2502. Disk blades 2510 are mounted along mounting bar 2502. Disk blades 2510 are formed having an outer perimeter 2511, a first side wall 2512, a second side wall 2513, and a central hub 2514. Disk blade 2510 is herein shown as a substantially flat round blade wherein the outer perimeter 2511 has a blade edge 2515 formed with teeth. It is noted that disk blade 2510 blade edge 2515 may be serrated, flat, etc., and the blade may be curved rather than flat, depending on the soil application. A plurality of fingers/appendages/protrusions 2520 extend laterally from at least the first side wall 2512 at an angle $\Theta$.

Fingers 2520 may also extend from the second side wall 2513, aligning with the fingers 2520 extending from the first side wall 2512. Fingers 2520 may be welded onto the side walls 2512, 2513, or may extend through the first side wall 2512 and second side wall 2513. $\Theta$ preferably ranges from 5° to 175° depending on the disk blade 2510 intended agricultural implement/application and soil. Stubble smasher 2500 is appointed to be mounted on other agricultural tillage and plowing devices and/or tractors/machinery. The fingers 2520 preferably comprise metal round bars curved to form part of an elliptical geometry inserted at a perpendicular angle to a vertical angle $\Theta$ of the disk blade 2510. Fingers 2520 are arranged at locations equidistant around the disk blade, and at a depth x from the outer perimeter of the disk blade. Preferably, the depth x is at least $\geq$ one (1) inch. Fingers 2520 may be set within notches along blade edge 2515 of perimeter 2511 formed as a continuous unilateral finger bent in the center to rest against the blade edge 2515 of the perimeter 2511.

Figure 26A:
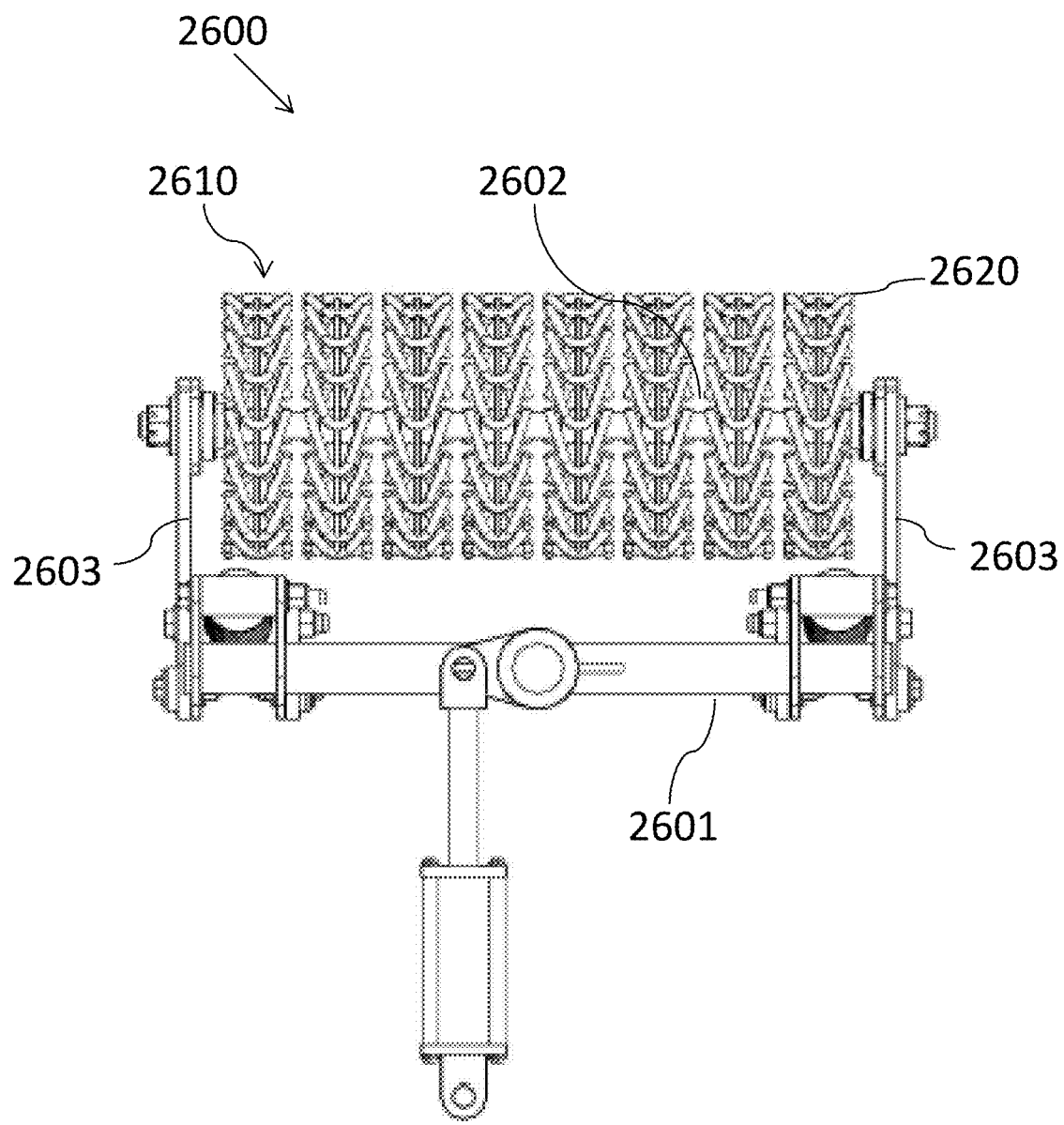
FIG. 26A shows a top plan view of an embodiment of an adjustable stubble smasher agricultural implement assembled with an embodiment of the subject disk blades, wherein the blades have fingers on a tooth blade as in FIG. 1A and the disks are spaced further apart than in FIG. 25A, for example.
Figure 26B:
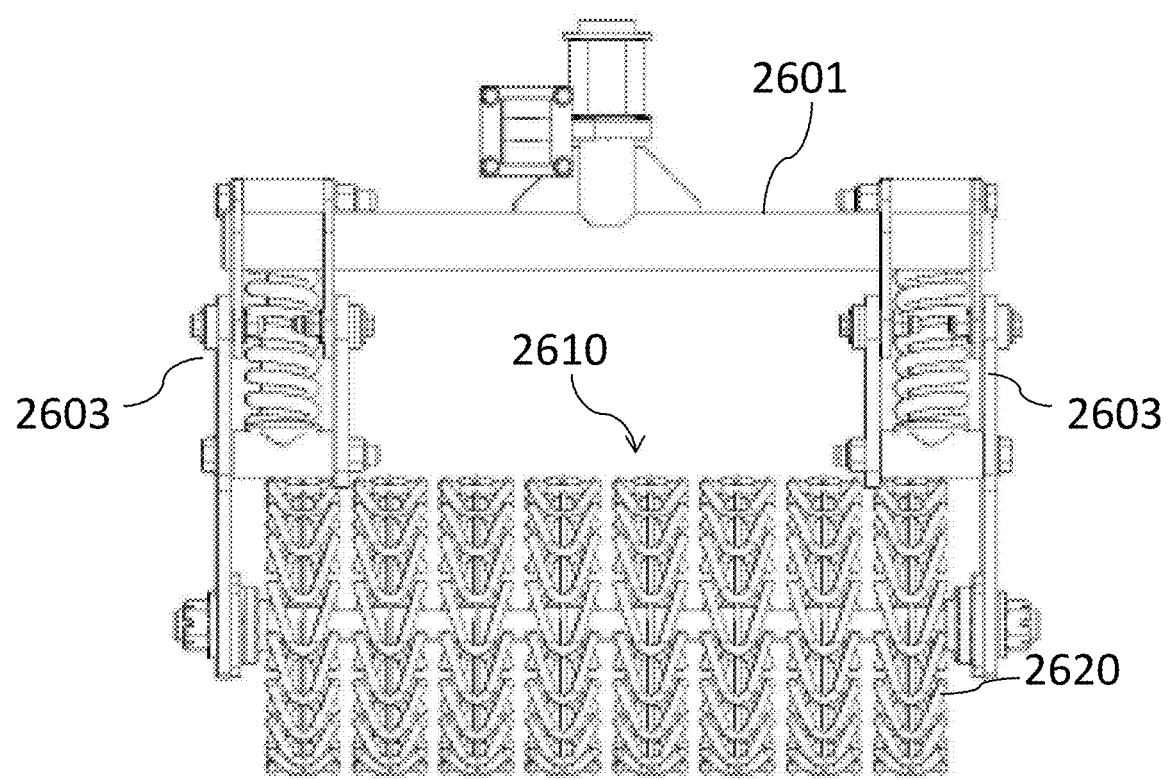
FIG. 26B shows a bottom plan view of the adjustable stubble smasher assembly of FIG. 26A.
Figure 26C:
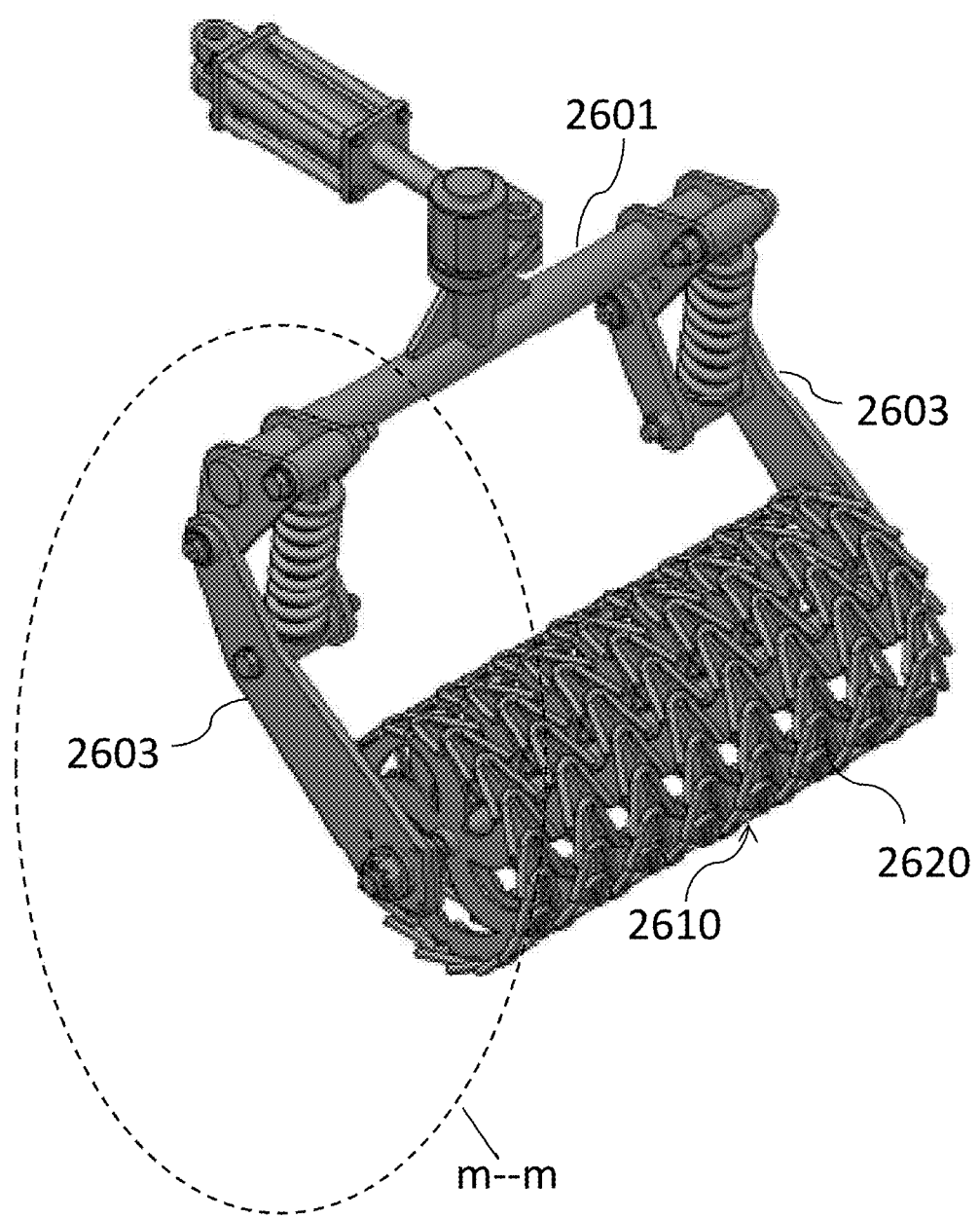
FIG. 26C shows a top side plan view of the adjustable stubble smasher disk assembly of FIG. 26A.
Figure 26D:
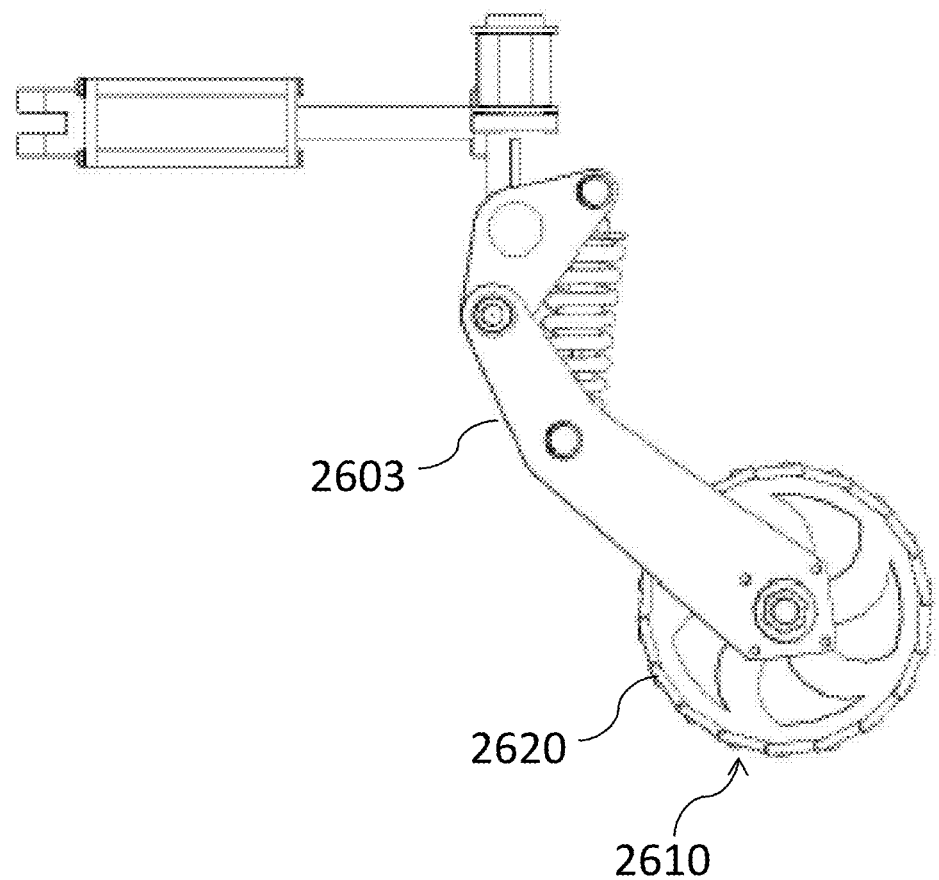

FIGS. 26A-26D illustrate views of an adjustable stubble smasher agricultural implement assembled with an embodiment of the subject disk blades. FIG. 26A shows a top plan view of an embodiment of an adjustable stubble smasher agricultural implement assembled with an embodiment of the subject disk blades, wherein the blades have fingers on a tooth blade as in FIG. 1A and the disks are spaced further apart than in FIG. 25A, for example. FIG. 26B shows a bottom plan view of the adjustable stubble smasher assembly of FIG. 26A. FIG. 26C shows a top side plan view of the adjustable stubble smasher disk assembly of FIG. 26A. FIG. 26D shows a cross-section top side view of the assembly taken along m-m of FIG. 26C, showing connection of the agricultural implement to the disk. Referring to FIGS.

26A-26D, an adjustable stubble smasher agricultural implement is shown generally at 2600. Stubble smasher 2600 includes a carrier frame 2601 with mounting bar 2602 and end brackets 2603. Disk blades 2610 are mounted along mounting bar 2602 and are formed as discussed herein with a plurality of fingers/appendages/protrusions 2620 laterally extending therefrom at an angle Θ.

Figure 27A:
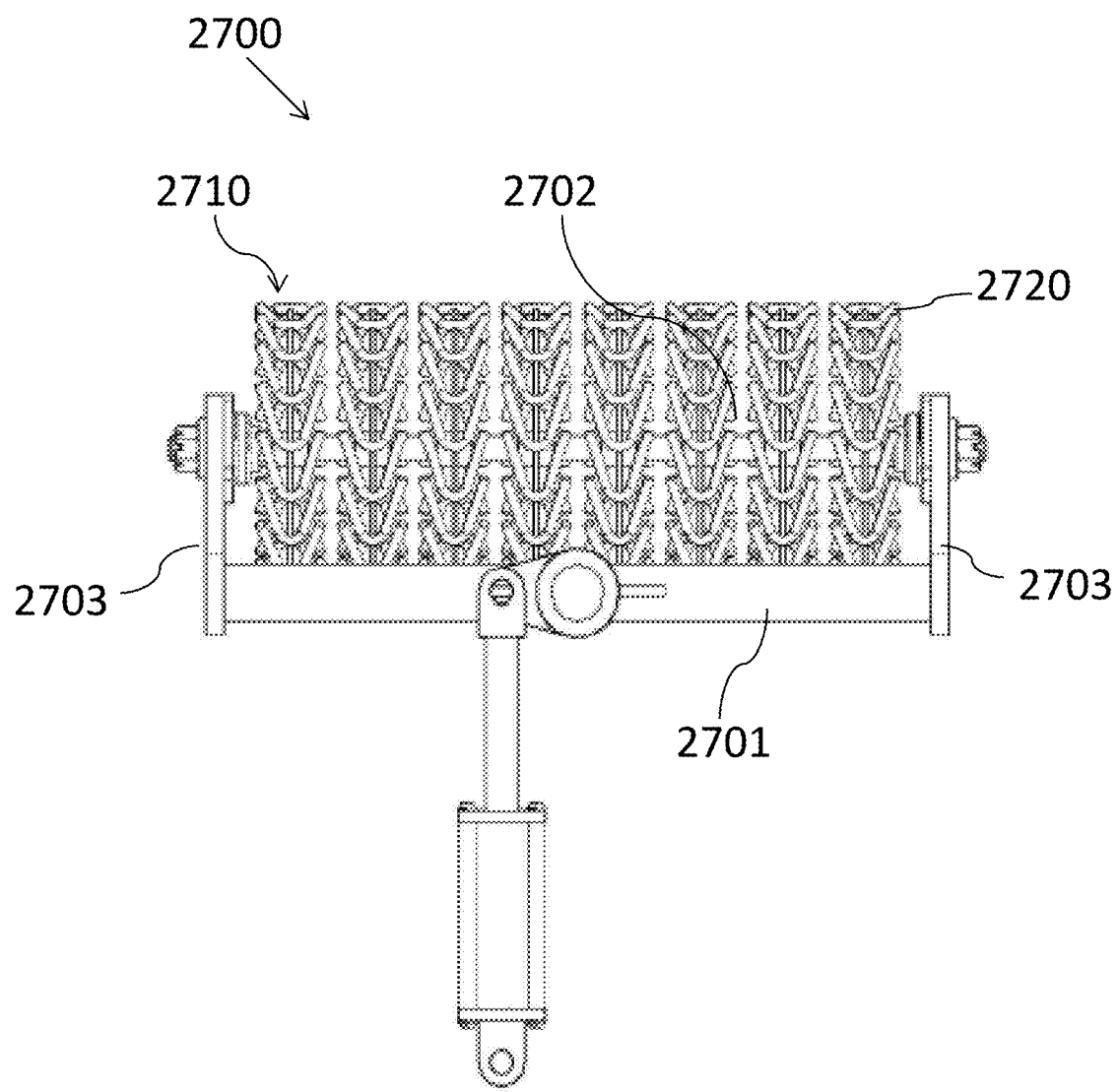
FIG. 27A shows a top plan view of an embodiment of an adjustable stubble smasher solid disk agricultural implement assembled with an embodiment of the subject disk blades, wherein the blades have fingers on a tooth blade as in FIG. 1A.
Figure 27B:
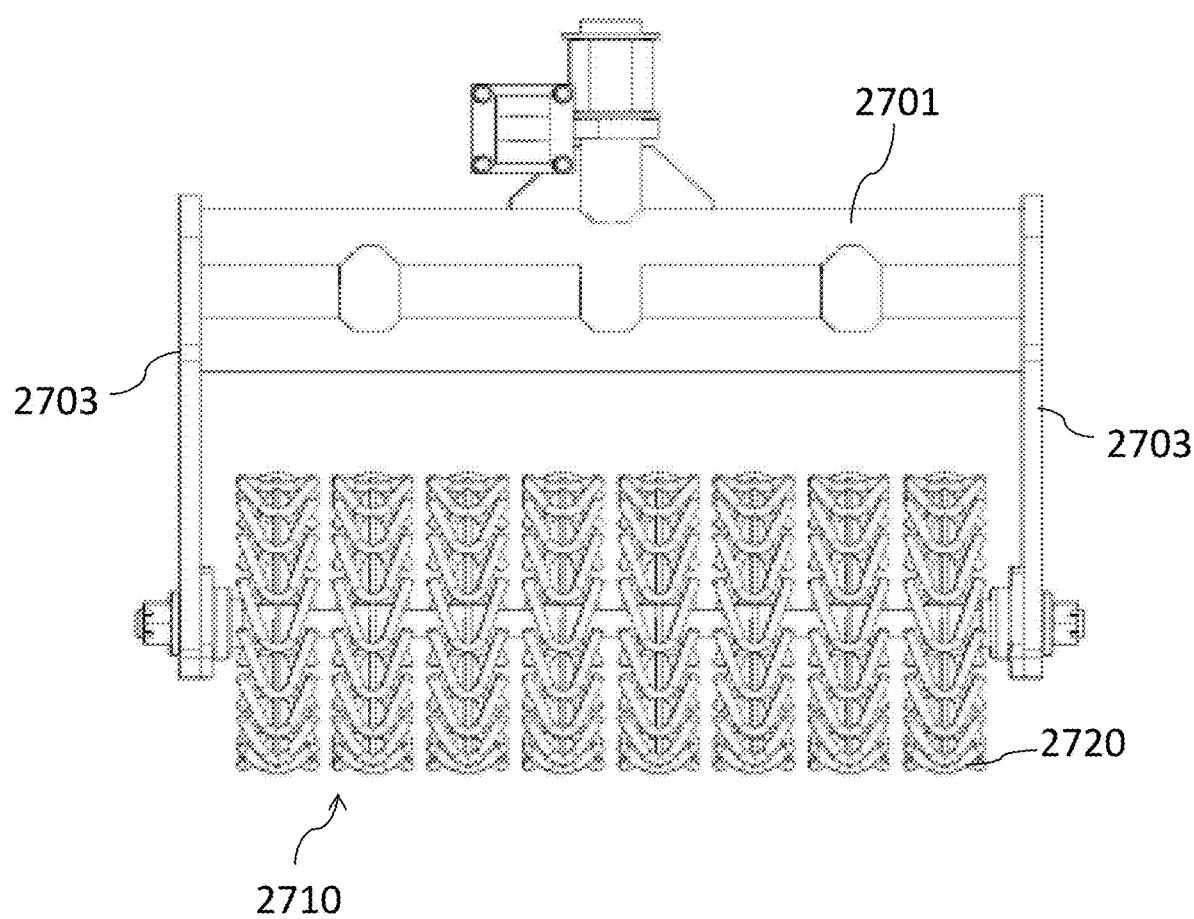
FIG. 27B shows a bottom plan view of the adjustable stubble smasher disk assembly of FIG. 27.
Figure 27C:
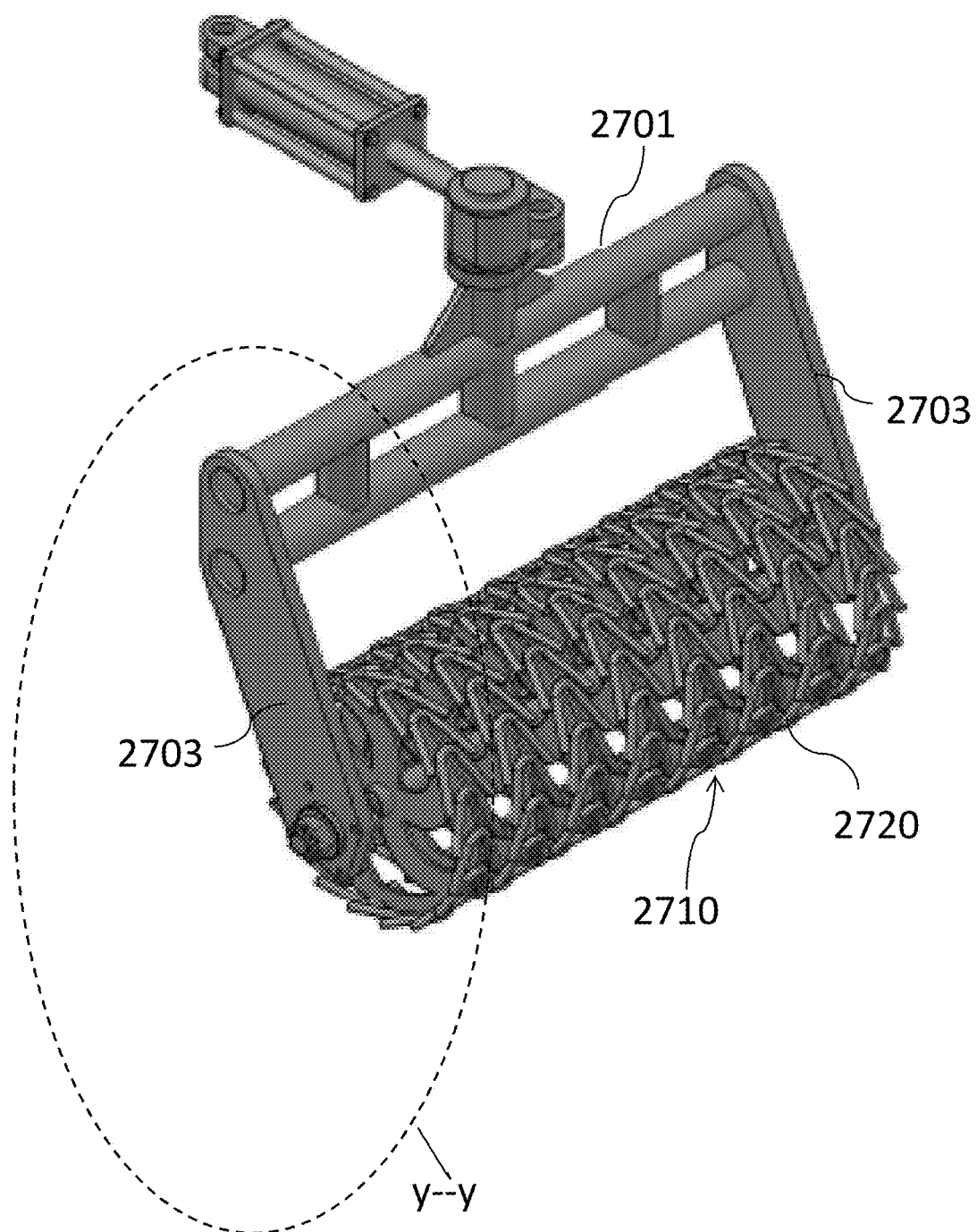
FIG. 27C shows a top side plan view of the adjustable stubble smasher disk assembly of FIG. 27.
Figure 27D:
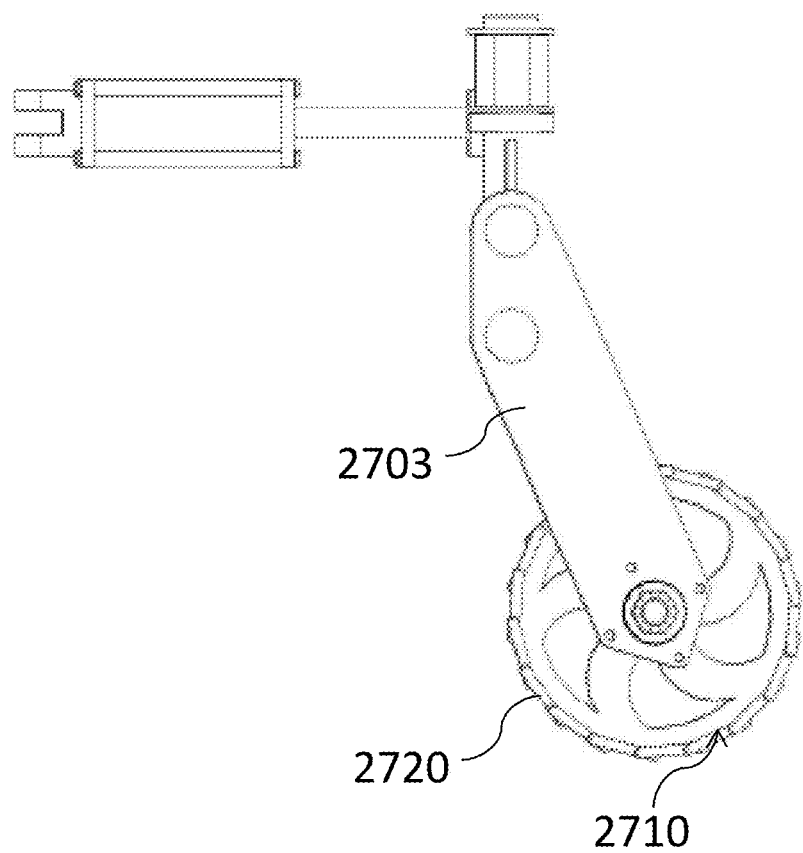
FIG. 27D shows a cross-section top side view of the assembly taken along y-y of FIG. 27C, showing connection of the agricultural implement to the disk.

FIGS. 27A-27D illustrates view of an adjustable stubble smasher solid disk agricultural implement. FIG. 27A shows a top plan view of an embodiment of an adjustable stubble smasher solid disk agricultural implement assembled with an embodiment of the subject disk blades, wherein the blades have fingers on a tooth blade as in FIG. 1A. FIG. 27B shows a bottom plan view of the adjustable stubble smasher disk assembly of FIG. 27. FIG. 27C shows a top side plan view of the adjustable stubble smasher disk assembly of FIG. 27. FIG. 27D shows a cross-section top side view of the assembly taken along y-y of FIG. 27C, showing connection of the agricultural implement to the disk. Referring to FIGS. 27A-27D, an adjustable stubble smasher agricultural implement is shown generally at 2700. Stubble smasher 2700 has a carrier frame 2701 with mounting bar 2702 and end brackets 2703. Disk blades 2710 are mounted along mounting bar 2702. Disk blades 2710 are formed as discussed herein a plurality of fingers/appendages/protrusions 2720 extending laterally therefrom at an angle Θ.

Figure 28A:
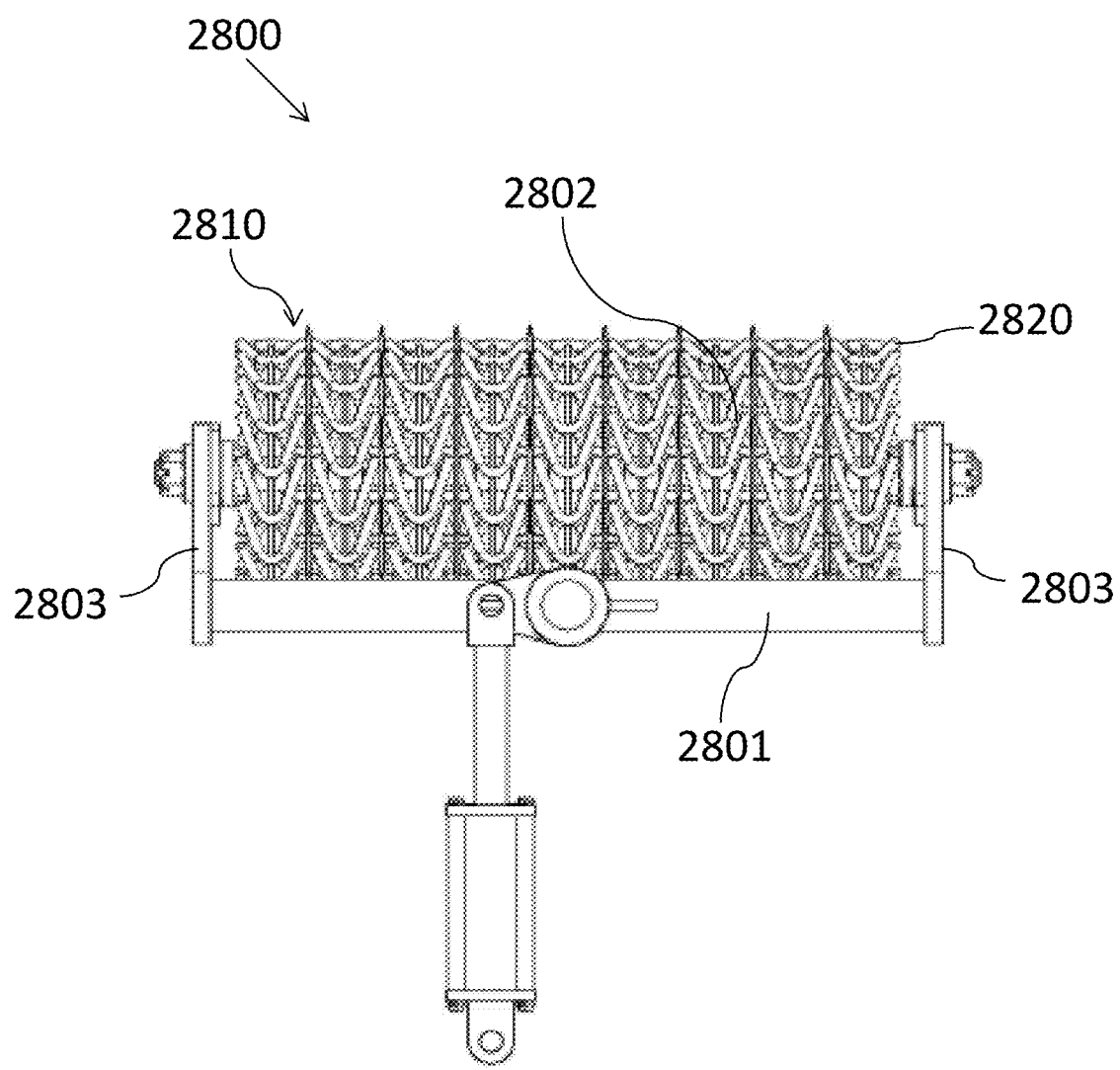
FIG. 28A shows a top plan view of an embodiment of an adjustable stubble smasher solid agricultural implement assembled with an embodiment of the subject disk blades, wherein the blades have fingers on a tooth blade as in FIG. 1A.
Figure 28B:
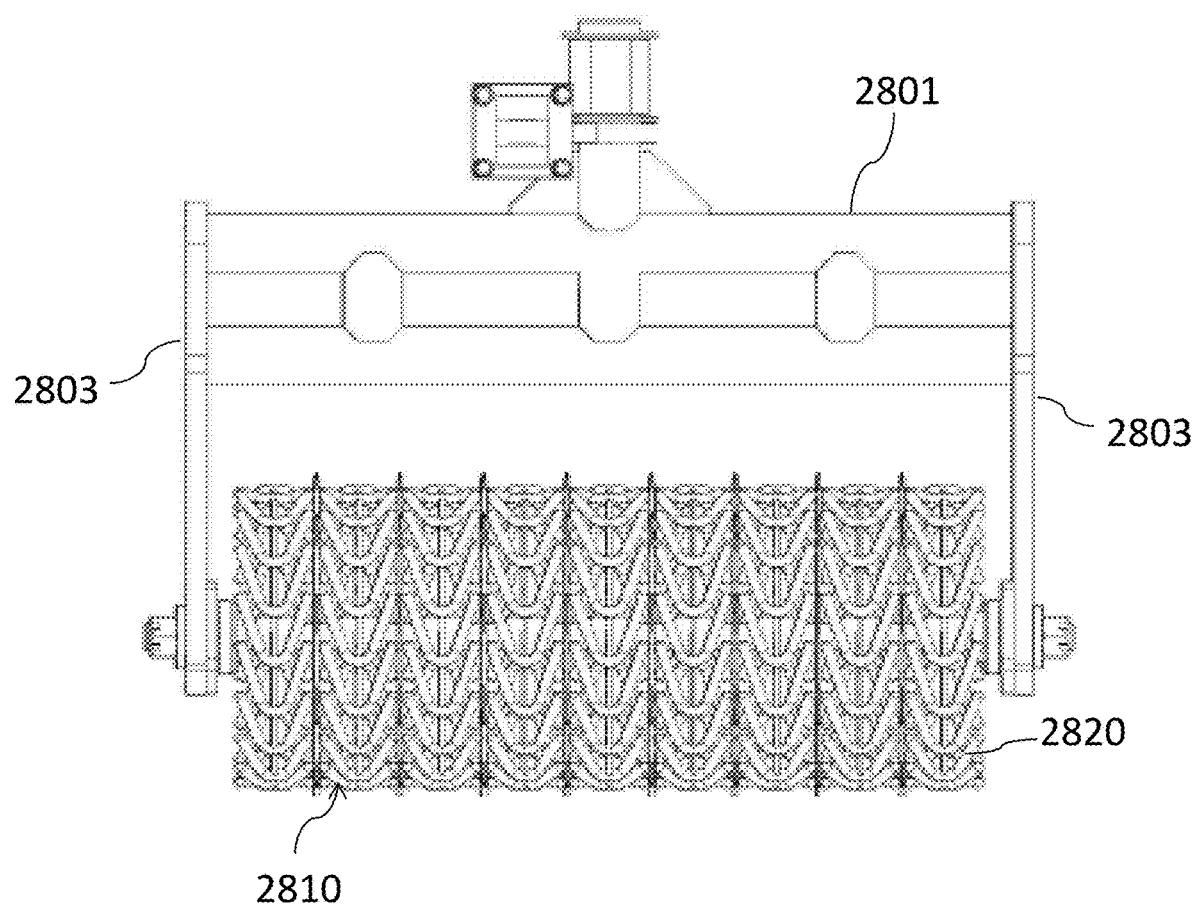
FIG. 28B shows a bottom plan view of the adjustable stubble smasher disk assembly of FIG. 28A.
Figure 28C:
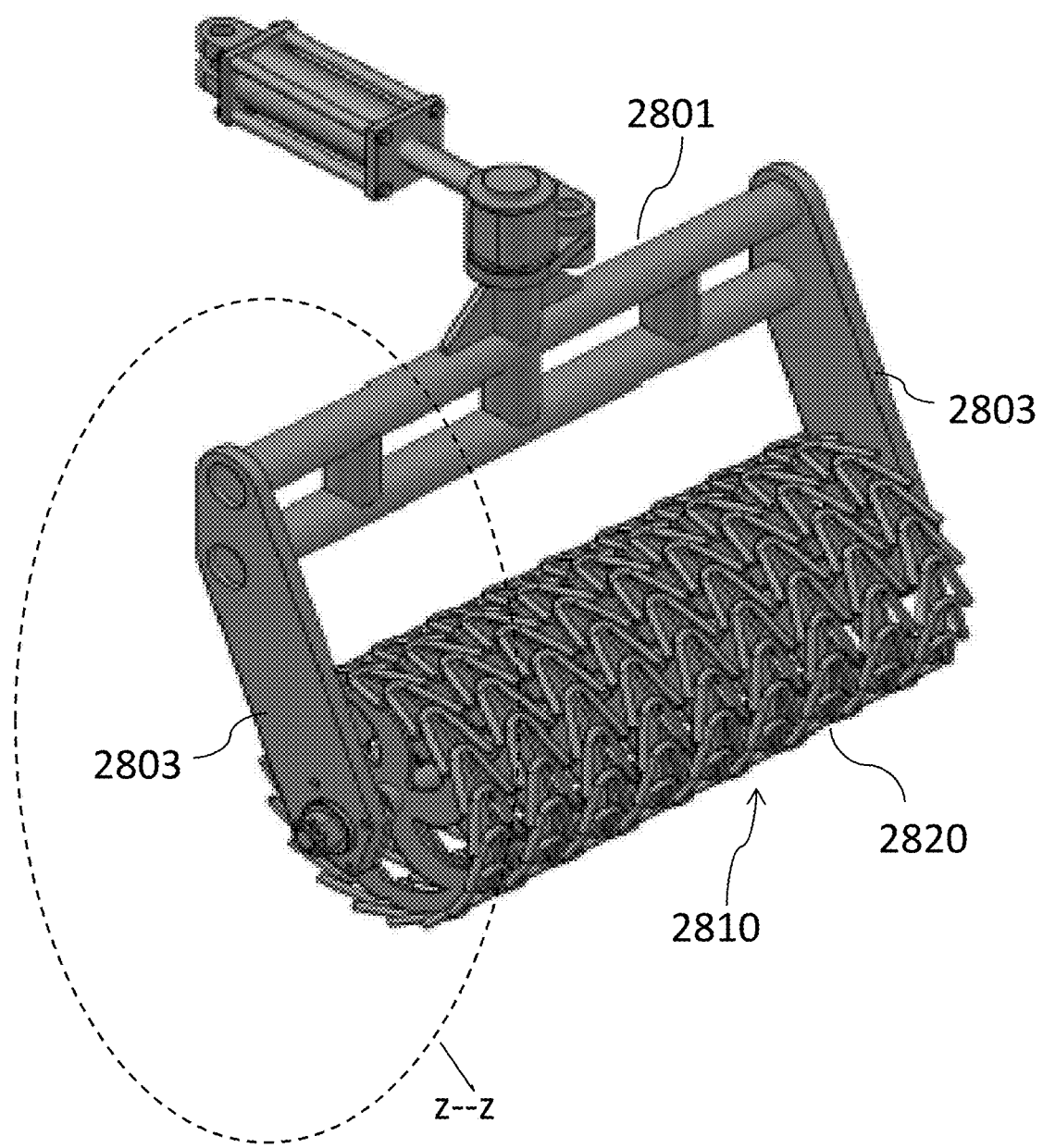
FIG. 28C shows a top side plan view of the adjustable stubble smasher assembly of FIG. 28A.
Figure 28D:
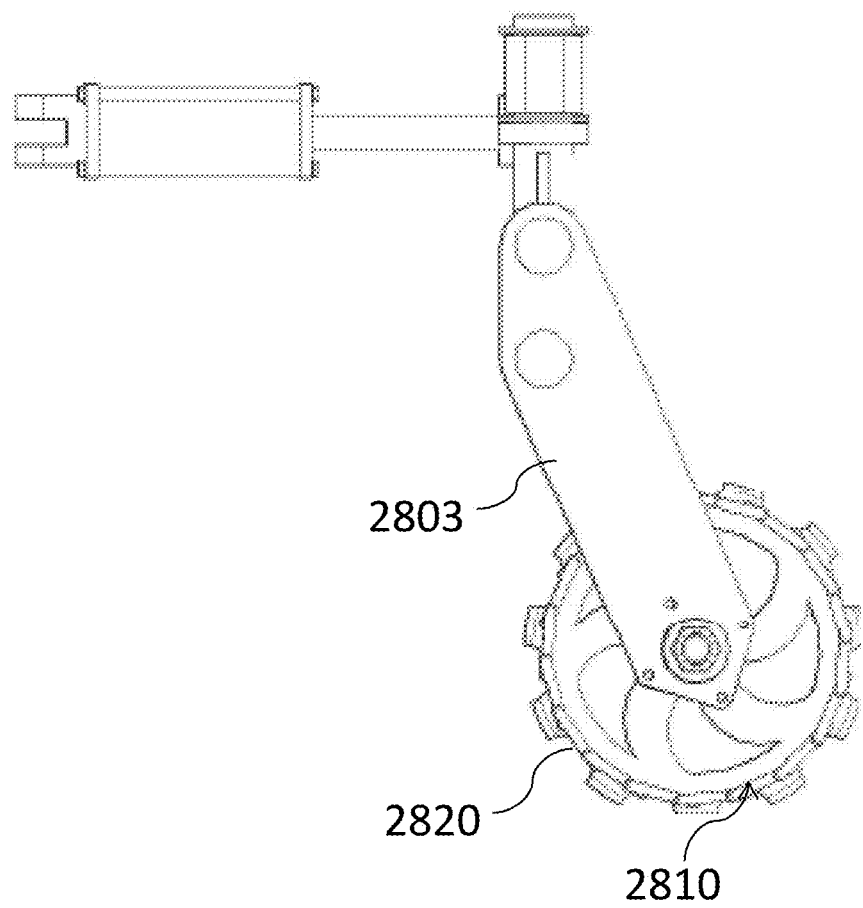
FIG. 28D shows a cross-section top side view of the assembly taken along z-z of FIG. 28C, showing connection of the agricultural implement to the disk.

FIGS. 28A-28D, an adjustable stubble smasher agricultural implement is shown generally at 2800. FIG. 28A shows a top plan view of an embodiment of an adjustable stubble smasher solid agricultural implement assembled with an embodiment of the subject disk blades, wherein the blades have fingers on a tooth blade as in FIG. 1A. FIG. 28B shows a bottom plan view of the adjustable stubble smasher disk assembly of FIG. 28A. FIG. 28C shows a top side plan view of the adjustable stubble smasher assembly of FIG. 28A. FIG. 28D shows a cross-section top side view of the assembly taken along z-z of FIG. 28C, showing connection of the agricultural implement to the disk. Stubble smasher 2800 has a carrier frame 2801 with mounting bar 2802 and end brackets 2803. Disk blades 2810 are mounted along mounting bar 2802. Disk blades 2810 are formed as discussed herein a plurality of fingers/appendages/protrusions 2820 extending laterally therefrom at an angle Θ.

Figure 29A:
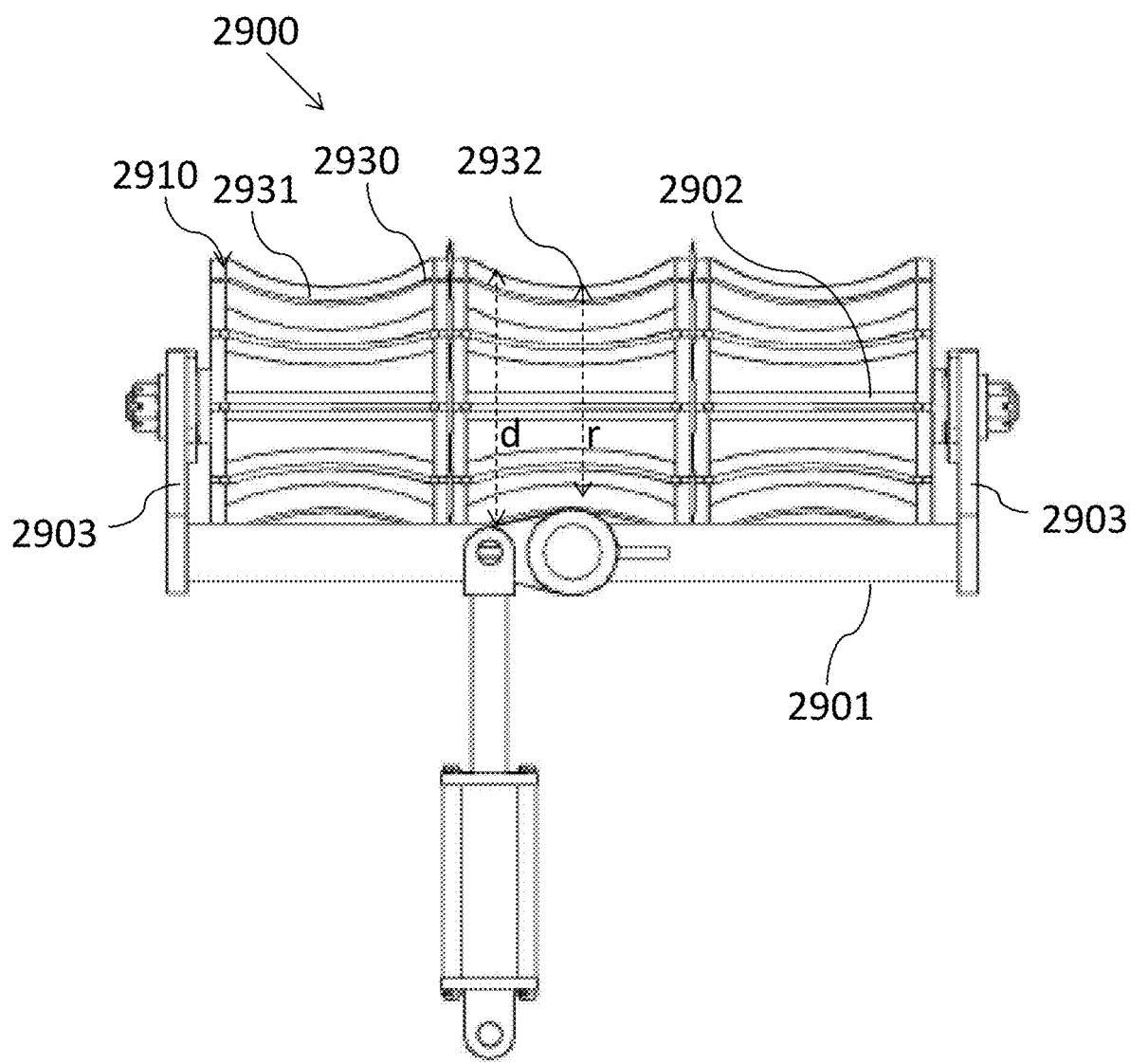
FIG. 29A shows a top plan view of an embodiment of an adjustable stubble smasher solid agricultural implement assembled with an embodiment of the subject disk blades, wherein two or more blades are attached together.
Figure 29B:
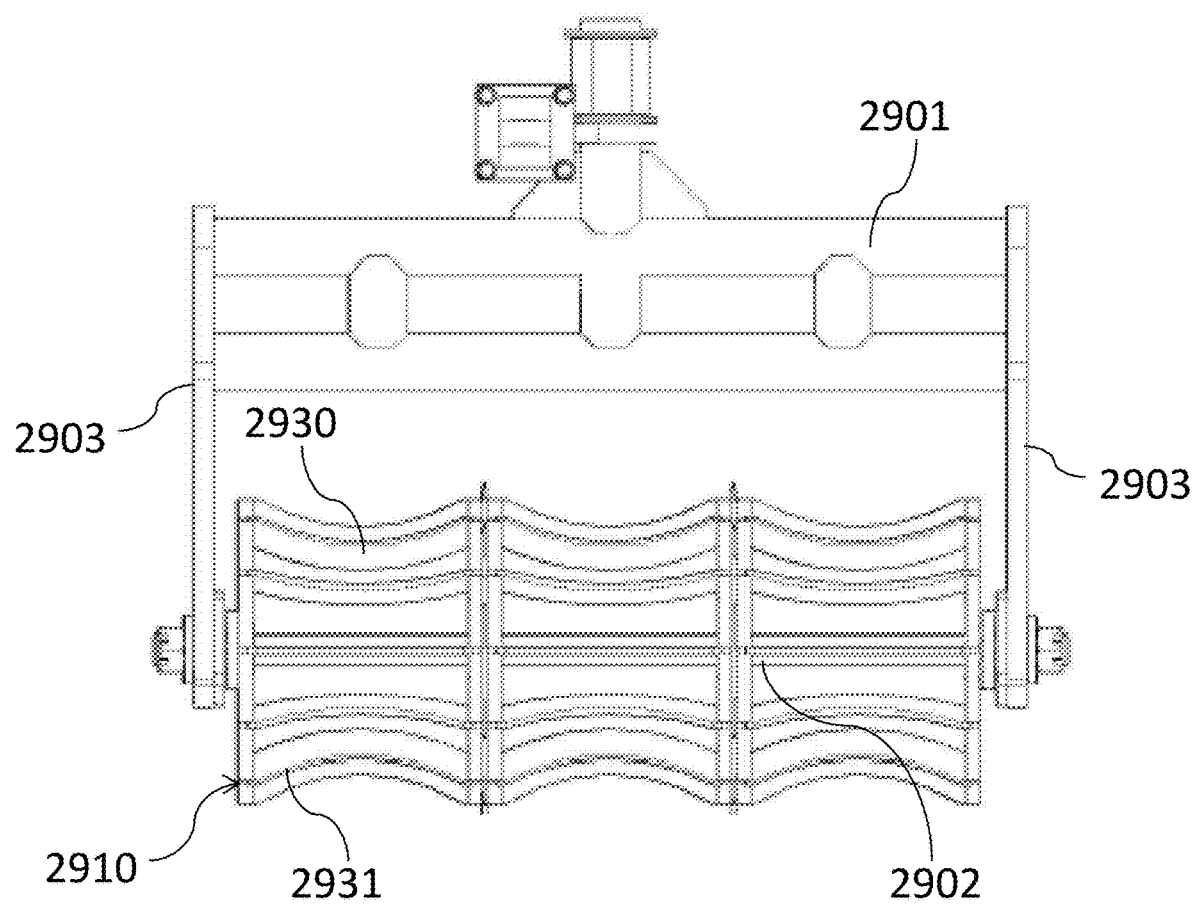
FIG. 29B shows a bottom plan view of the adjustable stubble smasher assembly of FIG. 29A.
Figure 29C:
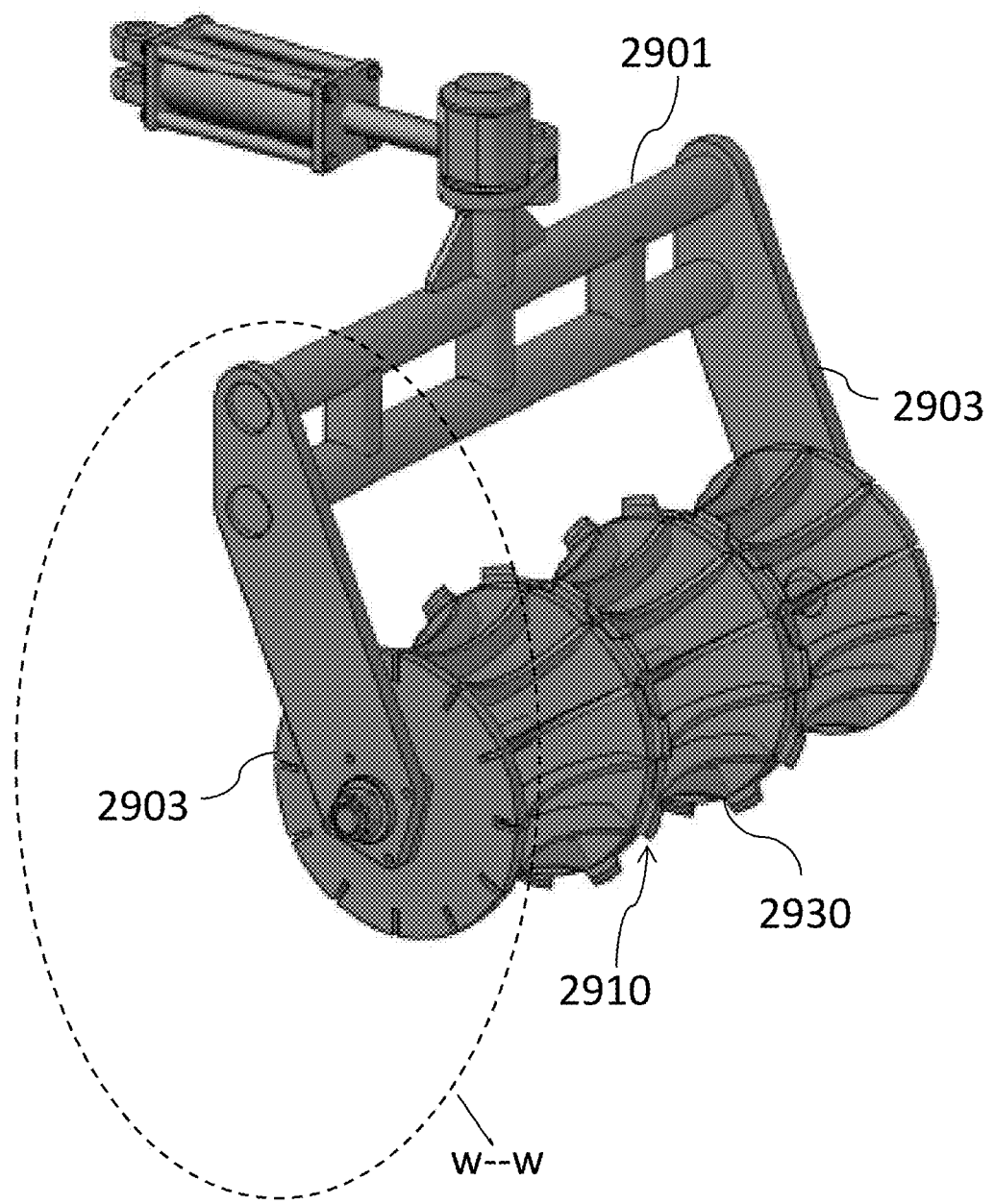
FIG. 29C shows a top side plan view of the adjustable stubble smasher assembly of FIG. 29A.
Figure 29D:
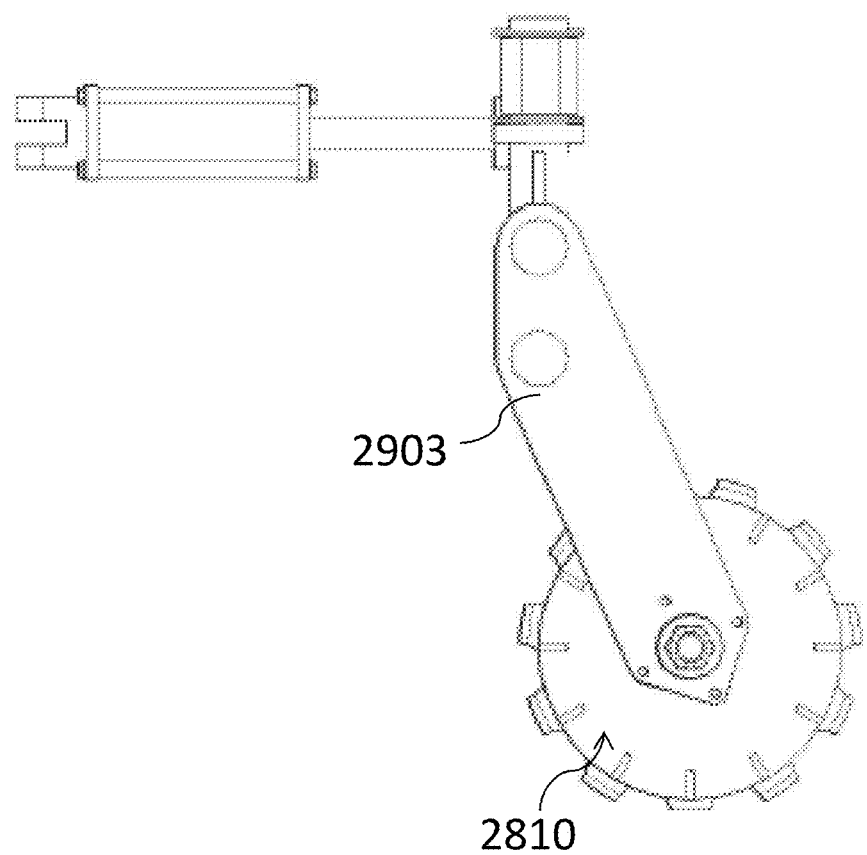

FIGS. 29A-29D illustrate views of an adjustable stubble smasher solid agricultural implement, shown generally at 2900. FIG. 29A shows a top plan view of an embodiment of an adjustable stubble smasher solid agricultural implement assembled with an embodiment of the subject disk blades, wherein two or more blades are attached together. FIG. 29B shows a bottom plan view of the adjustable stubble smasher assembly of FIG. 29A. FIG. 29C shows a top side plan view of the adjustable stubble smasher assembly of FIG. 29A. FIGURE 29D shows a cross-section top side view of the assembly taken along w-w of FIG. 29C, showing connection of the agricultural implement to the disk.

Referring to FIGS. 29A-29D, stubble smasher 2900 has a carrier frame 2901 with mounting bar 2902 and end brackets 2903. Disk blades 2910 are interconnected with a central frame/basket 2930 forming a stubble smasher mounted along mounting bar 2902. Disk blades 2910 are formed herein as substantially flat disk plates having interconnected protrusions or flanges 2931 forming the central frame or basket 2930. Flanges 2931 extend from the side wall of a first disk blade and connected to a horizontally parallel side wall of a second neighboring disk blade. Flanges 2931 are preferably formed having an arch or substantially central curvature 2932 so that the formed central frame or basket 2930 substantially central curvature 2932 portion of the basket 2930 has a diameter d that is less than the diameter r at the outer portion of the basket 2930. Although the disk blades 2910 are shown herein as being continuous flat disk plates without protrusions or fingers, disk blades having the protrusions or fingers can also be interconnected (see for example, FIG. 30A-30B. The type of stubble smasher/ interconnected disk blades is dependent on the type of soil, water drainage and the type of crop to suit agricultural needs.

Figure 30A:
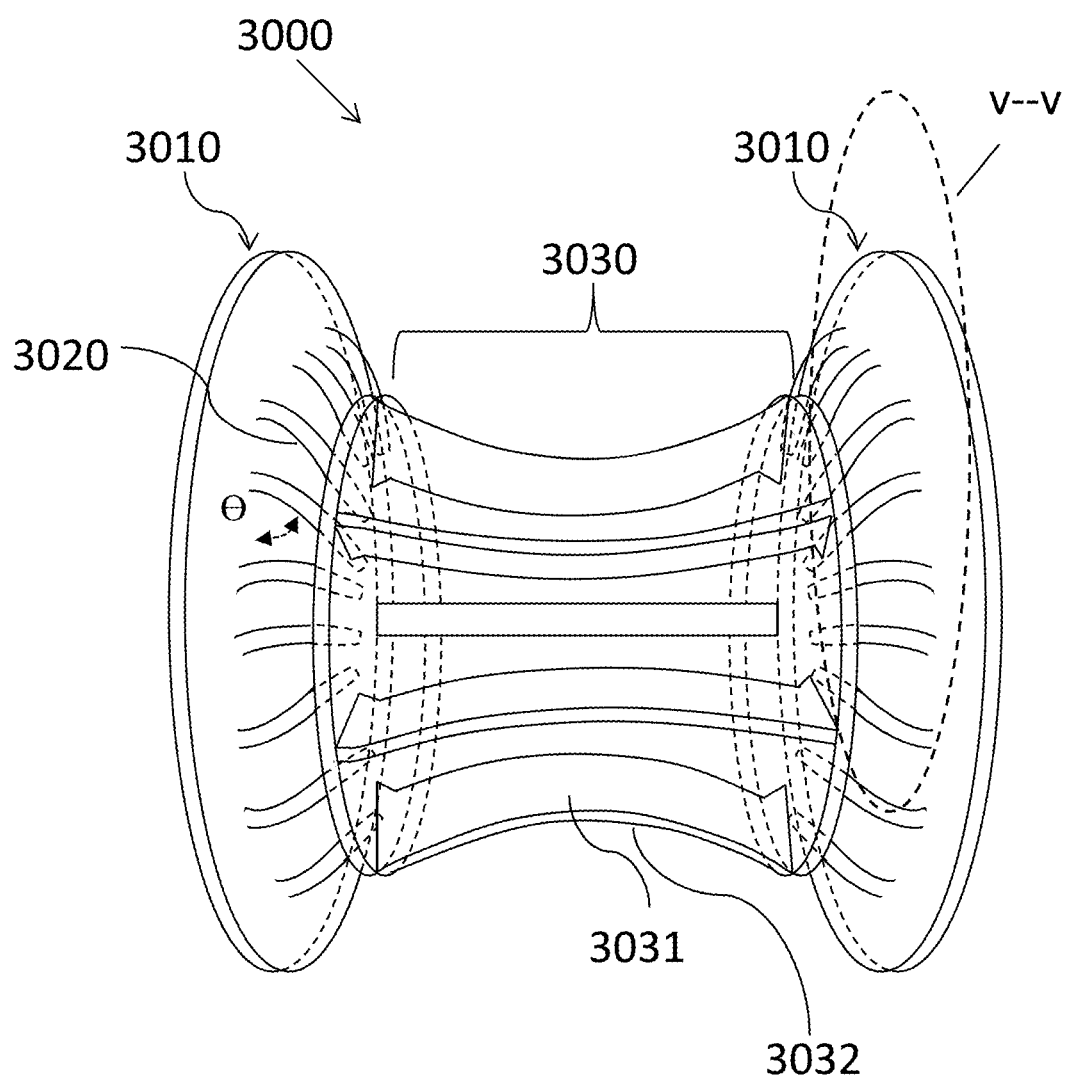
FIG. 30A shows a top plan view of an embodiment of a disk assembly, wherein two or more blades are attached together with a central basket.

FIGS. 30A-30B show views of a stubble smasher blade assembly/interconnected disk blades with central frame/ basket, shown generally at 3000. FIG. 30A shows a top plan view of an embodiment of a disk assembly, wherein two or more blades are attached together with a central basket. FIG. 30B shows a back side cross-sectional view taken along v-v of the disk assembly, showing a blade attached to the central basket two. Stubble smasher blade assembly 3000 is formed by way of interconnected disk blades 3010 with a central frame/basket 3030. Disk blades 3010 are shown formed herein having a plurality of fingers/appendages/protrusions 3020 extending laterally therefrom at an angle Θ. Disk blades 3010 are interconnected by way of elongated protrusions or flanges 3031 forming the central frame or basket 3030. Flanges 3031 extend from the side wall of a first disk blade and connected to a horizontally parallel side wall of a second neighboring disk blade. Flanges 3031 are preferably formed having an arch or substantially central curvature 3032 so that the central frame or basket 3030 substantially central curvature 3032 portion of the basket 3030 has a diameter d that is less than the diameter r at the outer portion of the basket 3030. The type of stubble smasher/interconnected disk blades is dependent on the type of soil, water drainage and the type of crop to suit agricultural needs.

Figure 31A:
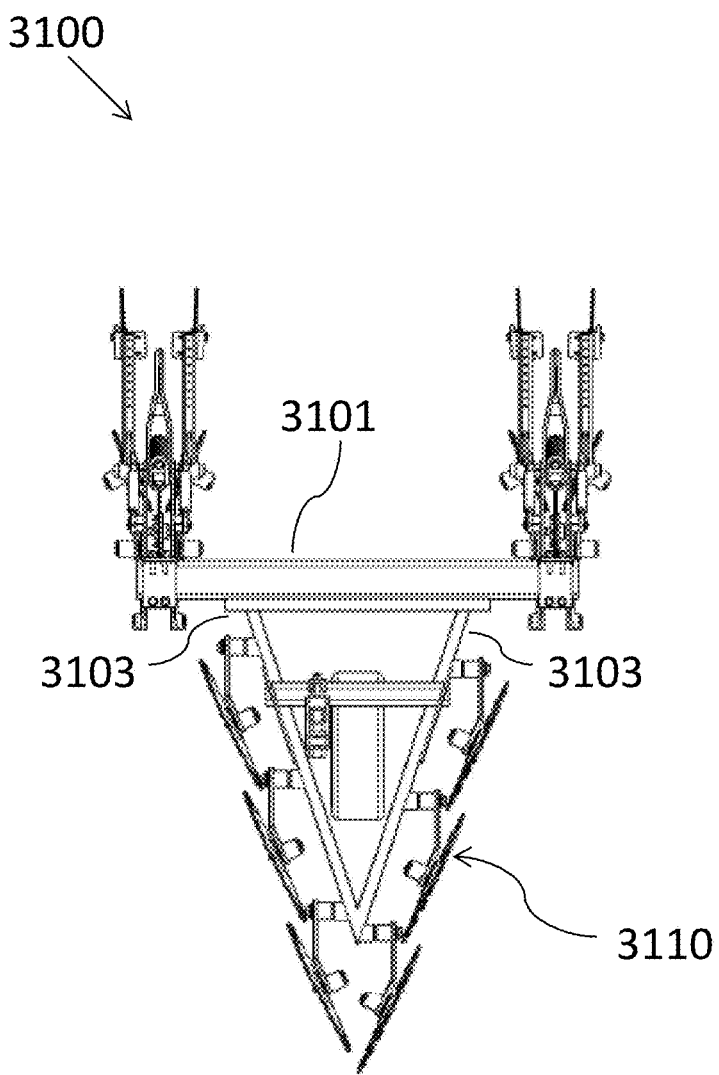
FIG. 31A shows a top aerial view of an embodiment of a bed top recycler agricultural implement assembled with an embodiment of the subject disk blades.
Figure 31B:
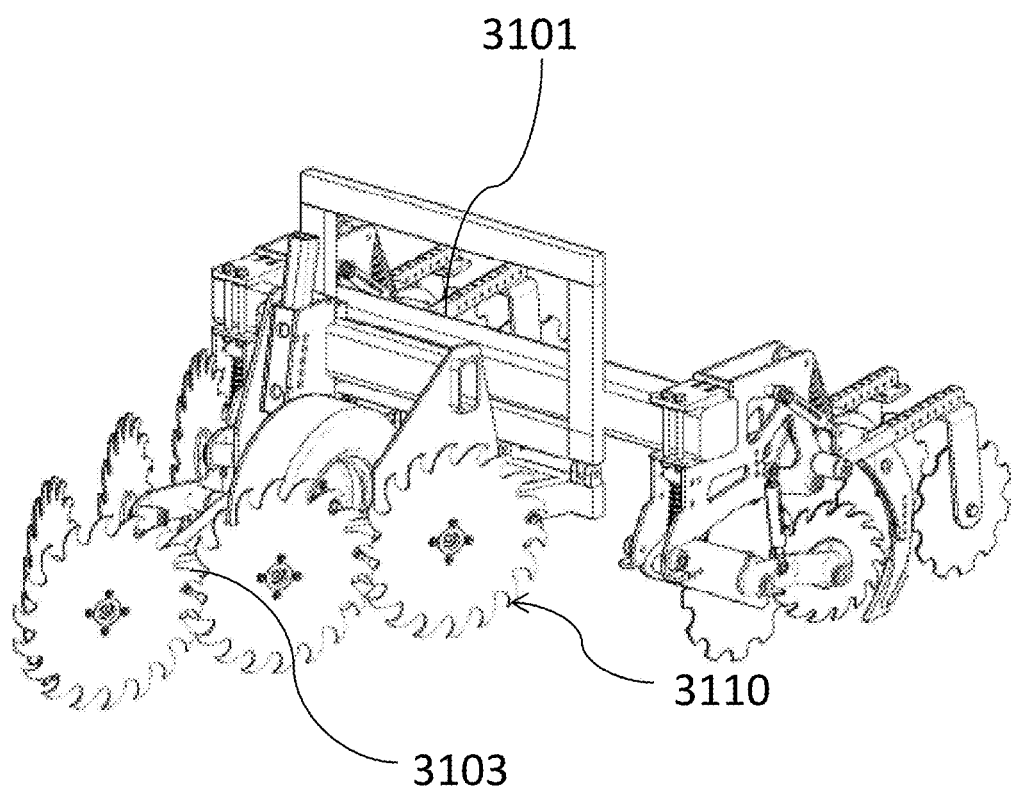
FIG. 31B shows a top plan view of the bed top recycler assembly.
Figure 31C:
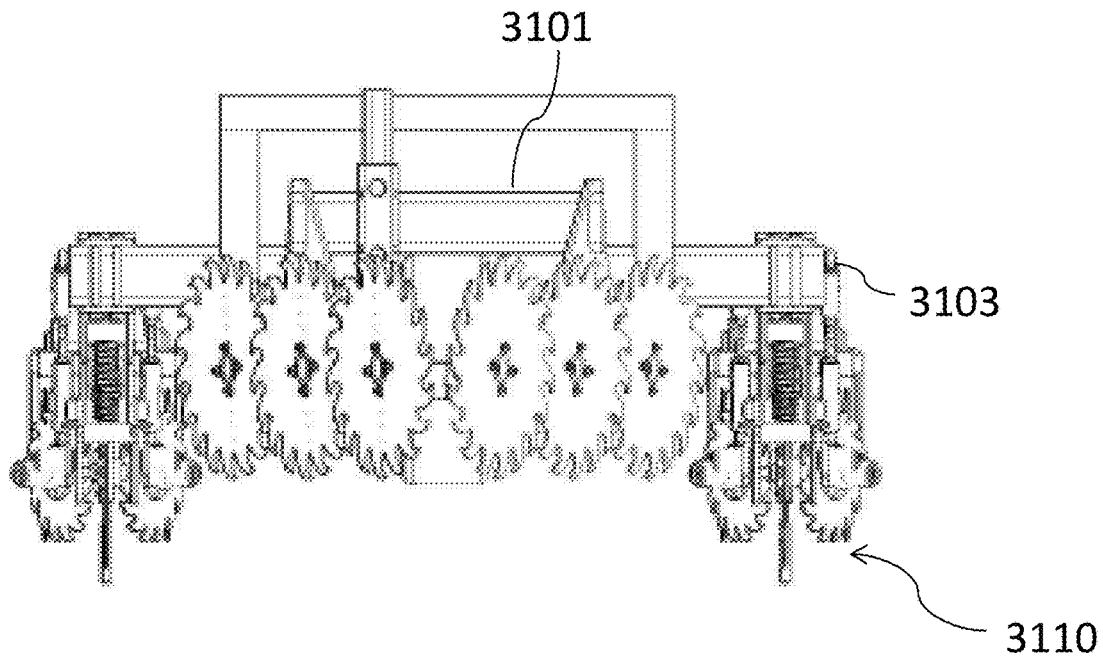
FIG. 31C shows a front view of the bed top recycler assembly.
Figure 31D:
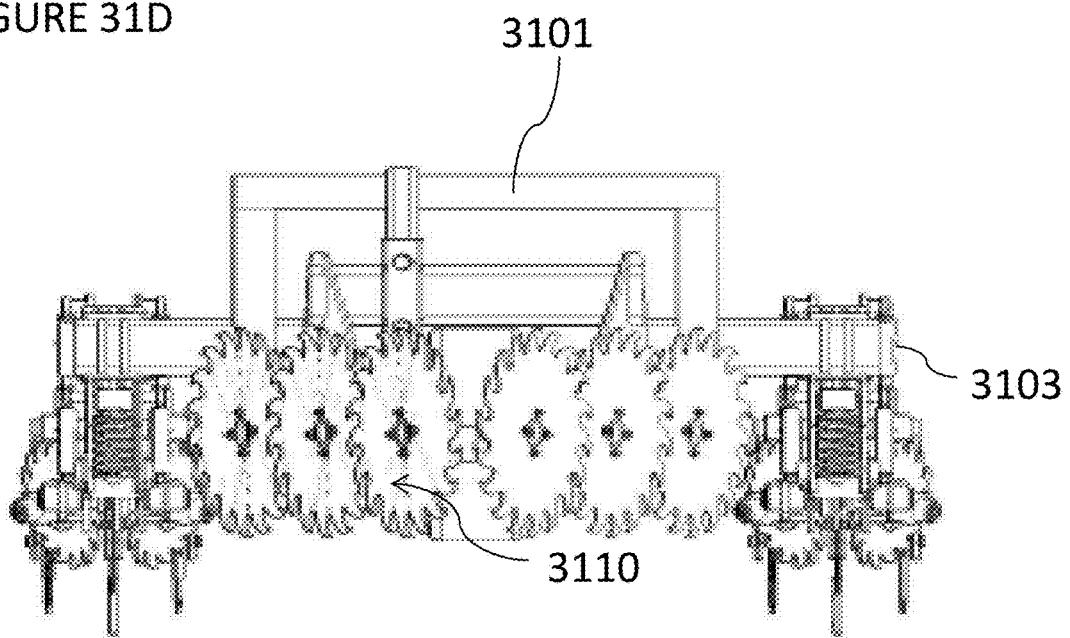
FIG. 31D shows another view of the front of the bed top recycler assembly.
Figure 31E:
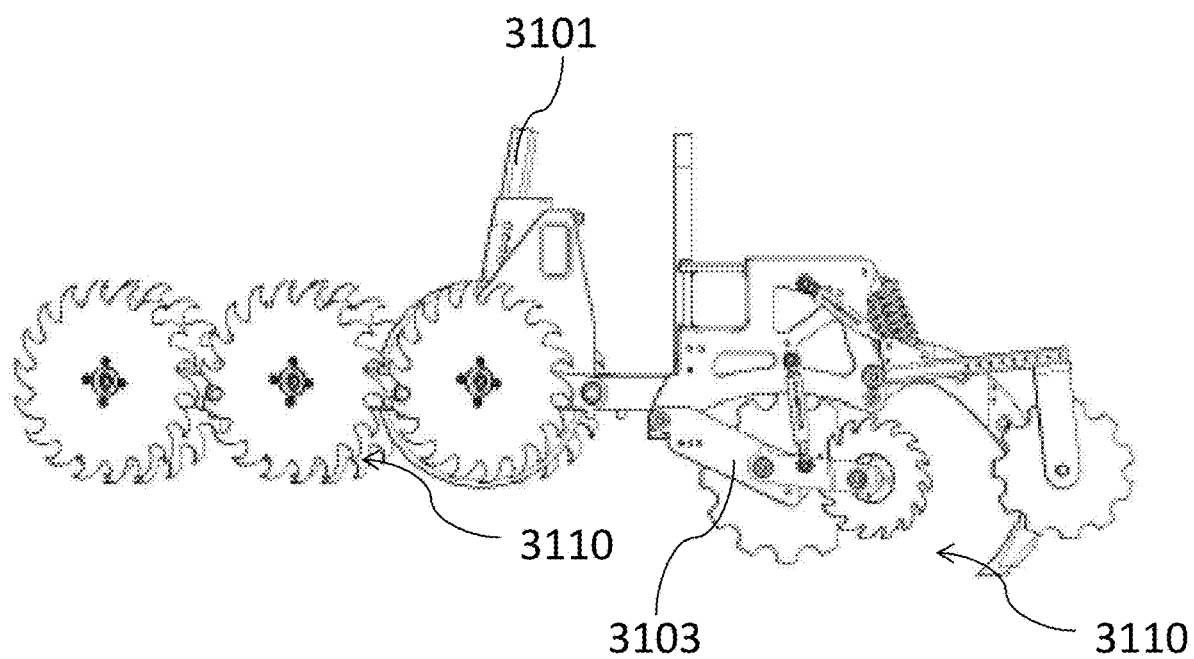
FIG. 31E shows a side view of the bed top recycler assembly.

FIGS. 31A-31E show views of an embodiment of a bed top recycler agricultural implement, shown generally at 3100. FIG. 31A shows a top aerial view of an embodiment of a bed top recycler agricultural implement assembled with an embodiment of the subject disk blades. FIG. 31B shows a top plan view of the bed top recycler assembly. FIG. 31C shows a front view of the bed top recycler assembly. FIG. 31D shows another view of the front of the bed top recycler assembly. FIG. 31E shows a side view of the bed top recycler assembly.

Referring to FIGS. 31A-31E, a bed top recycler agricultural implement is shown generally at 3100. Bed top recycler 3100 includes a carrier frame 3101 with one or more elliptical mounting bars 3103 having a first set of multiplicity of metal wheels having disk blades 3110 mounted thereon and one or more protruding mount bars 3104 extending laterally beyond the elliptical bars. A second set of disk blades 3120 are mounted on the protruding mount bars 3104. Disk blades 3110 and/or 3120 are either round or notched or toothed with a hub pattern and may include with finger or metal round or square bars (blade of FIG. 1, for example) curved to form part of an elliptical geometry inserted at a perpendicular angle to the vertical angle of the disk blade and inserted at locations equidistant around the disk blade and located within the body of the disk blade at variable depths from the outer perimeter of the disk blade having the round or square bars welded or joined together in varying distances of proximity one to another appointed to rotate in unison or at different speeds. The disk blades 3110 and/or 3120 can run straight or at an angle at different speeds of tillage.

The disk blades 3110 and/or 3120 may be sharpened disk blades and/or dull disk blades mounted on one of the elliptical and/or protruding mount bars. The sharpened disk blades are appointed to cut crop residue on a soil surface upon contact as the round bars hold crop residue in place thereby sizing residue. The dull blades are appointed to pinch and score crop residue thereby allowing for soil microorganisms to enter into crop residue and begin decomposition. A forward rotation geometry results from a combination of the one or more protruding/second set of blades beyond the elliptical bars to transfer kinetic energy of rotation into clods facilitating crumbling of soil clods into smaller aggregates. The soil is mixed as the round bars interact at a different angles to a plane of the soil lifting and mixing the soil, wherein as the disk blade rotates forward, it contacts crop residue on a surface of the soil pushing the residue into the soil as the round bars stir and compress soil around the residue. Soil is scored upon rotation of the harrow blade when it comes into contact with untilled soil, wherein when operated at an angle to the direction of forward movement, the harrow wheel lifts and tills the soil.

Figure 32A:
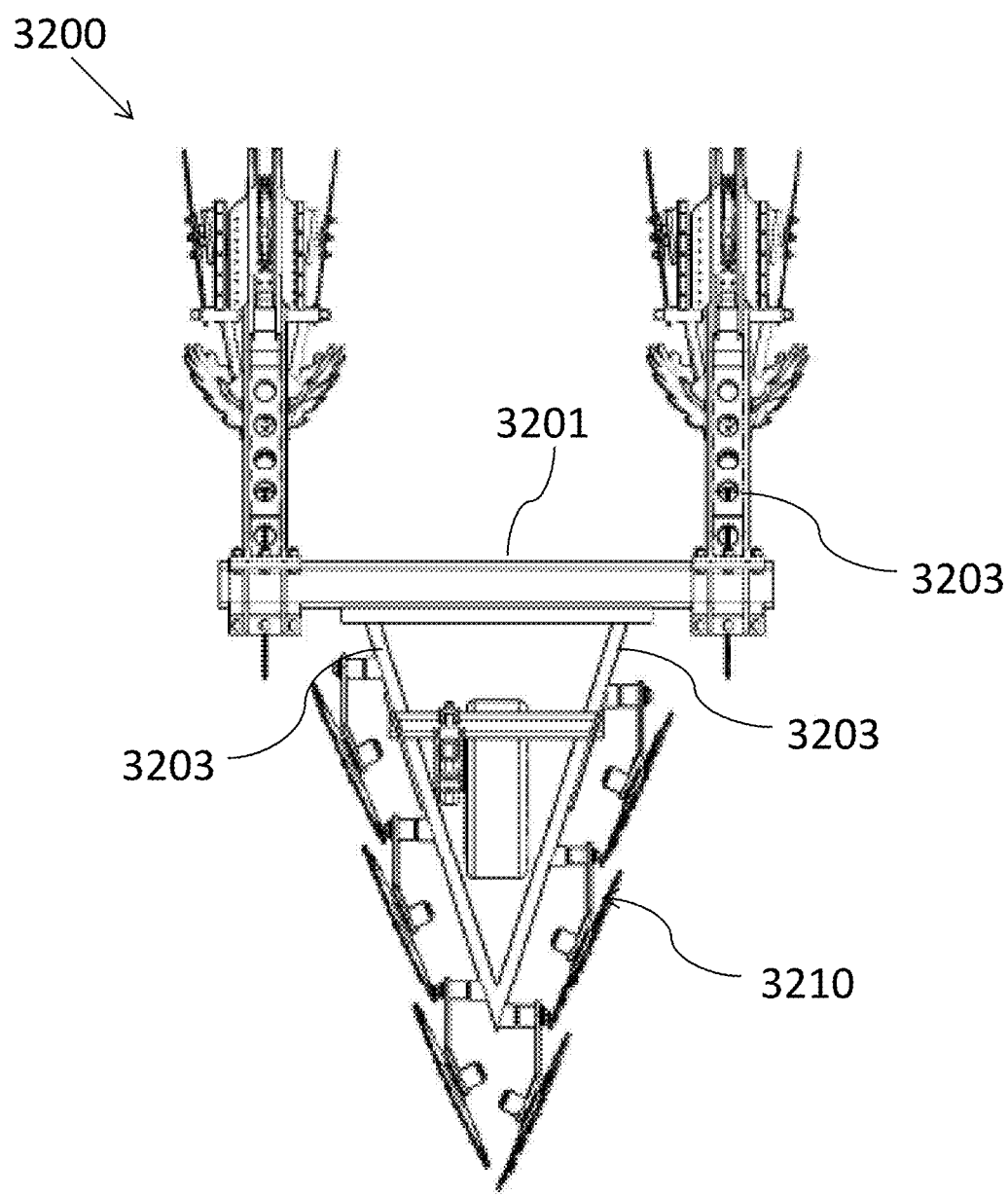
FIG. 32A shows a top aerial view of an embodiment of a bed top recycler agricultural implement assembled with an embodiment of the subject disk blades.
Figure 32B:
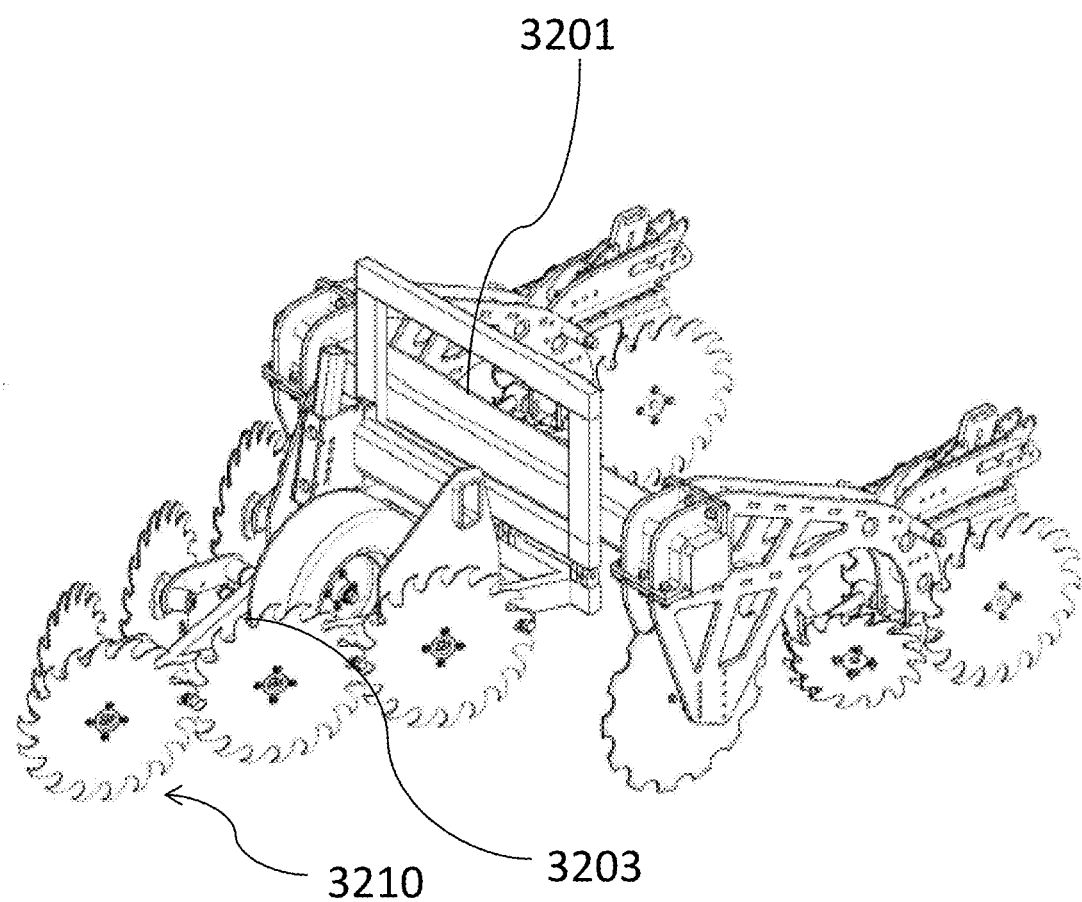
FIG. 32B shows a top plan view of the bed top recycler assembly.
Figure 32C:
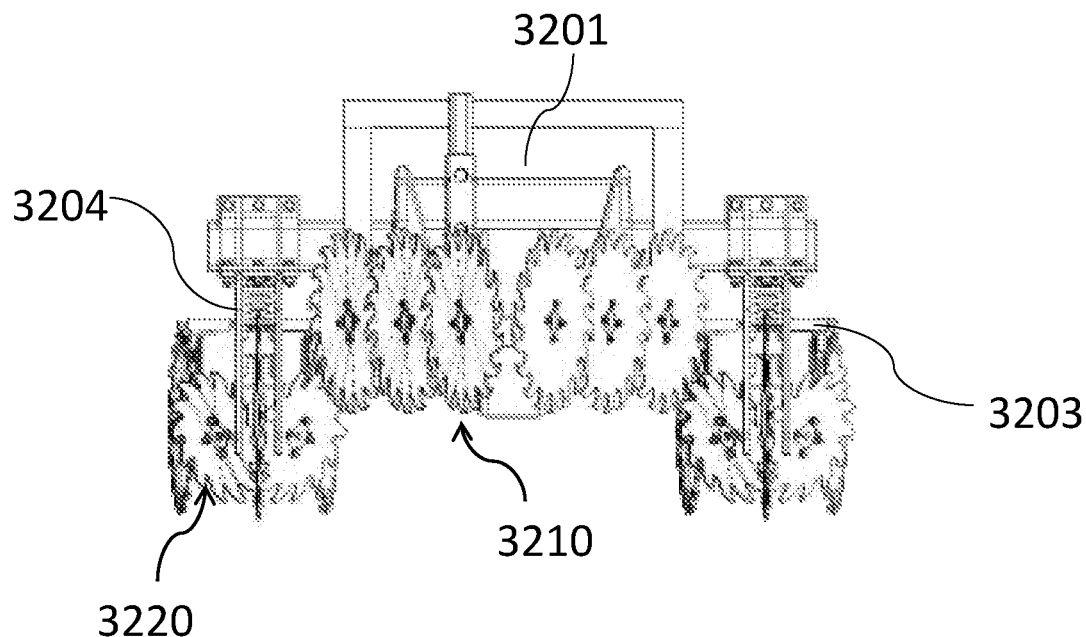
FIG. 32C shows a front view of the bed top recycler assembly.
Figure 32D:
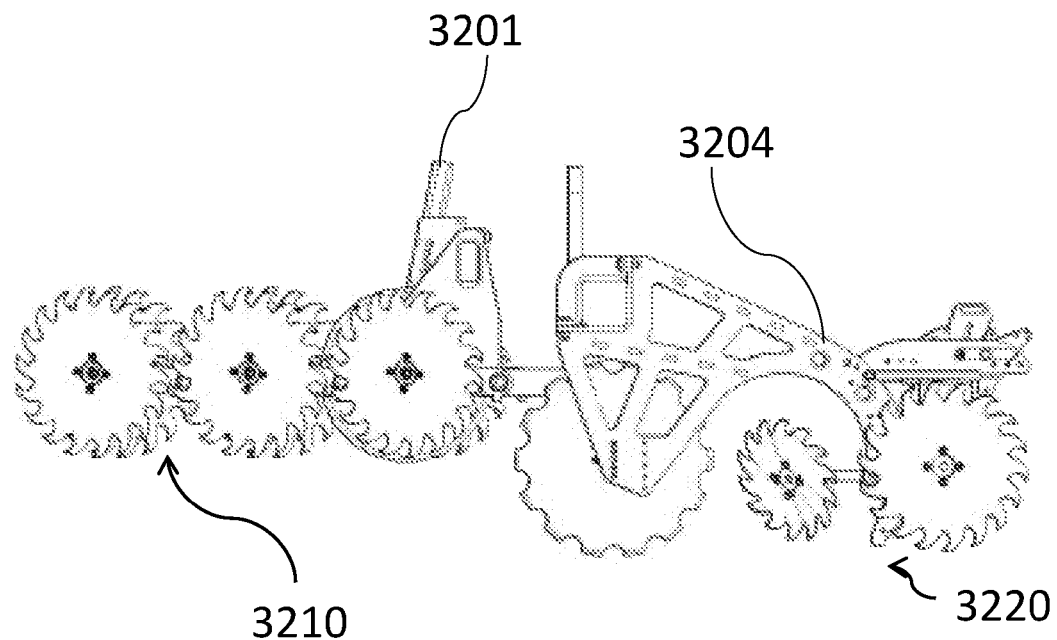
FIG. 32D shows a side view of the bed top recycler assembly.

FIGS. 32A-32D show views of an embodiment of a bed top recycler agricultural implement. FIG. 32A shows a top aerial view of an embodiment of a bed top recycler agricultural implement assembled with an embodiment of the subject disk blades. FIG. 32B shows a top plan view of the bed top recycler assembly. FIG. 32C shows a front view of the bed top recycler assembly. FIG. 32D shows a side view of the bed top recycler assembly. A bed top recycler agricultural implement is shown generally at 3200. Bed top recycler 3200 includes a carrier frame 3201 with mounting bars 3203 and 3204 as discussed regarding FIGS. 31A-31D. Disk blades 3210, 3220 are mounted along mounting bars 3203, 3204.

Figure 33A:
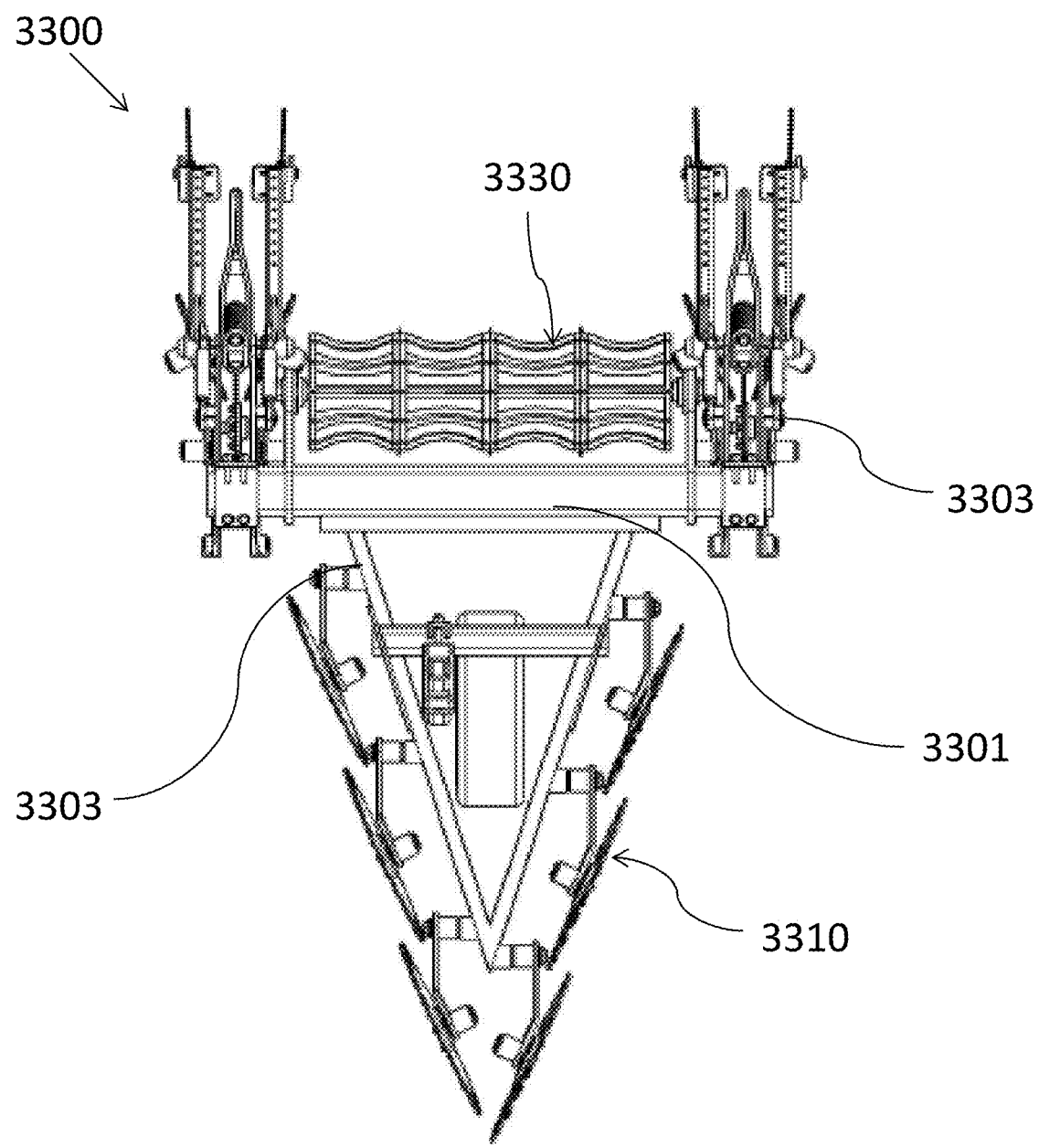
FIG. 33A shows a top aerial view of an embodiment of a rear harrow agricultural implement assembled with an embodiment of the subject disk blades.
Figure 33B:
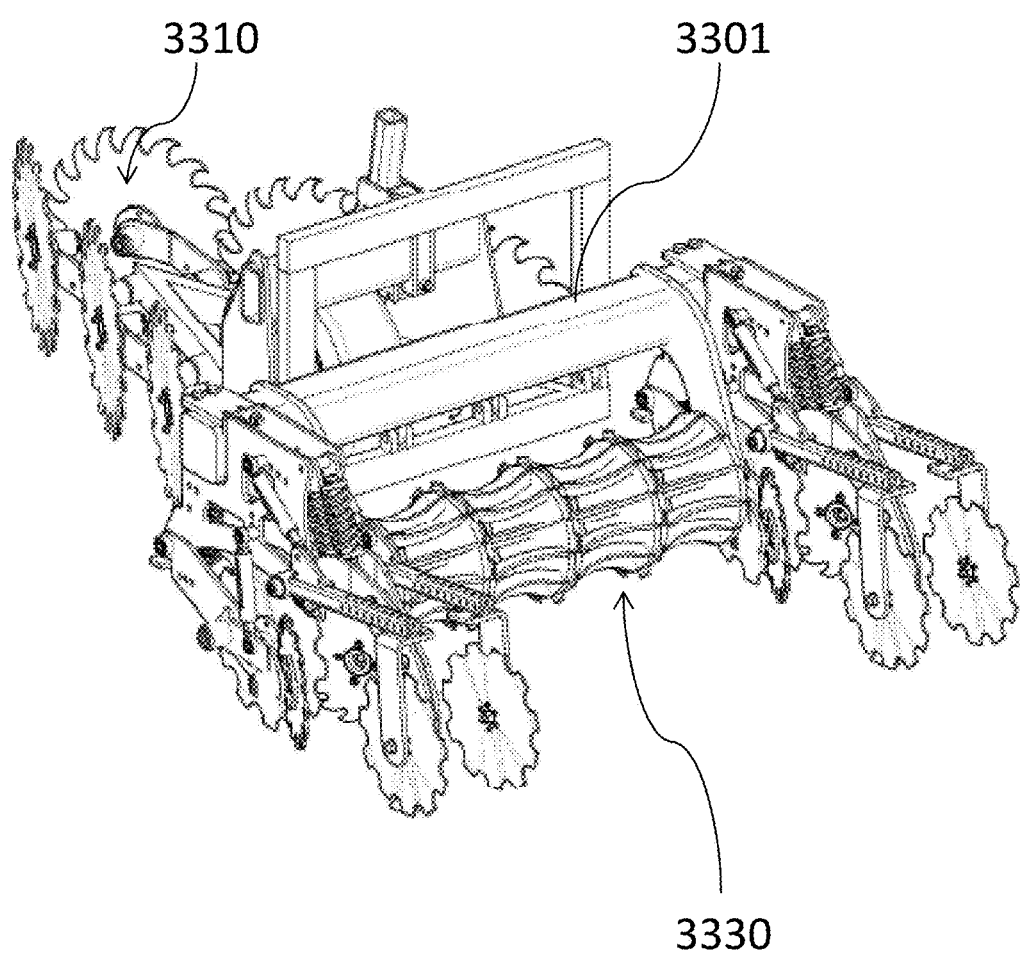
FIG. 33B shows a top plan view of the rear harrow assembly.
Figure 33C:
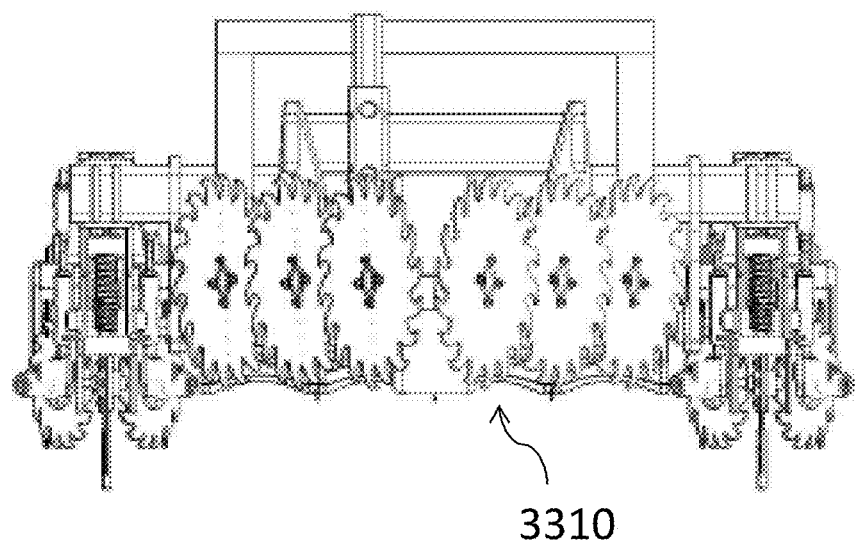
FIG. 33C shows a front view of the rear harrow assembly.
Figure 33D:
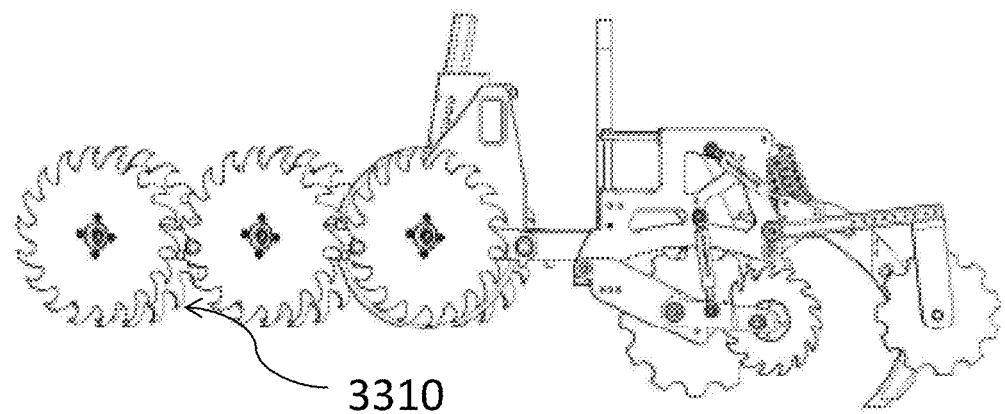
FIG. 33D shows a side view of the rear harrow assembly.

FIGS. 33A-33D show views of an embodiment of a rear harrow agricultural implement. FIG. 33A shows a top aerial view of an embodiment of a rear harrow agricultural implement assembled with an embodiment of the subject disk blades. FIG. 33B shows a top plan view of the rear harrow assembly. FIG. 33C shows a front view of the rear harrow assembly. FIG. 33D shows a side view of the rear harrow assembly. A rear harrow agricultural implement is shown generally at 3300. Rear harrow 3300 includes a carrier frame 3301 with mounting bars (elliptical) 3303 and (protruding) 3304. Disk blades 3310, 3320 are mounted along mounting bars 3203, 3204. A set of interconnected disk blades 3330 is also mounted on the harrow assembly.

Figure 34A:
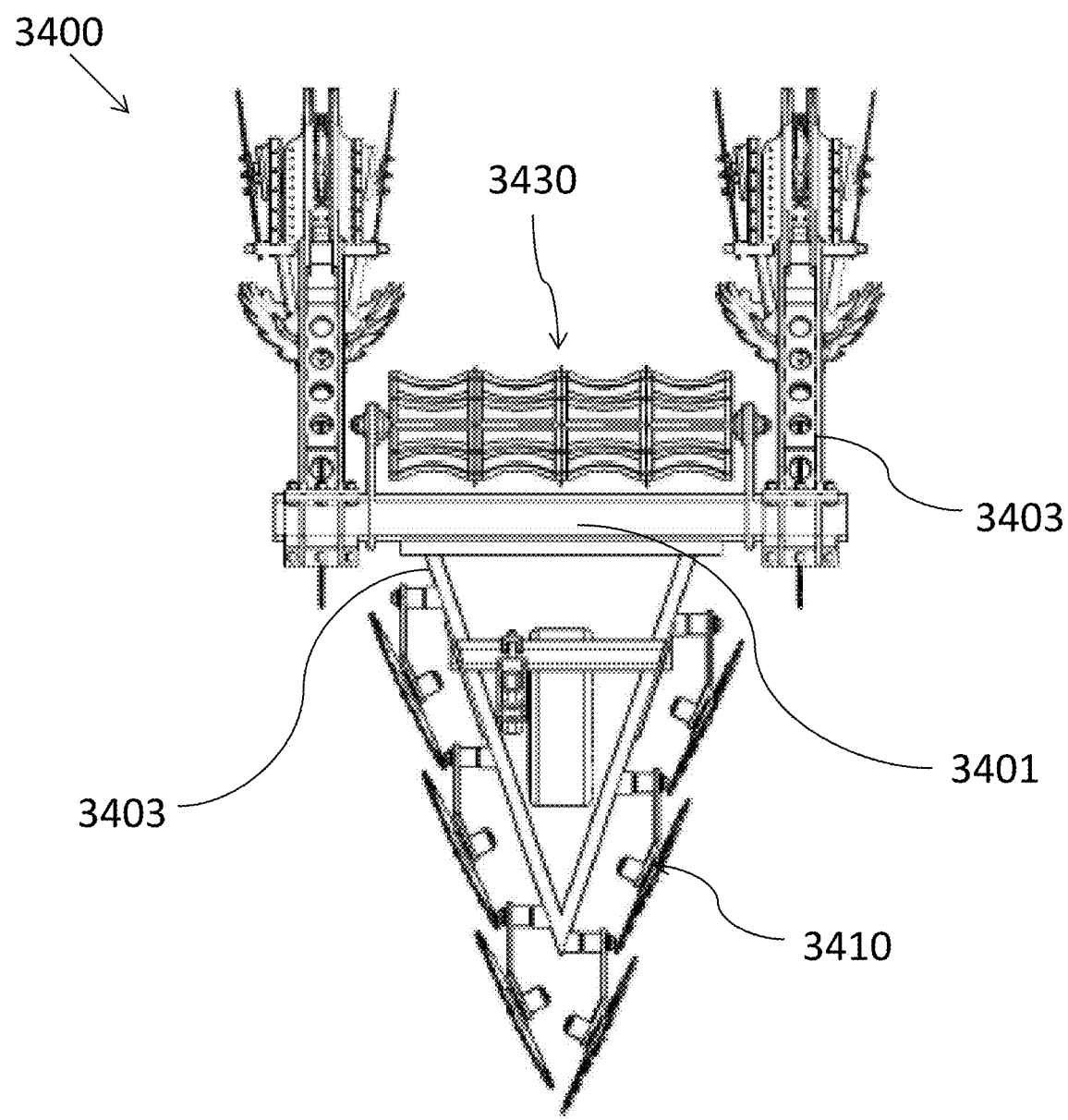
FIG. 34A shows a top aerial view of an embodiment of a rear harrow agricultural implement assembled with an embodiment of the subject disk blades.
Figure 34B:
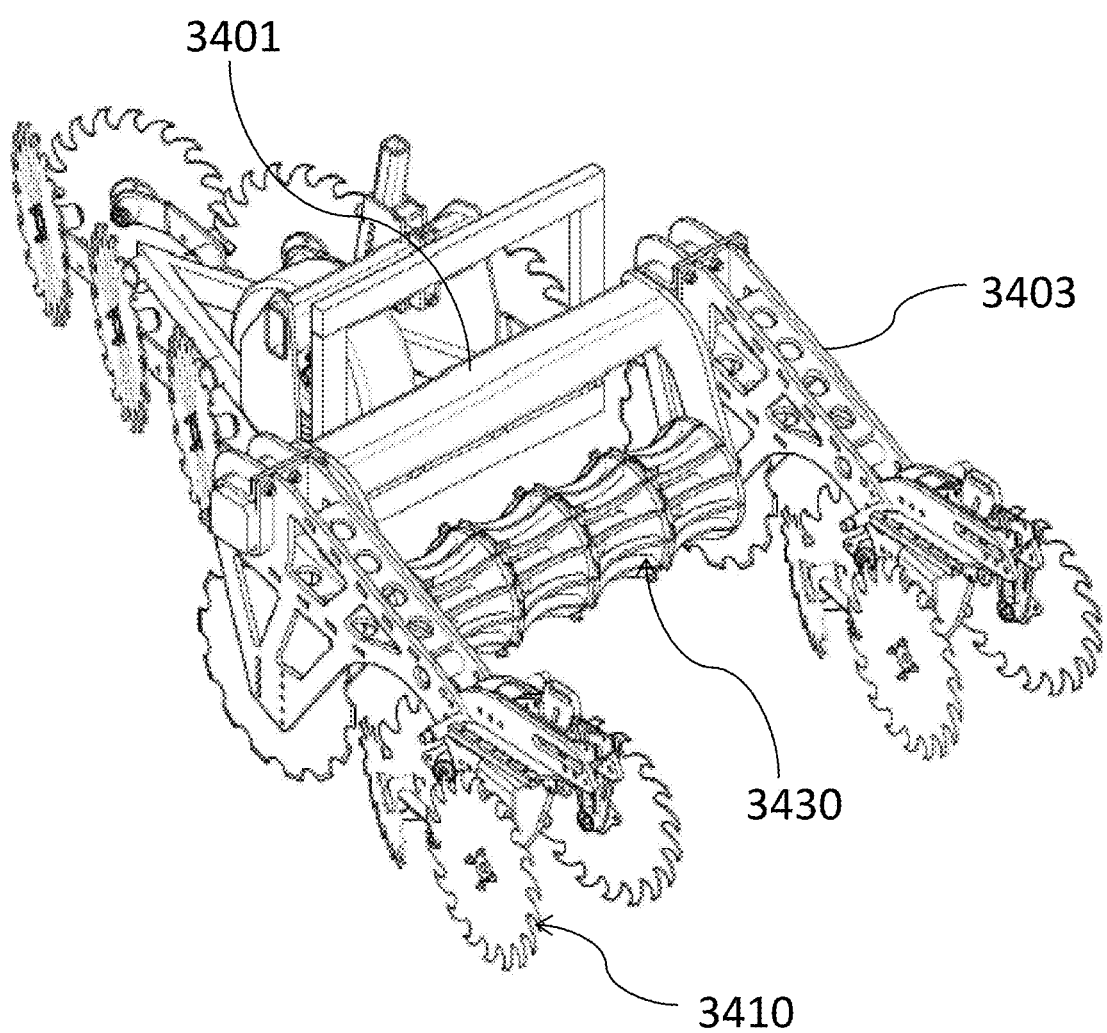
FIG. 34B shows a top plan view of the rear harrow assembly.
Figure 34C:
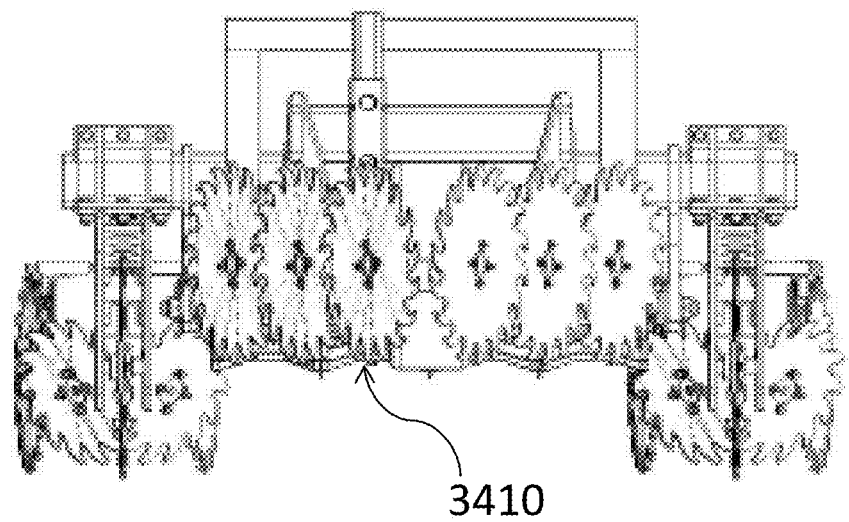
FIG. 34C shows a front view of the rear harrow assembly.
Figure 34D:
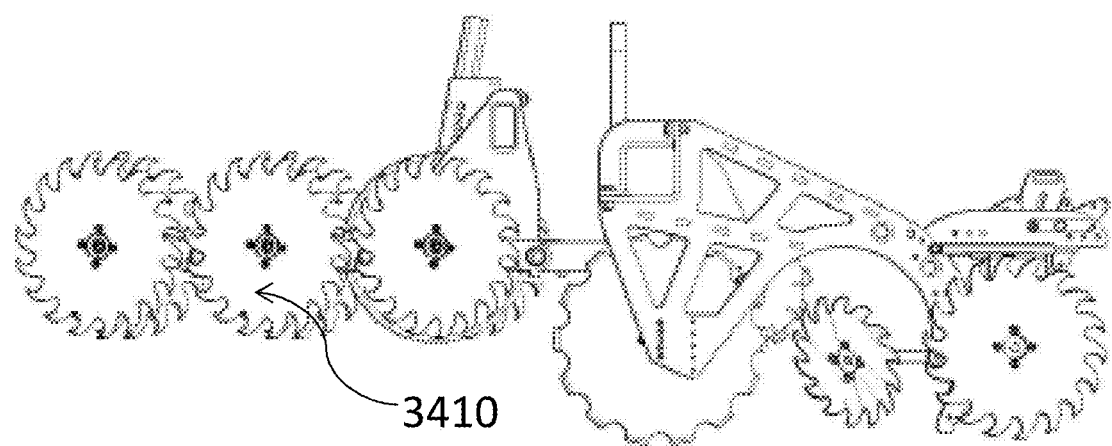
FIG. 34D shows a side view of the rear harrow assembly.

FIGS. 34A-34D show views of an embodiment of a rear harrow agricultural implement. FIG. 34A shows a top aerial view of an embodiment of a rear harrow agricultural implement assembled with an embodiment of the subject disk blades. FIG. 34B shows a top plan view of the rear harrow assembly. FIG. 34C shows a front view of the rear harrow assembly. FIG. 34D shows a side view of the rear harrow assembly. A rear harrow agricultural implement is shown generally at 3400. Rear harrow 3400 includes a carrier frame 3401 with mounting bars (elliptical) 3303 and (protruding) 3304. Disk blades 3310, 3320 are mounted along mounting bars 3203, 3204. A set of interconnected disk blades 3330 is also mounted on the harrow assembly. A set of interconnected disk blades 3430 is also mounted on the harrow assembly.

FIGS. 35A-35C show views of a bed recycler blade having a square tooth. FIG. 35A shows a top aerial view of an embodiment of a bed recycler square tooth. FIG. 35B shows a side plan view of the bed recycler square tooth. FIG. 35C shows a top plan view of the bed recycler square tooth. The bed recycler blade is shown generally at 3500. Bed recycler blade 3500 includes a blade body 3501 with a blade perimeter 3504 and a blade hub 3502 and one or more spokes with openings 3503 meeting at the blade hub 3502. Blade perimeter 3504 includes a blade edge 3505 with protrusions, herein shown as square teeth 3506 extending laterally therefrom.

Figure 36A:
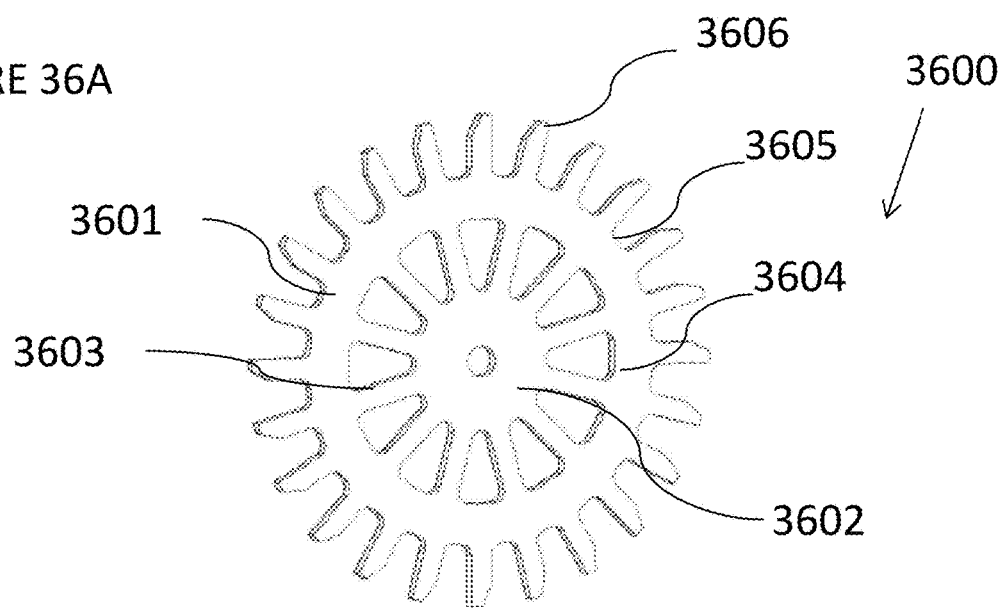
FIG. 36A shows a top aerial view of an embodiment of a bed recycler spike tooth.
Figure 36B:
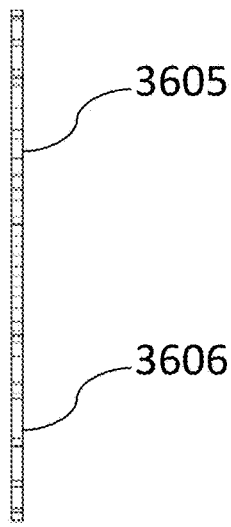
FIG. 36B shows a side plan view of the bed recycler spike tooth.
Figure 36C:
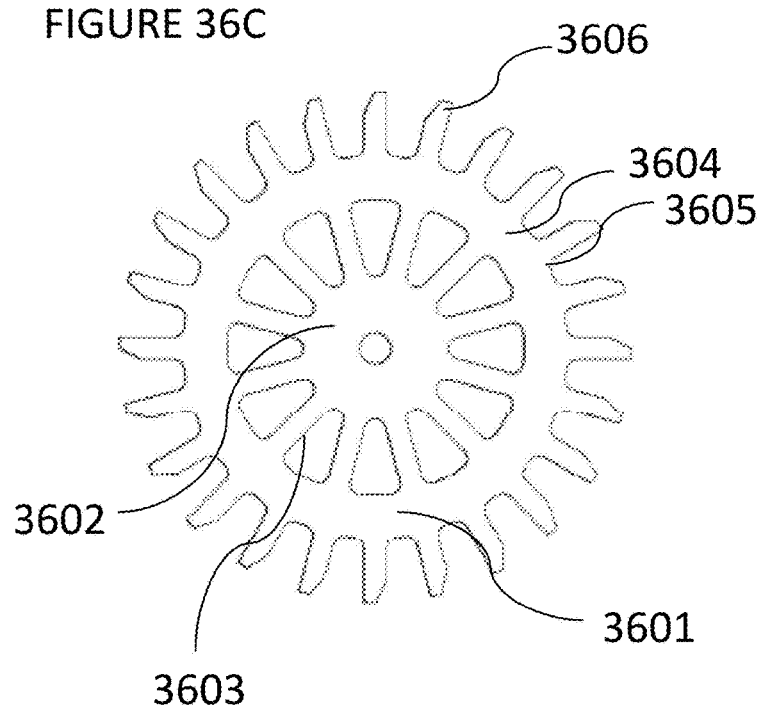
FIG. 36C shows a top plan view of the bed recycler spike tooth.

FIGS. 36A-36C show views of a bed recycler blade having a spike tooth. FIG. 36A shows a top aerial view of an embodiment of a bed recycler spike tooth. FIG. 36B shows a side plan view of the bed recycler spike tooth. FIG. 36C shows a top plan view of the bed recycler spike tooth. The bed recycler blade is shown generally at 3600. Bed recycler blade 3600 includes a blade body 3601 with a blade perimeter 3604 and a blade hub 3602 and one or more spokes with openings 3603 meeting at the blade hub 3602. Blade perimeter 3604 includes a blade edge 3605 with protrusions, herein shown as spike teeth 3606 extending laterally therefrom.

Figure 37A:
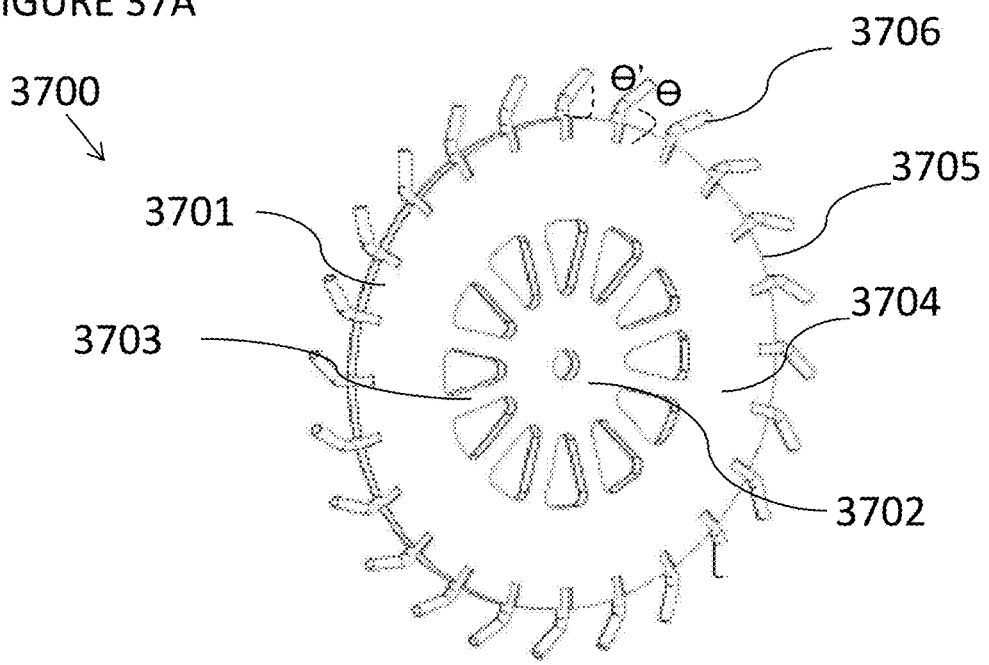
FIG. 37A shows a top aerial view of an embodiment of a bed recycler snake tooth.
Figure 37B:
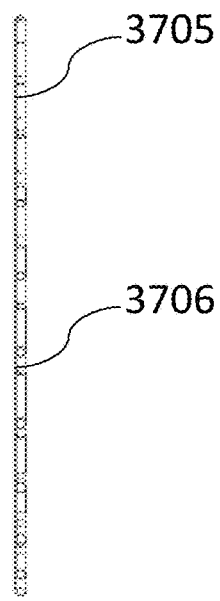
FIG. 37B shows a side plan view of the bed recycler snake tooth.
Figure 37C:
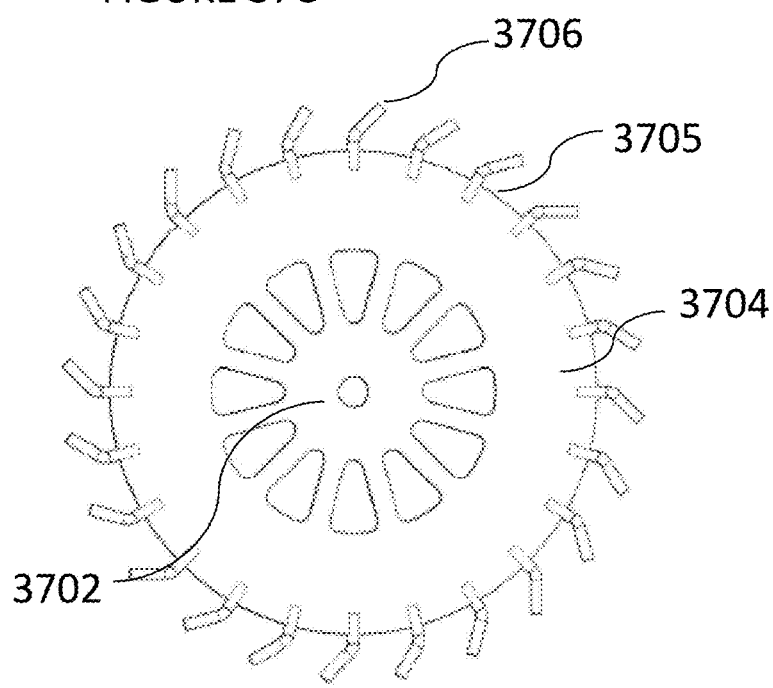
FIG. 37C shows a top plan view of the bed recycler snake tooth.

FIGS. 37A-37C show views of a bed recycler blade having a snake tooth. FIG. 37A shows a top aerial view of an embodiment of a bed recycler snake tooth. FIG. 37B shows a side plan view of the bed recycler snake tooth. FIG. 37C shows a top plan view of the bed recycler snake tooth. The bed recycler blade is shown generally at 3700. Bed recycler blade 3700 includes a blade body 3701 with a blade perimeter 3704 and a blade hub 3702 and one or more spokes with openings 3703 meeting at the blade hub 3702. Blade perimeter 3704 includes a blade edge 3705 with protrusions, herein shown as snake teeth 3706 extending laterally therefrom. Snake teeth 3706 protrude from edge 3705 at an angle $\Theta$ and include $\Theta'$ at or near a center point of the protrusion/teeth 3706.

Figure 38A:
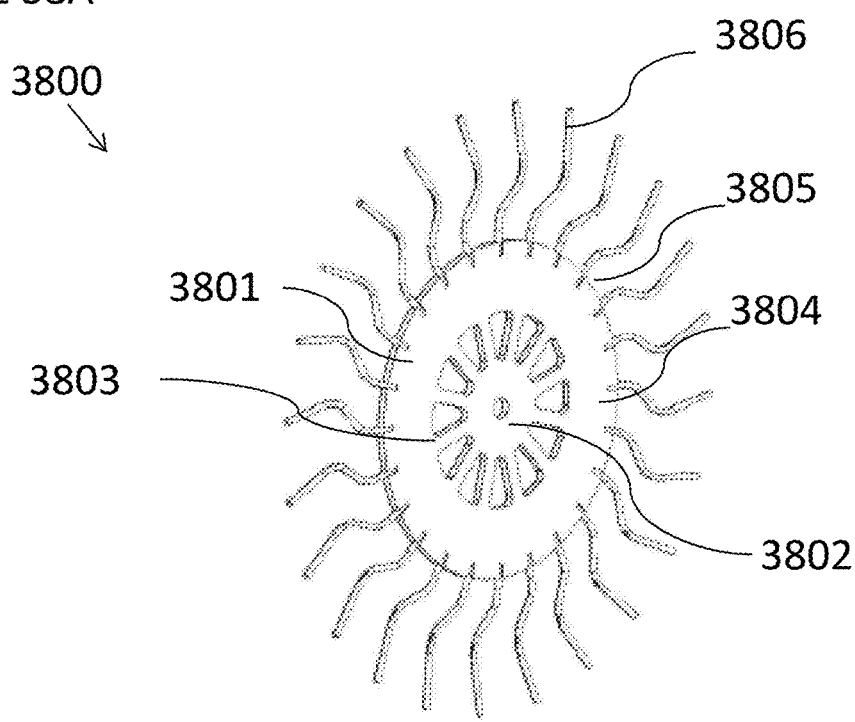
FIG. 38A shows a top aerial view of an embodiment of a bed recycler rake blade.
Figure 38B:
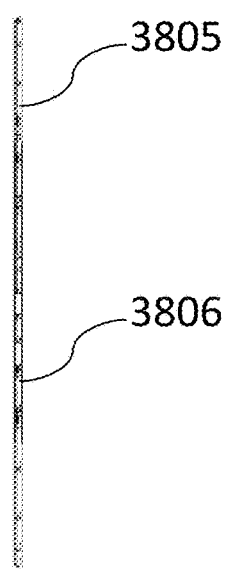
FIG. 38B shows a side plan view of the rake blade.
Figure 38C:
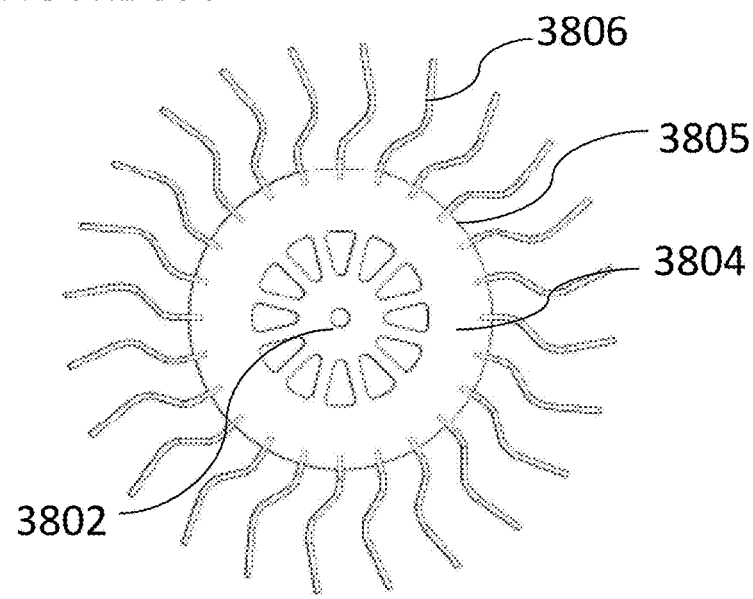
FIG. 38C shows a top plan view of the rake blade.

FIGS. 38A-38C show views of a bed recycler rake blade. FIG. 38A shows a top aerial view of an embodiment of a bed recycler rake blade. FIG. 38B shows a side plan view of the rake blade. FIG. 38C shows a top plan view of the rake blade. The bed recycler rake blade is shown generally at 3800 including a blade body 3801 with a blade perimeter 3804 and a blade hub 3802 and one or more spokes with openings 3803 meeting at the blade hub 3802. Blade perimeter 3804 includes a blade edge 3805 with protrusions, herein shown as snake teeth 3806 extending laterally therefrom. Snake teeth 3806 protrude from edge 3805 at an angle $\Theta$ and include $\Theta'$ at or near a center point of the protrusion/teeth 3806.

Figure 39A:
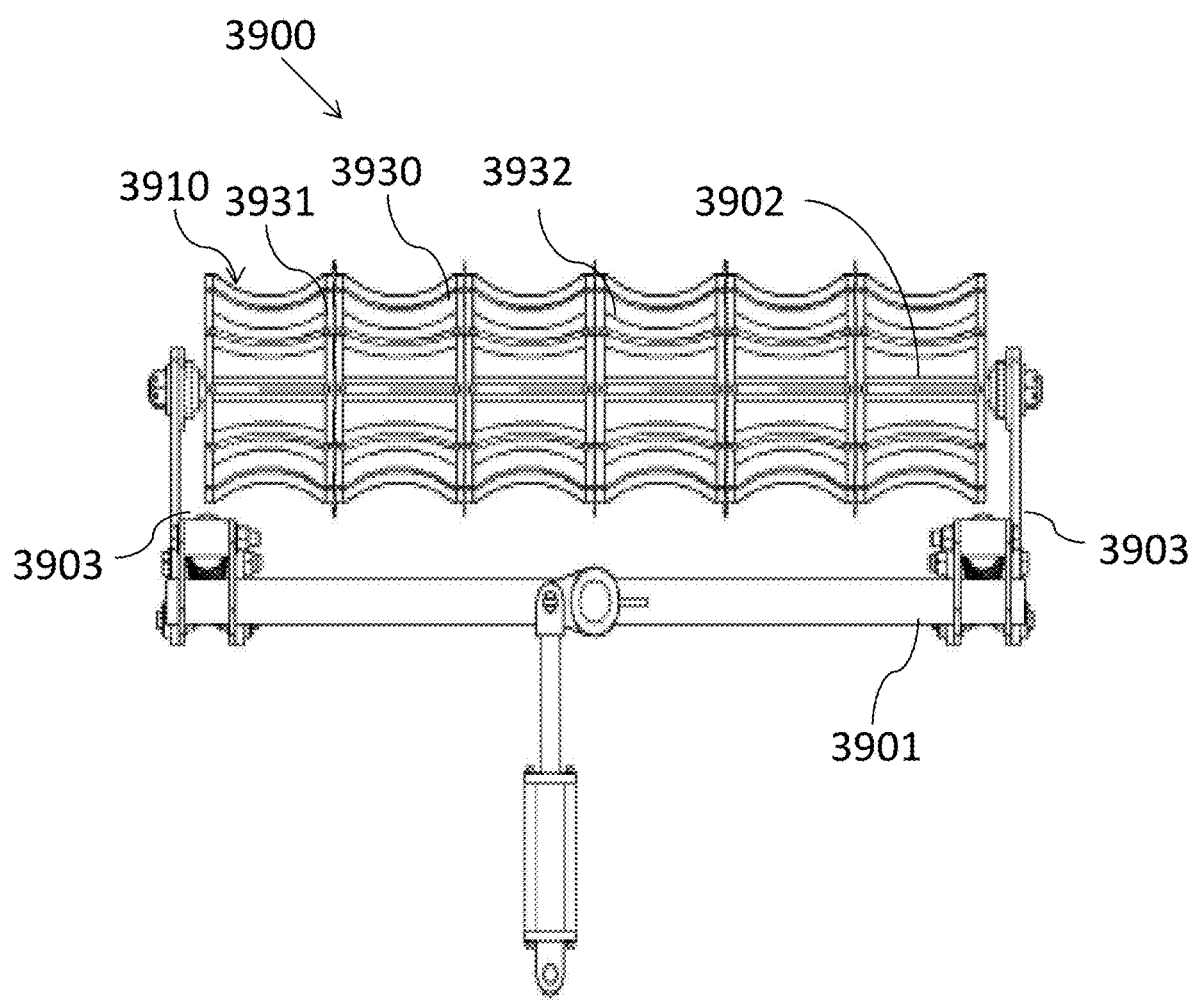
FIG. 39A shows a top plan view of an embodiment of a stubble smasher assembly 72" basket agricultural implement assembled with an embodiment of the subject disk blades.
Figure 39B:
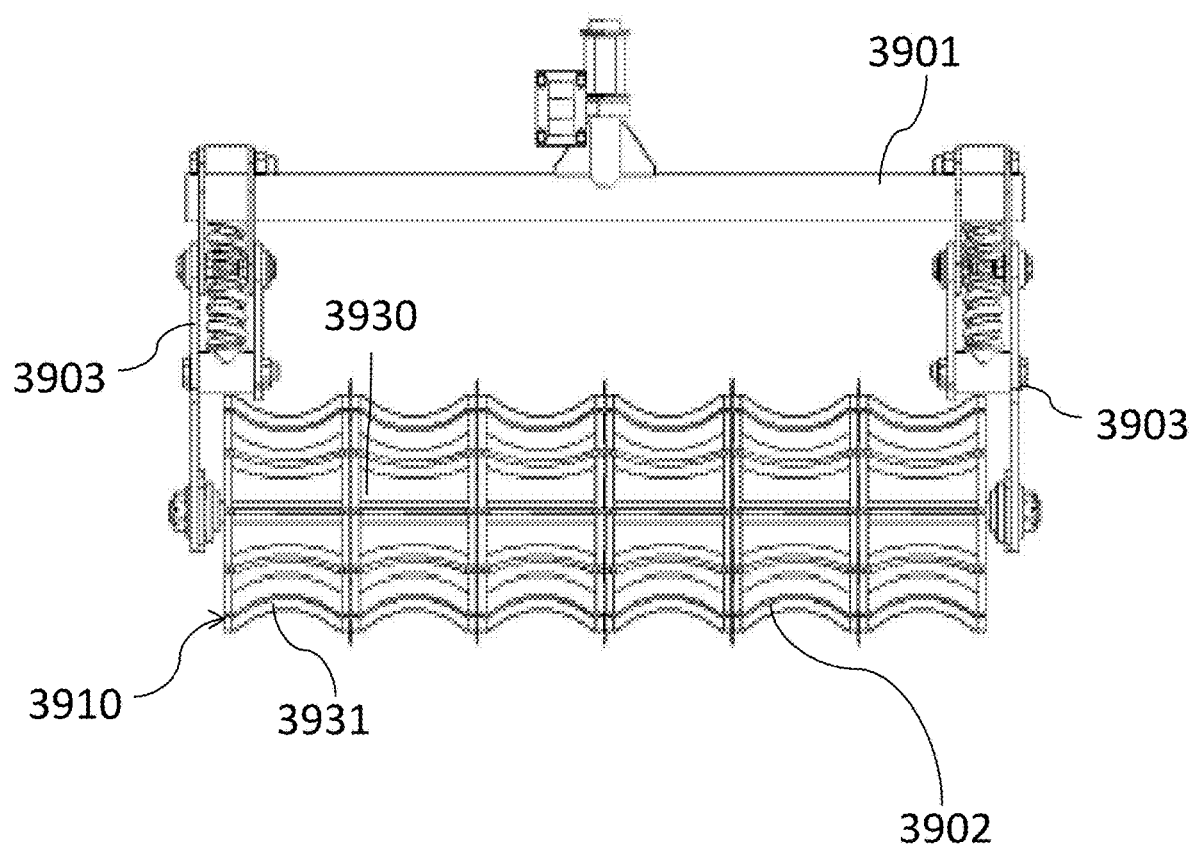
FIG. 39B shows a bottom plan view of the stubble smasher of FIG. 39A.
Figure 39C:
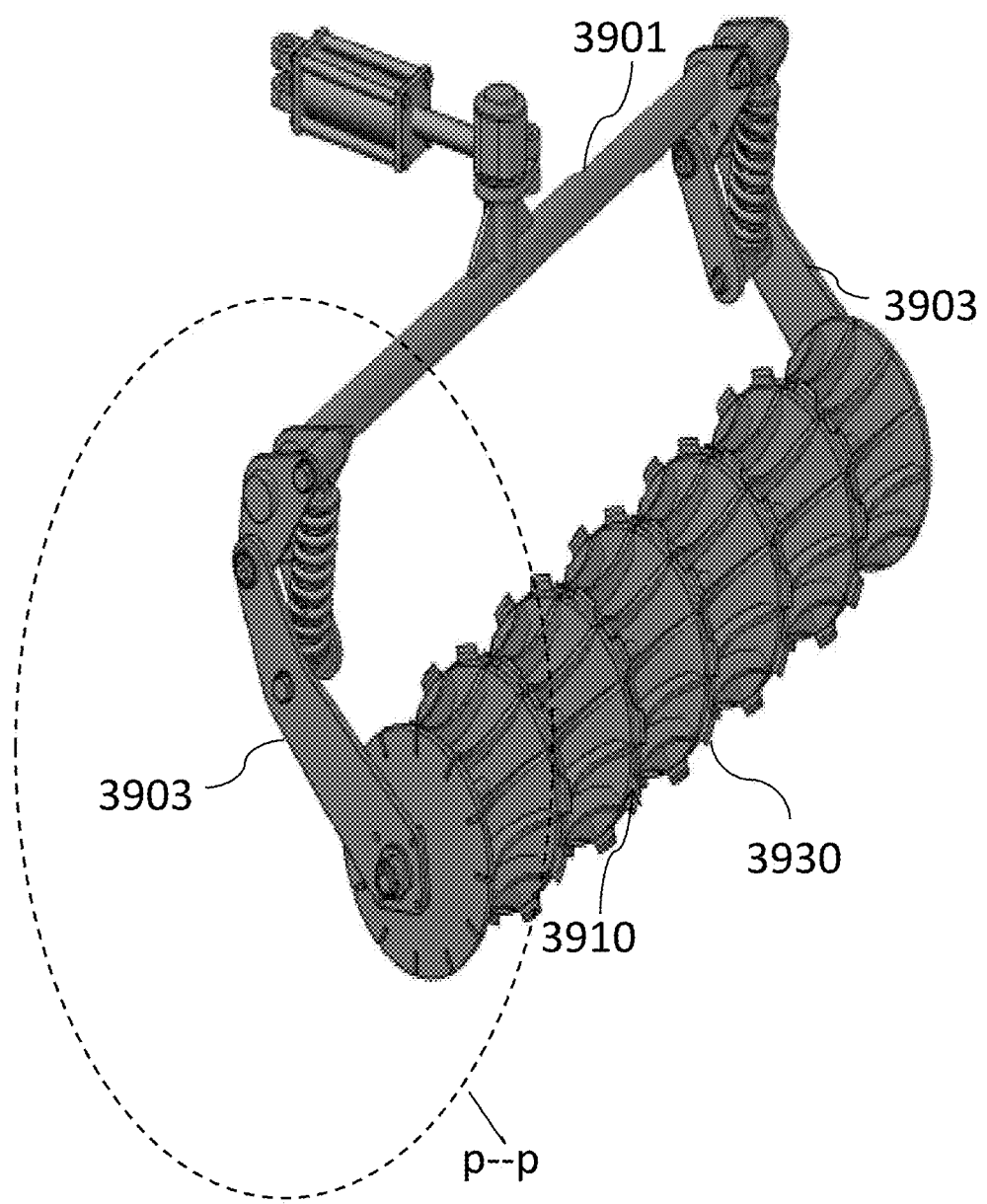
FIG. 39C shows a top side plan view of the stubble smasher of FIG. 27.
Figure 39D:
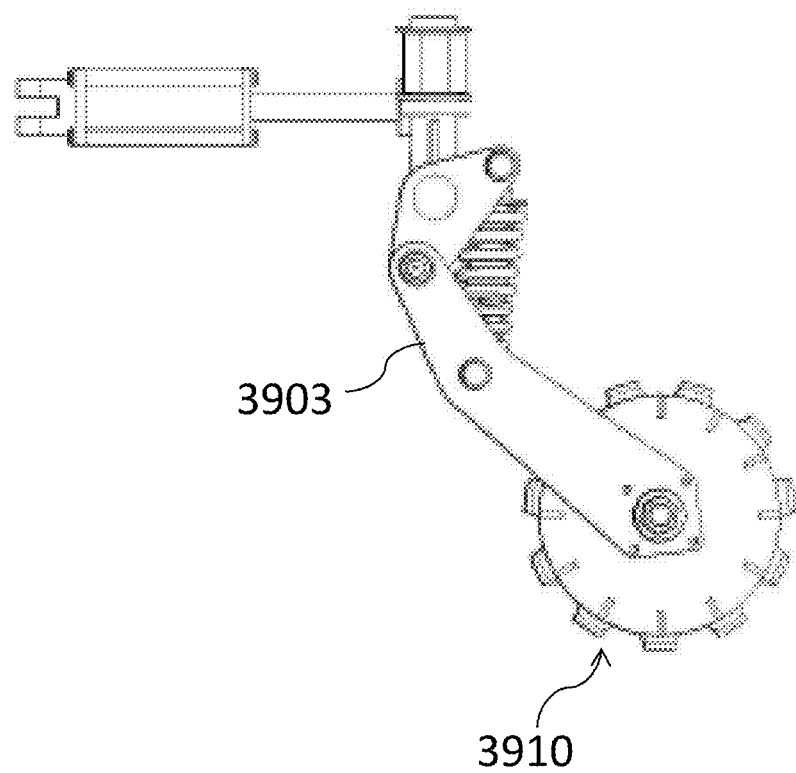
FIG. 39D shows a cross-section top side view of the assembly taken along p-p of FIG. 27C, showing connection of the agricultural implement to the disk.

FIGS. 39A-39D illustrate vies of a stubble smasher assembly with a 72" basket. FIG. 39A shows a top plan view of an embodiment of a stubble smasher assembly 72" basket agricultural implement assembled with an embodiment of the subject disk blades. FIG. 39B shows a bottom plan view of the stubble smasher of FIG. 39A. FIG. 39C shows a top side plan view of the stubble smasher of FIG. 27A. FIG. 39D shows a cross-section top side view of the assembly taken along p-p of FIG. 27C, showing connection of the agricultural implement to the disk.

Referring to FIGS. 39A-39D, stubble smasher 3900 has a carrier frame 3901 with mounting bar 3902 and end brackets 3903. Disk blades 3910 are interconnected with a central frame/basket 3930 forming a stubble smasher mounted along mounting bar 3902. Disk blades 3910 are formed herein as substantially flat disk plates having interconnected protrusions or flanges 3931 forming the central frame or basket 3930. Flanges 3931 extend from the side wall of a first disk blade and connected to a horizontally parallel side wall of a second neighboring disk blade. Flanges 3931 are preferably formed having an arch or substantially central curvature 3932 so that the formed central frame or basket 3930 substantially central curvature 3932 portion of the basket 3930 has a diameter d that is less than the diameter r at the outer portion of the basket 3930. Although the disk blades 3910 are shown herein as being continuous flat disk plates without protrusions or fingers, disk blades having the protrusions or fingers can also be interconnected (see for example, FIG. 30A-30B. The type of stubble smasher/interconnected disk blades is dependent on the type of soil, water drainage and the type of crop to suit agricultural needs.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A disk blade comprising an outer perimeter, a first side wall, a second side wall, and a central hub, wherein a plurality of fingers extend laterally at an angle Θ from said first side wall, said disk blade being comprised of a metal wheel having a sharpened notched disk blade with a hub pattern and wherein said fingers comprise metal round bars curved to from part of an elliptical geometry inserted at a perpendicular angle to the vertical angel of the blade and inserted at locations equidistant around the blade and located within the bottom of the notches at a depth from the outer perimeter of the blade so that there exist an equal number of notches and round bars.

2. The disk blade of claim 1, wherein said fingers extend laterally from said first side wall and said second side wall.

3. The disk blade of claim 1, wherein said fingers comprise metal round bars curved to form part of an elliptical geometry inserted at a perpendicular angle to a vertical angle of said disk blade, arranged at locations equidistant around said disk blade, and at a depth x from said outer perimeter of said disk blade.

4. The disk blade of claim 3, wherein said depth x is at least ≥one (1) inch.

5. The disk blade of claim 1, wherein said disk blade is a substantially flat circular disk having a hub pattern.

6. The disk blade of claim 1, wherein said disk blade is a concave circular disk having a hub pattern.

7. The disk blade of claim 1, wherein said disk blade is a single disk blade and said fingers extend laterally from said first side wall and said second side wall.

8. The disk blade of claim 1, wherein said disk blade is a dual disk blade formed by two disk blades mounted together on said second side wall, and wherein said fingers extend laterally from said first side wall of each disk blade.

9. The disk blade of claim 1, wherein said angle Θ is ≤90°.

10. The disk blade of claim 1, wherein said outer perimeter of said disk blade includes a tooth blade edge.

11. The disk blade of claim 1, wherein said outer perimeter of said disk blade includes a blade edge.

12. The disk blade of claim 1, wherein said central hub comprises a central aperture for attachment of said disk blade to another blade surface.

13. The disk blade of claim 12, wherein said central hub comprises at least one cutout and at least 4-hole apertures for mounting said disk blade to another blade surface.

14. The disk blade of claim 1, wherein said central hub comprises at least one cutout.

15. The disk blade of claim 1, wherein said central hub comprises at least 4-hole apertures for mounting said disk blade to another blade surface.

16. The disk blade of claim 1, wherein said central hub comprises a central aperture extending through said first and second wall and said disk blade is cut in half to form two equal half moon sections adapted to mate to a ring configuration, and being appointed to be mounted onto another blade surface.

17. The disk blade of claim 1, wherein two or more of said disk blades are interconnected together by way of two or more flanges forming a central frame or basket between said interconnected disk blades.

18. A disk blade comprising a metal wheel comprised of a swept tooth disk blade such as a row cleaner swept in one of the direction of travel or in the opposite direction of travel with a hub pattern and with fingers or metal round bars comprising metal round bars curved to form part of an elliptical geometry inserted at a perpendicular angle to the vertical angle of the blade and inserted at locations equidistant around the blade and located within the bottom of the tooth profile at a depth from the outer perimeter of the blade which is a minimum of 2 inches so that there exist an equal number of teeth and round bars.

19. A disk blade harrow comprising a multiplicity of metal wheels having disk blades either round or notched or toothed with a hub pattern, each of said disk blades having metal round or square bars curved to form part of an elliptical geometry inserted at a perpendicular angle to the vertical angle of the blade and inserted at locations equidistant around the blade and located within the body of the blade at variable depths from the outer perimeter of the blade having the round or square bars welded or joined together in varying distances of proximity one to another adapted to rotate in unison and to act as a wheel to compress furrows between raised beds.

20. A disk blade harrow system, comprising:
 a. a carrier having mounted thereon (i) a multiplicity of metal wheels having disk blades either round or notched or toothed with a hub pattern and with metal round or square bars curved to form part of an elliptical geometry inserted at a perpendicular angle to the vertical angle of the disk blade and inserted at locations equidistant around the disk blade and located within the body of the disk blade at variable depths from the outer perimeter of the disk blade having the round or square bars welded or joined together in varying distances of proximity one to another appointed to rotate in unison and to act as a wheel to compress the furrows between raised beds;
 b. two or more of said disk blades being interconnected together by way of two or more flanges welded or joined near the outer perimeter of the disk blade thereby forming a central frame or basket between interconnected disk blades;
 c. the outer perimeter of the blade having the round or square bars welded or joined together at varying distances of proximity to one another and the flanges forming interconnected disk blades adapted to rotate in unison and being appointed to act as a wheel or smasher to compress furrows between raised beds.

21. A harrow system comprising:
 a. one or more elliptical bars having a first set of multiplicity of metal wheels having a first set disk blades being round or notched or toothed with a hub pattern mounted thereon;
 b. one or more protruding mount bars extending laterally beyond the elliptical bars and having a second set of disk blades comprising multiplicity of metal wheels having disk blades being round or notched or toothed with a hub pattern mounted thereon;

c. at least one of said first set or second set of disk blades comprising a combination of sharpened disk blades and dull disk blades, wherein said sharpened disk blades are appointed to cut crop residue on a soil surface upon contact as the round bars hold crop residue in place thereby sizing residue, wherein said dull blades are appointed to pinch and score crop residue thereby allowing for soil microorganisms to enter into crop residue and begin decomposition;

wherein a forward rotation geometry results from a combination of the one or more second set of disk blades beyond the elliptical bars to transfer kinetic energy of rotation into clods facilitating crumbling of soil clods into smaller aggregates, wherein as the disk blade rotates forward, it contacts crop residue on a surface of the soil pushing the residue into the soil as the round bars stir and compress soil around the residue, wherein soil is scored upon rotation of the harrow blade when it comes into contact with untilled soil, wherein when operated at an angle to the direction of forward movement, the harrow wheel lifts and tills the soil.

22. The harrow of claim 21, wherein at least one of said first or second disk blades comprise metal round or square bars curved to form part of an elliptical geometry inserted at a perpendicular angle to the vertical angle of the disk blade and inserted at locations equidistant around the disk blade and located within the body of the disk blade at variable depths from the outer perimeter of the disk blade having the round or square bars welded or joined together in varying distances of proximity one to another appointed to rotate in unison or at different speeds, and wherein said disk blades can run straight or at an angle at different speeds of tillage, and wherein soil is mixed as the round bars interact at a different angles to a plane of the soil lifting and mixing the soil.

23. The harrow of claim 22, wherein two or more of said disk blades are interconnected together by way of two or more flanges welded or joined near the outer perimeter of the disk blade thereby forming a central frame or basket between interconnected disk blades.

* * * * *